United States Patent [19]
Maruyama et al.

[11] Patent Number: 5,883,960
[45] Date of Patent: *Mar. 16, 1999

[54] METHOD OF MOBILE UNIT REGISTRATION AND METHOD OF IC CARD REGISTRATION FOR MOBILE COMMUNICATIONS SYSTEM, AND MOBILE UNIT, IC CARD, AND IC CARD INSERTION TYPE MOBILE UNIT IMPLEMENTING SUCH METHODS

[75] Inventors: Minoru Maruyama; Hiroshi Kanno; Shuuji Fujiwara; Kunio Watanabe, all of Kawasaki, Japan

[73] Assignee: Fujitsu Limited, Kanagawa, Japan

[ * ] Notice: This patent issued on a continued prosecution application filed under 37 CFR 1.53(d), and is subject to the twenty year patent term provisions of 35 U.S.C. 154(a)(2).

[21] Appl. No.: 825,659

[22] Filed: Apr. 3, 1997

Related U.S. Application Data

[63] Continuation of Ser. No. 269,177, Jun. 30, 1994, abandoned.

[30] Foreign Application Priority Data

Nov. 10, 1993 [JP] Japan .................................. 5-281315

[51] Int. Cl.⁶ .............................. H04L 9/32; H04B 7/26
[52] U.S. Cl. ................................ 380/23; 380/24; 455/411
[58] Field of Search .............................. 380/23, 30, 21, 380/24, 25; 455/411

[56] References Cited

U.S. PATENT DOCUMENTS

| | | |
|---|---|---|
| 5,077,740 | 12/1991 | D'Amico et al. .......................... 380/23 |
| 5,150,412 | 9/1992 | Maru ......................................... 380/23 |
| 5,386,468 | 1/1995 | Akiyama et al. ..................... 380/30 X |
| 5,390,252 | 2/1995 | Suzuki et al. .............................. 380/23 |
| 5,392,356 | 2/1995 | Konno et al. ............................... 380/23 |
| 5,398,285 | 3/1995 | Borgelt et al. ............................. 380/30 |
| 5,402,490 | 3/1995 | Mihm, Jr. ............................... 380/30 X |
| 5,557,679 | 9/1996 | Julin et al. ................................. 380/23 |

FOREIGN PATENT DOCUMENTS

| | | |
|---|---|---|
| 6-97931 | 4/1994 | Japan . |
| 2 274 565 | 7/1994 | United Kingdom . |
| 93/07697 | 4/1993 | WIPO . |

*Primary Examiner*—Gilberto Barron, Jr.
*Attorney, Agent, or Firm*—Helfgott & Karas, P.C.

[57] ABSTRACT

To prevent illegal duplication of an ID containing type mobile unit, and illegal duplication of an IC card for an IC card insertion type mobile unit, in manufacturing a COB device, a public key $KE_{COB}$, corresponding to a common secret key $KD_{COB}$ determined through consultation among communications carriers, is stored into a ROM in an unalterable form. In manufacturing a mobile unit, $KE_{Cj}$ that corresponds to a secret key $KD_{Cj}$ uniquely assigned to each communications carrier, is signature-encrypted with $KD_{COB}$. The result $E(KD_{COB}, KE_{Cj})$ is entered into a COB device to write in $KE_{Cj}$; the COB device 22 is then assembled, prior to shipment, into the mobile unit into which a mobile unit secret key $KD_{MSNi}$ and public key $KE_{MSNi}$ have been stored. In registration of the mobile unit, $E(KD_{Cj}, ID)$ received from the communications carrier is entered into the COB device 22, thereby writing personal information ID. For a readout, $KD_{MSNi}$ is input to read out the ID.

44 Claims, 46 Drawing Sheets

METHOD OF MOBILE UNIT REGISTRATION AND METHOD OF IC CARD REGISTRATION FOR MOBILE COMMUNICATIONS SYSTEM, AND MOBILE UNIT, IC CARD, AND IC CARD INSERTION TYPE MOBILE UNIT IMPLEMENTING SUCH METHODS

This is a continuation, of application Ser. No. 08/269,177, filed Jun 30, 1994 abandoned.

FIELD OF THE INVENTION

The present invention relates to a method of registering an ID (identification) information containing type mobile unit for use in a mobile communications network and a method of registering an IC (integrated circuit) card used with an IC card insertion type mobile unit for use in a mobile communications network. The invention also relates to an ID information containing type mobile unit, an IC card, and an IC card insertion type mobile unit implementing such methods.

BACKGROUND OF THE INVENTION

For mobile units used for mobile telephones such as car telephones, portable telephones, etc., Japan currently employs a leasing system under which the subscriber leases the mobile equipment from the communications carrier that provides the telephone network, but a purchase system of the mobile equipment is expected to be introduced soon. While it is hoped that the introduction of the purchase system will help to further increase the use of mobile telephones, such problems as illegal duplication of mobile units (clone mobile units) are expected to arise. In fact, other countries where purchase plans are employed are facing such problems.

There are two types of information stored in a memory of a mobile unit: information, such as built-in software, whose contents are identical with other mobile units of the same model, and information different for each individual mobile unit and used to authenticate the mobile unit to the communications network for connection. The former information need not be read out or written in from the outside, and also, the amount of information is large; therefore, it is so designed that external readout or write-in is difficult or impossible. On the other hand, the latter individualized information includes information concerning the telephone number (Mobile Subscriber Number: MSN) assigned to each subscriber of the telephone network, the mobile unit number (Mobile Station Identity: MSI) for identifying the mobile unit, the authentication key (MSN-key) for the communications network to authenticate the subscriber, and the authentication key (MSI-key) for the communications network to authenticate the mobile unit. The amount of such personal information is relatively small. After the mobile unit purchase system is put into effect, it is required when a contract is made between the communications carrier and the subscriber who purchased the mobile unit, that after sale of the product, personal information should be written into the mobile unit for registration with the communications carrier as soon as possible. Therefore, there must be a capability that such personal information is quickly written in and read out from the outside. Furthermore, the personal information must be alterable to allow for a possible future change in the contents of the contract.

In the case of an ID containing type mobile unit in which such personal information is stored in a nonvolatile memory such as an EEPROM contained in the mobile unit, a stand-alone ROM writer is connected to write the information into the internal EEPROM when the contract is made. It is desirable, from the standpoint of promoting the sales of mobile units, that the ROM writer be installed at every mobile unit dealer who is authorized under contract with the communications carrier so that the user who purchased the mobile unit can have the unit registered on the spot without having to take the unit to the communications carrier for registration.

Another method of sale which is desirable from the standpoint of sales promotion is to sell mobile units with no personal information written therein at mass-volume retail stores, so that the user who purchased one from such a store takes his mobile unit to an authorized dealer having the ROM writer and has the personal information written into the mobile unit for registration upon making a contract.

To make such a method of sale possible, the mobile unit must be designed so that personal information can be written in and read out from outside the unit. However, the fact that mobile units with no personal information written in are sold on the market and that the personal information stored in each mobile unit can be read out, means that duplicate units that cannot be distinguished by the communications network can be made easily by reading out the personal information and writing it into other mobile units with no personal information previously written therein.

Even if the personal information is stored in encrypted form so that the contents cannot be recognized, duplicates of mobile units that can be connected to the communications network can be made by simply copying the same contents into other mobile units of the same model. Even if perfect protection can be provided by some means against read out attempts, it is possible to make duplicate units by reading out personal information from a mobile unit of a previous model from which the personal information can be read out, and by writing it into other mobile units with no personal information written therein. Such illegal duplications of registered mobile units would not only make it impossible to collect basic charges that could otherwise be collected, but cause a problem that when a number of such indistinguishable mobile units are simultaneously connected to the communications network, the registration of mobile unit locations would become confused, thus disrupting the communications network system.

To facilitate the contract and registration procedures at the carrier's authorized dealers where the ROM writer is installed, it is desirable that the ROM writer be connected to a terminal installed at the communications carrier via a communication line so that the contract and registration procedures can be performed on-line. This, however, gives rise to the possibility that someone may intercept the communication line. It is therefore necessary to provide some measures so that if intercepted, duplication of mobile units cannot be made by using the intercepted information.

Furthermore, provisions must be made so that even if information known only to the communications carrier or the mobile unit manufacturer leaks out for some reason, duplication of mobile units cannot be made by using the information from one party alone unless the information from the other party is combined with it.

Moreover, for the mobile unit to be connected to the ROM writer via a cable, the mobile unit needs to be provided with a connector for cable connection with the ROM writer; this prevents a reduction in size of the mobile unit. Further, if the type of connector is different for each mobile unit model, the dealer needs to have as many ROM writers as the number of mobile unit models that the dealer carries.

On the other hand, it is planned that the personal information will be stored in an IC card instead of writing it directly into a mobile unit so that the IC card is inserted into a mobile unit for use in communication, allowing the shared use of one mobile unit by plurality of subscribers, or conversely, allowing one subscriber to use a plurality of mobile units. In this case also,the IC card must be made secure from illegal readout and write-in (dead copy), and furthermore, measures must be taken so that illegal duplication of the IC card cannot be made by using the information from one party alone, the communication carrier or the manufacturer, as in the case of the built-in ID type mobile unit.

Since each IC card is identical in physical shape, it can be inserted into any mobile unit. However,when the IC card is inserted into a mobile unit that cannot be connected to the communications network or that is not permitted to be connected to the communications network,such a mobile unit must not operate and transmit illegal radiowaves.

One way this can be accomplished is by storing information on the IC card that restricts the use only to the mobile units approved by the communications carrier for connection. In this case, when an additional mobile unit is approved for connection after the registration of the IC card, a request will have to be made to the communications carrier or its authorized dealer to have additional information written to the IC card in order that the additional mobile unit is able to be used. This imposes a cumbersome procedure on the subscriber.

SUMMARY OF THE INVENTION

Accordingly, one object of the present invention is to provide a method of mobile unit registration capable of preventing illegal duplication of mobile units.

Another object of the invention is to provide a method of mobile unit registration that does not require the provision of a connector for the connection with a ROM writer for mobile unit registration, and that does not need different ROM writers for different models.

Another object of the invention is to provide a method of IC card registration for an IC card insertion type mobile unit, wherein an additional mobile unit approved after the registration of the IC card can be registered for use with the IC card without having to undergo a cumbersome procedure.

Another object of the invention is to provide a mobile unit, IC card, and IC card insertion type mobile unit implementing the above methods.

According to the present invention, there is provided a method of registering a mobile unit for use in a mobile communications network, comprising the steps of: determining identification information for identifying each individual mobile unit; generating first information data by signature-encrypting the identification information with a carrier secret key of a communications carrier providing the mobile communications service; and writing the identification information into a memory module contained in the mobile unit by entering an identification information write command, containing the first data, into the memory module from which the identification information can be read out only when an identification information readout command, containing a mobile unit secret key of a manufacturer of the mobile unit, is entered.

According to the present invention, there is also provided a method of registering a mobile unit for use in a mobile communications network, comprising the steps of: coupling a mobile unit registration terminal to the mobile unit by power-conserving radio; sending identification information for identifying each individual mobile unit from the mobile unit registration terminal to the mobile unit by the power-conserving (low power) radio; and storing the identification information into the mobile unit.

According to the present invention, there is also provided a method of registering an IC card for an IC card insertion type mobile unit for use in a mobile communications network, comprising the steps of: determining identification information for identifying each individual IC card; generating first information data by signature-encrypting the identification information with a secret carrier key of the communications carrier which is providing the mobile communications network; and writing the identification information into the IC card by entering an identification information write command which contains the first information data, into the IC card from which the identification information can be read out only when an identification information readout command, which contains a mobile unit secret key of the manufacturer of the mobile unit, is entered.

According to the present invention, there is also provided a mobile unit for use in a mobile communications network, comprising: a memory module into which identification information for identifying each individual mobile unit is written only when an identification information write command is entered that contains first information data generated by signature-encrypting the identification information with a secret carrier key of the communications carrier providing the mobile communications network, and from which the identification information is read out only when an identification information readout command, which contains a mobile unit secret key of the manufacturer of the mobile unit, is entered; means for writing the identification information into the memory module by entering the identification information write command; and means for reading out the identification information by entering the identification information readout command into the memory module.

According to the present invention, there is also provided a mobile unit for use in a mobile communications network, comprising: means for being coupled to a mobile unit registration terminal by power-conserving radio; means for receiving identification information for registration of the mobile unit from the mobile unit registration terminal by the power-conserving radio; and means for storing the identification information.

According to the present invention, there is also provided an IC card for an IC insertion type mobile unit for use in a mobile communications network, comprising: an input/output terminal; means for holding identification information used for connection to the mobile communications network; means for decrypting identification information and writing the same into the identification information holding means when an identification information write command, which contains the identification information, signature-encrypted with a secret carrier key of the communications carrier providing the mobile communications network, is entered via the input/output terminal; and means for reading out the identification information from the identification information holding means and outputting the same at the input/output terminal when an identification information readout command is entered via the input/output terminal, which command contains a mobile unit secret key of the manufacturer of the mobile unit for a model that can be used with the IC card inserted therein.

According to the present invention, there is also provided an IC card insertion type mobile unit for use in a mobile communications network, comprising: means for storing a mobile unit secret key of the manufacturer of the mobile unit; and means for reading identification information from an IC card inserted into the mobile unit by entering an identification information readout command, which contains the mobile unit secret key stored in the storing means, into the IC card.

According to the present invention, there is also provided an IC card insertion type mobile unit for use in a mobile communications network, comprising: means for storing signature data generated by signature-encrypting a mobile unit public key corresponding to a mobile unit secret key of the manufacturer of the mobile unit by using a secret carrier key of the communications carrier providing the communications network; and means for reading identification information from an IC card inserted into the mobile unit by entering an identification information readout command, the command containing the signature data stored in the storing means, into the IC card.

DESCRIPTION OF THE PREFERRED EMBODIMENTS

Figure 1:
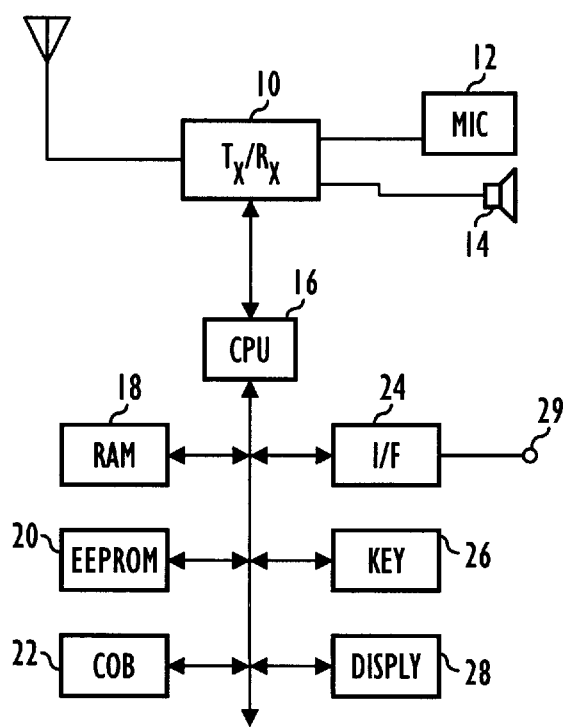
FIG. 1 is a block diagram showing the configuration of an ID containing type mobile unit according to one embodiment of the present invention.

FIG. 1 is a block diagram showing the hardware configuration of an ID containing type mobile unit according to one embodiment of the present invention. A radio unit 10, a microphone 12, and a speaker 14 are used to transmit and receive control signals and voice signals to and from a base station (not shown), the radio unit 10 being controlled by a central processing unit (CPU) 16 to carry out the functions of a mobile unit. Connected to the CPU 16 are a random access memory (RAM) 18, an electronically erasable programmable read-only memory (EEPROM) 20, a chip-on-board (COB) device 22, a signal controller 24, a keypad 26, and a display 28.

In accordance with control programs contained in the EEPROM 20, the CPU 16 controls the radio unit 10 and also performs control to register the mobile unit to a communications network and have its personal information written into the COB device 22. The RAM 18 temporarily stores data for various control operations. The RAM 18 also stores the personal information read out of the COB device for connection to the communications network. The personal information includes a fixed pattern for verifying the correctness of its contents. The signal controller 24 provides an interface between the CPU 16 and a dealer's terminal (to be described later) connected through an input/output terminal 29 for the writing of the personal information. They keypad 26 is used to accept inputs for personal information write operations as well as inputs for communication operations. The display 28 not only displays status associated with communication operations of the mobile unit, but is also used during personal information write operations.

Figure 2:
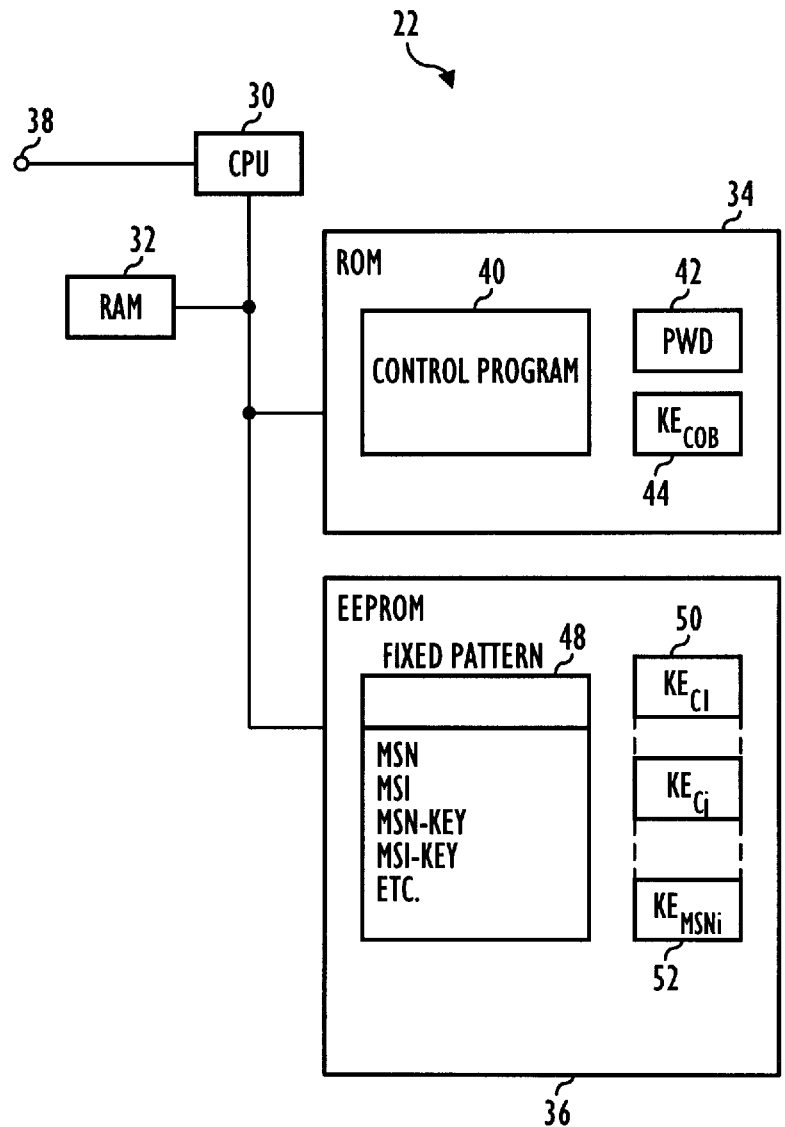
FIG. 2 is a block diagram showing the configuration of a COB device shown in FIG. 1.

FIG. 2 is a block diagram showing the configuration of the COB device 22 shown in FIG. 1. The COB device 22 comprises a CPU 30, a RAM 32, a ROM 34, and an EEPROM 36; the whole structure is sealed with resin, and only a power supply terminal and an input/output terminal 38 for communication between the CPU 30 and the CPU 16 of the mobile unit are exposed. The structure is such that the contents of the internal EEPROM 36 cannot be read out or written in unless specific commands are input to the CPU 30 via the input/output terminal 38.

The ROM 34 contains a control program 40 for the CPU 30, a password 42, and a common public key $KE_{COB}$ 44 corresponding to a common secret key $KD_{COB}$ determined through consultation among all communication carriers concerned. The password 42 is stored to allow the user to enter the COB device 22 into a mode (supervisor mode) to carry out a specific command (to be described later) only when a value that matches the password 42 is entered via the input/output terminal 38.

In the description given hereinafter, a secret key is denoted by KD and its corresponding public key is denoted by KE with the same subscript as attached to KD. The secret key KD and its corresponding public key are determined, e.g., in accordance with the RSA (Rivest-Shamir-Adleman) cryptosystem, but the present invention is not limited to this cipher system. It will be appreciated that the secret-key cryptosystem can also be applied analogically. In the RSA cryptosystem, when the encrypt calculation for converting a plaintext M into a ciphertext C with the public key KE is expressed as $$C = E(KE, M) \qquad (1)$$

then the decrypt calculation for converting the ciphertext C back into the plaintext M is expressed as $$\begin{aligned} M &= E(KD, C) \\ &= E(KD, E, (KE, M)) \end{aligned} \qquad (2)$$

The signature encryption in a digital signature is expressed as $$C = E(KD, M) \qquad (3)$$

and the decrypt process is expressed as $$\begin{aligned} M &= E(KE, C) \\ &= E(KE, E (KD, M)) \end{aligned} \qquad (4)$$

$KE_{COB}$ 44 is stored in order to enable a carrier public key $KE_{Cj}$ (to be described later) which have been signature-encrypted with $KD_{COB}$ to be decrypted and then to be written into the EEPROM 36. That is, $KE_{COB}$ is stored so that only the person who knows $KD_{COB}$ corresponding to $KE_{COB}$ is authorized to write $KE_{Cj}$. These contents are written into the ROM 34 in the manufacturing process of the COB device 22 during the manufacture of the COB device before it is shipped to the mobile unit manufacturer. The contents are unalterable. The control program 40 includes programs for controlling input/output operations via the input/out terminal 38 as well as programs for encrypt/decrypt calculations expressed by equations (1) to (4), and all encrypt/decrypt operations in the mobile unit are performed within the COB device 22.

The EEPROM 36 can store personal information such as MSN, MSI, etc., a carrier public key $KE_{Cj}$ 50 corresponding to a carrier secret key $KD_{Cj}$ known only to the communications carrier, and a mobile unit public key $KE_{MSNi}$ 52 corresponding to a mobile unit secret key $KD_{MSNi}$ known only to the manufacturer of the mobile unit. The carrier secret key $KD_{Cj}$/carrier public key $KE_{Cj}$ pair is determined for each communications carrier; when one communications carrier provides a plurality of communications networks, the key pair is determined for each communications network. The mobile unit secret key $KD_{MSNi}$/public key $KE_{MSNi}$ pair is determined for each mobile unit model.

Of the contents of the EEPROM 36, the carrier public key $KE_{Cj}$ 50 is written into the EEPROM 36 in the manufacturing process of the mobile unit. If one mobile unit model is approved by a plurality of communications carriers for connection, the same number of $KE_{Cj}$'s as the number of carriers are written. The mobile unit public key $KE_{MSNi}$ 52 and the personal information 48 are written when the mobile unit is registered to the communications network. The personal information 48 includes a fixed pattern which is compared with fixed patterns (to be described later) in the EEPROM 20 when the personal information is read out by the CPU 16 of the mobile unit; only when a match is found with one of them, it is decided that the correct personal information has been read out. This serves to avoid wasteful communication with the communications network even when wrong information is written in the COB 22.

Figure 3:
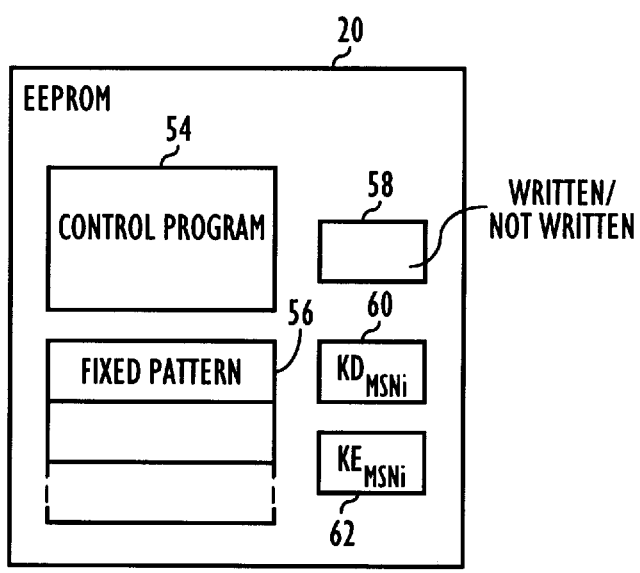
FIG. 3 is a diagram schematically showing the data stored in an EEPROM shown in FIG. 1.

FIG. 3 schematically shows the data stored in the EEPROM 20 of the mobile unit shown in FIG. 1. The EEPROM 20 contains a control program 54 for the CPU 16, the aforementioned fixed patterns 56 which are compared with the fixed pattern read into the RAM 18 to verify the correctness, a flag 58 indicating whether or not personal information has been written in the COB device 22, and a mobile unit secret key $KD_{MSNi}$ 60 and its corresponding mobile unit public key $KE_{MSNi}$ 62. The fixed pattern 56 may be different for different communications carriers; therefore, multiple fixed patterns are stored. When the fixed pattern read into the RAM 18 matches any one of these patterns, then it is decided that the correct personal information is stored in the COB device 22.

The mobile unit secret key $KD_{MSNi}$ and public key $KE_{MSNi}$ are stored with their contents shuffled so that they cannot be easily recognized by reading out the contents of the EEPROM 20 and comparing them between different mobile units. The control program 54, fixed patterns 56, mobile unit secret key $KD_{MSNi}$, and mobile unit public key $KE_{MSNi}$ are written during the manufacture of the mobile unit, while the flag 58 is caused to change state when the mobile unit is registered to the communications network.

Table 1 is a listing of commands that are accepted by the internal COB device 22 of the ID containing type mobile unit shown in FIGS. 1 and 2.

request will not be accepted. In other encryption systems, any value inappropriate to the encryption system employed will not be accepted. The command of item No. 6 is used to write the mobile unit public key $KE_{MSNi}$ into the EEPROM 36 in the COB device 22. When the command of item No. 6, containing the carrier public key $KE_{Cj}$ and $E(KD_{Cj}, KE_{MSNi})$ expressing the mobile unit public key $KE_{MSNi}$ signature-encrypted with the carrier secret key $KD_{Cj}$ is entered, if the entered $KE_{Cj}$ matches one of the stored $KE_{Cj}$'s, the entered $E(KD_{Cj}, KE_{MSNi})$ is decrypted with $KE_{Cj}$ and the resulting $KE_{MSNi}$ is stored. The command of item No. 8 is used to write in the personal information. The command of item No. 8 contains the carrier public key $KE_{Cj}$, the mobile unit secret key $KD_{MSNi}$, $E(KE_{MSNi}, E(KD_{Cj}, ID))$ which expresses the personal information ID signature-encrypted with $KD_{Cj}$ with the result further encrypted with $KE_{MSNi}$, and $E(KD_{Cj}, RDM)$ which expresses the random number RDM (to be described later) signature-encrypted with $KD_{Cj}$. When this command is entered, if the entered $KE_{Cj}$ matches one of the stored $KE_{Cj}$'s, and if the RDM obtained by decrypting $E(KD_{Cj}, RDM)$ with $KE_{Cj}$ matches the RDM stored in the RAM 32 in the COB device 22, then

TABLE 1

Input/Output Specification for Internal COB Device of ID Information Containing Type Mobile Unit

| Item No. | Command description | Input information | Output information | Condition for guaranteeing output |
|---|---|---|---|---|
| 1 | Supervisor mode set | PWD | Setting result (OK/NG) | To match PWD in ROM |
| *4 Note | Carrier public key write | $E(KD_{COB}, KE_{cj})$ | Write result (OK/NG) | $KE_{cj} \neq 0, 1$ |
| 6 | Mobile unit public key registration | $KE_{cj}$, $E(KD_{cj}, KE_{MSNi})$ | Write result (OK/NG) | $KE_{cj}$ is already registered |
| 8 | ID information write | $KE_{cj}$ $KD_{MSNi}$, $E(KE_{MSNi}, E(KD_{cj}, ID))$, $E(KD_{cj}, RDM)$ | Write result (OK/NG) | $KE_{cj}$ is already registered, and calculation result of $E(KE_{cj}, E(KD_{cj}, RDM))$ coincides with RDM in RAM. |
| 9 | ID information read | $KD_{MSNi}$ | ID, Read result (OK/NG) | $KE_{MSNi}$ is already registered |
| 10 | RDM read (set) | None | RDM (different random number each time) | |
| 11 | Carrier public key read | j (carrier number), A, $E(KD_{cj}, A)$ A is any integer ($\neq 0, 1$) | $KE_{cj}$, Read result (OK/NG) | $KE_{cj}$ (j = carrier number) is already registered, and input value A coincides with calculation result of $E(KE_{cj}, E(KD_{cj}, A))$. |
| 12 | E(K, A) read | K (key) A (Value to be encrypted) | E(K, A) (Used in any encrypt calculation) | None |

NOTE:
The command of *4 is operative only in supervisor mode. (Returns to normal mode at completion of each command)

Referring to Table 1, when the command of item No. 1, containing a designated password, is entered, the entered password is compared with the password 42 contained in the ROM 34, and when they match, the unit goes into the supervisor mode. The command of item No. 4 is valid only in the supervisor mode. In the supervisor mode, when the command of item No. 4, containing $E(KD_{COB}, KE_{Cj})$ expressing the carrier public key $KE_{Cj}$ encrypted with the common secret key $KD_{COB}$, is entered, decryption is performed using the common public key $KE_{COB}$ held in the ROM 34 and $KE_{Cj}$ is written into the EEPROM 36, upon which the unit returns to the normal mode. If, at this time, carrier public keys of other carriers are already stored, the $KE_{Cj}$ is added to the bottom of the contents of the table. In the RSA cryptosystem, if $KE_{Cj}$ is 0 or 1, the conversion result will be 1 or no change and the contents of the key can be easily known; therefore, if $KE_{Cj}$ is 0 or 1, the write the personal information obtained by decrypting the entered $E(KE_{MSNi}, E(KD_{Cj}, ID))$ with $KD_{MSNi}$ and $KE_{Cj}$, is written into the EEPROM 36. The command of item No. 9 is used to read out the personal information. When the command of item No. 9, containing $KD_{MSNi}$, is entered, the stored personal information is encrypted with the stored $KE_{MSNi}$ and decrypted with the entered $KD_{MSNi}$, i.e., $ID=E(KD_{MSNi}, E(KE_{MSNi}, ID))$ is calculated, and the result of the calculation is output as the personal information. By entering the command of item No. 10, the random sequence RDM used in the command of item No. 8 is output, and at the same time, is stored into the RAM 32. The command of item No. 11 is used to read out the carrier public key $KE_{Cj}$ stored in the COB device 22. The command of item No. 11 contains the integer j that specifies the stored position of the requested $KE_{Cj}$, an arbitrary integer A which is neither 0 nor 1 (condition for RSA cryptosystem), and $E(KD_{Cj}, A)$ expressing A signature-encrypted with $KD_{Cj}$. When this command is entered, if the result obtained by decrypting $E(KD_{Cj}, A)$ with the $KE_{Cj}$ stored in the jth position matches the entered A, then $KE_{Cj}$ is output. The command of item No. 12 is used to perform a conversion operation using the conversion operating program stored in the COB device 22. When the command of item No. 12, containing the key K and integer A, is entered, $E(K, A)$ is calculated and output.

The commands of item Nos. 6 and 8 each contain the carrier public key $KE_{Cj}$ in order to select one of the stored $KE_{Cj}$'s. Therefore, like the IC card to be described later, when no more than one $KE_{Cj}$ is stored, i.e., when connection for services is limited to only one communications network, there is no need to enter $KE_{Cj}$. In entering the command of item No. 8 $E(KD_{Cj}, ID)$, i.e., an ID with a digital signature encrypted with $KD_{Cj}$, is encrypted with $KE_{MSNi}$, and the result is entered. This is to prevent the ID from being deciphered by an eavesdropper when the ID is transmitted via a public network. If this is not a concern, or if it is to be written in a secret manner, data in the form of $E(KD_{Cj}, ID)$ may be written in.

Figure 4:
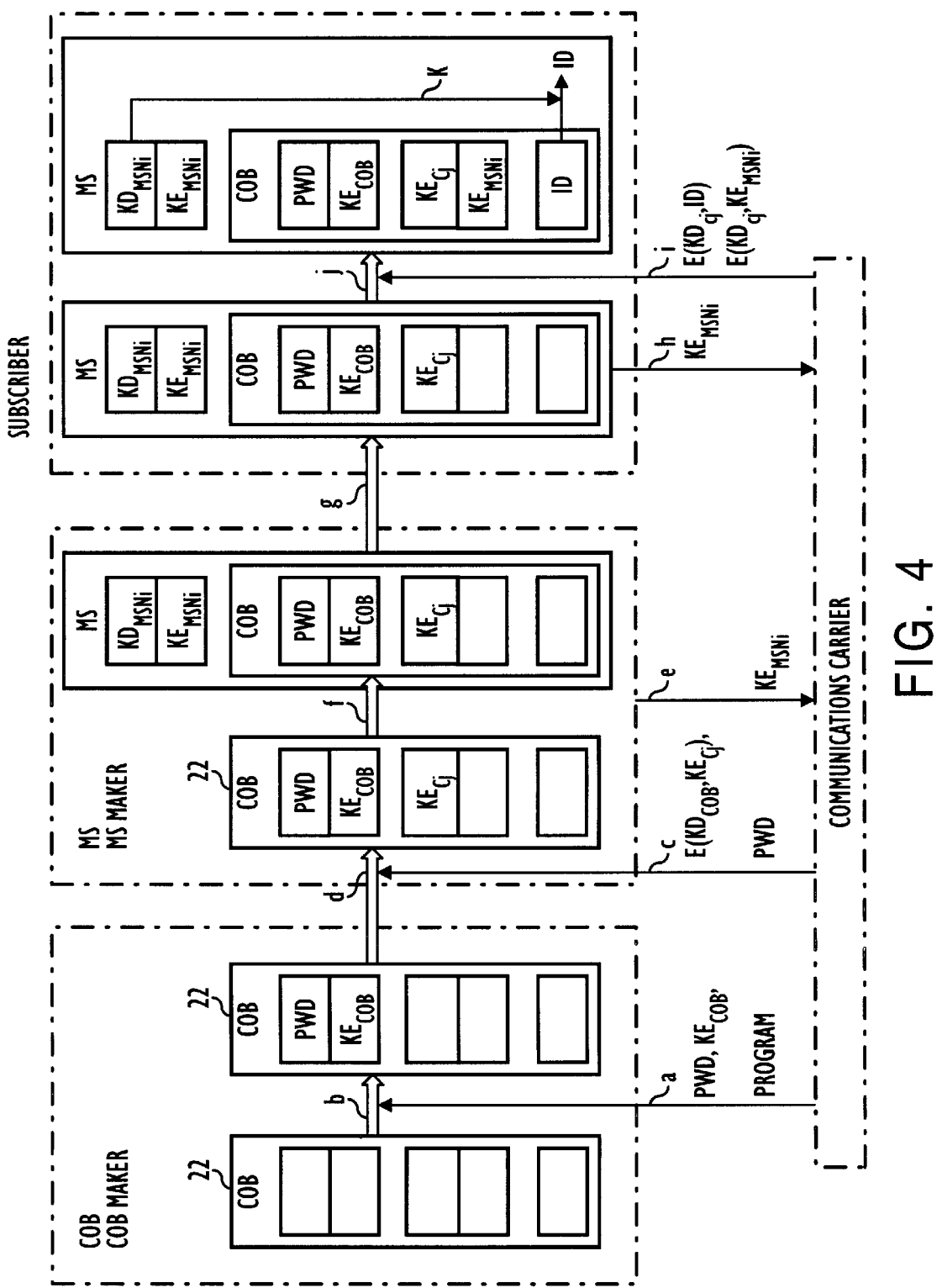
FIG. 4 is a diagram for explaining the outline of a mobile unit registration method according to the present invention.

FIG. 4 is a diagram for explaining the outline of a mobile unit registration method according to the present invention. First, the password PWD, common public key $KE_{COB}$, control programs and other data to be written into the ROM in the COB device are supplied in the form of a load module from the communications carrier to the COB manufacturer (step a). The data are written into the ROM to produce the COB device (step b), which is then shipped. At this stage, since the mobile unit in which the COB device will be installed, i.e., the communications carrier that provides the service is not known, only the common public key $KE_{COB}$ is written as the public key. When the COB device is delivered, the mobile unit manufacturer receives the password PWD and signature data $E(KD_{COB}, KE_{Cj})$, i.e., the carrier public key $KE_{Cj}$ with a signature encrypted with the common secret key $KD_{COB}$, from the communications carrier (step c), and writes the $KE_{Cj}$ into the COB device by using the commands of item Nos. 1 and 4 shown in Table 1 (step d). At this time, if the mobile unit in which the COB device is to be installed is intended for use in more than one communications network, more than one $KE_{Cj}$ is then written. With respect to authorized mobile unit models, the mobile unit public key $KE_{MSNi}$ is registered with the communications carrier in advance (step e). The COB device with $KE_{Cj}$ written therein is assembled into the mobile unit with the mobile unit secret key $KD_{MSNi}$, public key $KE_{MSNi}$, control programs, etc., written in its EEPROM (step f), and the mobile unit is shipped (step g). When registering the mobile unit, the mobile unit public key $KE_{MSNi}$ stored in the mobile unit is read out and transmitted to the communications carrier (step h). The communications carrier compares the received $KE_{MSNi}$ with the previously registered $KE_{MSNi}$, and when a match is found, transmits $E(KD_{Cj}, ID)$, i.e., personal information signature-encrypted with $KD_{Cj}$, or $E(KE_{MSNi}, E(DK_{Cj}, ID)$ if it is further encrypted with $KE_{MSNi}$), and $E(KD_{Cj}, KE_{MSNi})$, i.e., $KE_{MSNi}$ signature-encrypted with $KD_{Cj}$ (step i). Then, the commands of item Nos. 8 and 6, containing the received $E(KD_{Cj}, ID)$ and $E(KD_{Cj}, KE_{MSNi})$, respectively, are entered into the COB device, thus writing the personal information ID and mobile unit public key $KE_{MSNi}$ into the COB device (step j). To read out the personal information stored in the COB device, the command of item No. 9, containing the $KD_{MSNi}$ stored in the EEPROM of the mobile unit, is entered.

In the above method of mobile unit registration, the personal information is written into the EEPROM within the COB device, and cannot be read out or written in by directly addressing the EEPROM. This arrangement prevents the personal information stored in the registered mobile unit from being copied to other mobile units having no personal information written therein. When reading out the personal information, the data encrypted with $KE_{MSNi}$ in the COB device is decrypted by using the corresponding $KD_{MSNi}$. Therefore, the personal information cannot be read out correctly unless the mobile unit secret key $KD_{MSNi}$, which is known only to the mobile unit manufacturer, is entered. Even if it is attempted to enable readout by determining a $KD_{MSNi}/KE_{MSNi}$ pair in a random manner and by illegally writing $KE_{MSNi}$, $KE_{MSNi}$ with a digital signature encrypted with the secret key $KD_{Cj}$ corresponding to the carrier public key $KE_{Cj}$ held in the COB device must be entered in order to write $KE_{MSNi}$. Further, even if it is attempted to enable the writing of $KE_{MSNi}$ by determining a $KD_{Cj}/KE_{Cj}$ pair in a random manner and by illegally writing $KE_{Cj}$, the password and $KE_{Cj}$ with a digital signature encrypted with the common secret key $KD_{COB}$ must be entered in order to write $KE_{Cj}$. Furthermore, even if it is attempted to illegally write $KE_{COB}$ by determining a $KD_{COB}/KE_{COB}$ pair in a random manner, $KE_{COB}$ cannot be altered illegally since $KE_{COB}$ is stored in an unalterable ROM. As a result, the personal information cannot be read out without knowing the $KD_{MSNi}$ determined by the mobile unit manufacturer. Also, the personal information cannot be written in unless one knows the $KD_{Cj}$ corresponding to the $KE_{Cj}$ stored in the COB device. Since $KE_{Cj}$ cannot be altered arbitrarily, as already explained, it follows that the personal information cannot be written in unless one knows the $KD_{Cj}$ determined by the communications carrier.

As described above, the personal information cannot be read out or written in without knowing a specific secret key. Besides, even a person who is in a position to know one or the other of the two keys, $KD_{MSNi}$ and $KD_{Cj}$, cannot do both writing and reading unless he knows the other key, so that the personal information written in a mobile unit cannot be copied into other mobile units having no personal information written therein. Furthermore, $KE_{MSNi}$ of every approved mobile unit model is registered with the communications carrier, and personal information is assigned only to mobile units having the registered $KE_{MSNi}$. This arrangement prevents the personal information from being written into mobile units of a model that cannot be connected to or is not permitted to be connected to the communications network.

Since the common secret key $KD_{COB}$ is common to all carriers concerned, leakage of this key would have a serious effect. Accordingly, a password is entered using the command of item No. 2 prior to the entry of the command of item No. 4 unit, and the password is changed for every lot of COB devices to minimize the effect that would result when $KD_{COB}$ was leaked out. It will be noted here that there will be no problem even if the COB manufacturer and the mobile unit manufacturer happen to be the same manufacturer.

Figure 5:
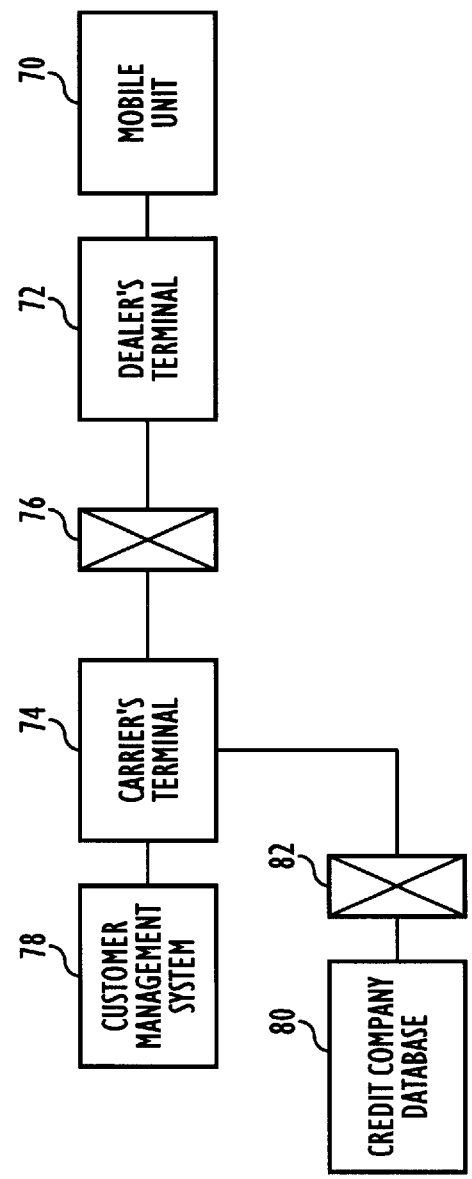
FIG. 5 is a block diagram showing a setup for on-line registration of a mobile unit with a communications carrier.

FIG. 5 is a system setup diagram according to the present invention, for explaining the procedure for on-line registration of a mobile unit when a mobile unit purchased at a dealer authorized under contract with the communications carrier is registered via a registration terminal installed at the dealer or when a mobile unit purchased at some other shop is taken to a dealer having a registration terminal to have the unit registered via the registration terminal. The mobile unit 70 and the dealer's terminal 72 are connected by a cable, and the dealer's terminal 72 is connected via a public network 76 to a carrier's terminal 74 installed at the communications carrier. The carrier's terminal 74 is connected on-line or off-line to a customer management system 78 provided for management of subscribers, and via a public network 82 to a credit company's database 80 to run a credit check on the user who applied for registration.

Figure 6:
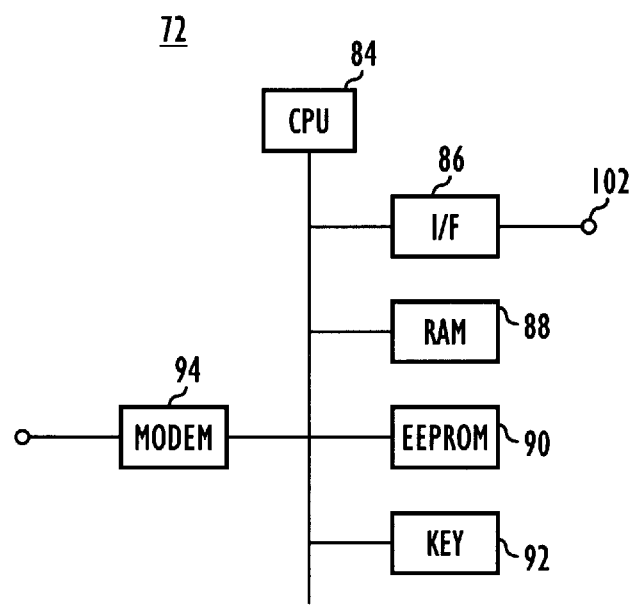
FIG. 6 is a block diagram showing the configuration of a dealer's terminal 72 shown in FIG. 5.

FIG. 6 is a block diagram showing the detailed configuration of the dealer's terminal 72 of FIG. 5. The dealer's terminal 72 comprises a CPU 84, a signal processor 86, a RAM 88, an EEPROM 90, a key 92, and a modem 94, interconnected with one another, and connected via the modem 94 to the public network.

The signal processor 86 provides an interface between the CPU 84 and the mobile unit connected through an input/output terminal 102. The EEPROM 90 contains a program for performing conversion between a serial signal to and from the mobile unit and a signal transmitted and received via the modem 94, a control program, and the telephone number of the carrier's terminal 74. The key 92 is used for selection of operations.

The primary function of the dealer's terminal 72 is to perform conversion between a serial signal to and from the mobile unit and a signal transmitted and received via the modem 94, and control of the transmit/receive sequence to and from the carrier's terminal 74 for mobile unit registration is performed primarily by a program contained in the mobile unit. Furthermore, no information whatsoever concerning the encryption/decryption keys is stored in the dealer's terminal 72. In this manner, a high level of security can be maintained. To reduce the cost of the dealer's terminal, the display of the mobile unit is used to display the operating state during registration; further, the key 92 is only for selection of operations, and the numeric keys, etc., provided on the mobile unit are made use of as necessary.

FIG. 6 shows an example in which connection is made to a conventional analog network via a modem, but it will be appreciated that the connection may be made to an analog network via a DTMF transmitter and receiver to perform transmission and reception using DTMF (dual tone multi-frequency) signals. Furthermore, connection with an ISDN network or a packet network can also be realized with ease.

Figure 7:
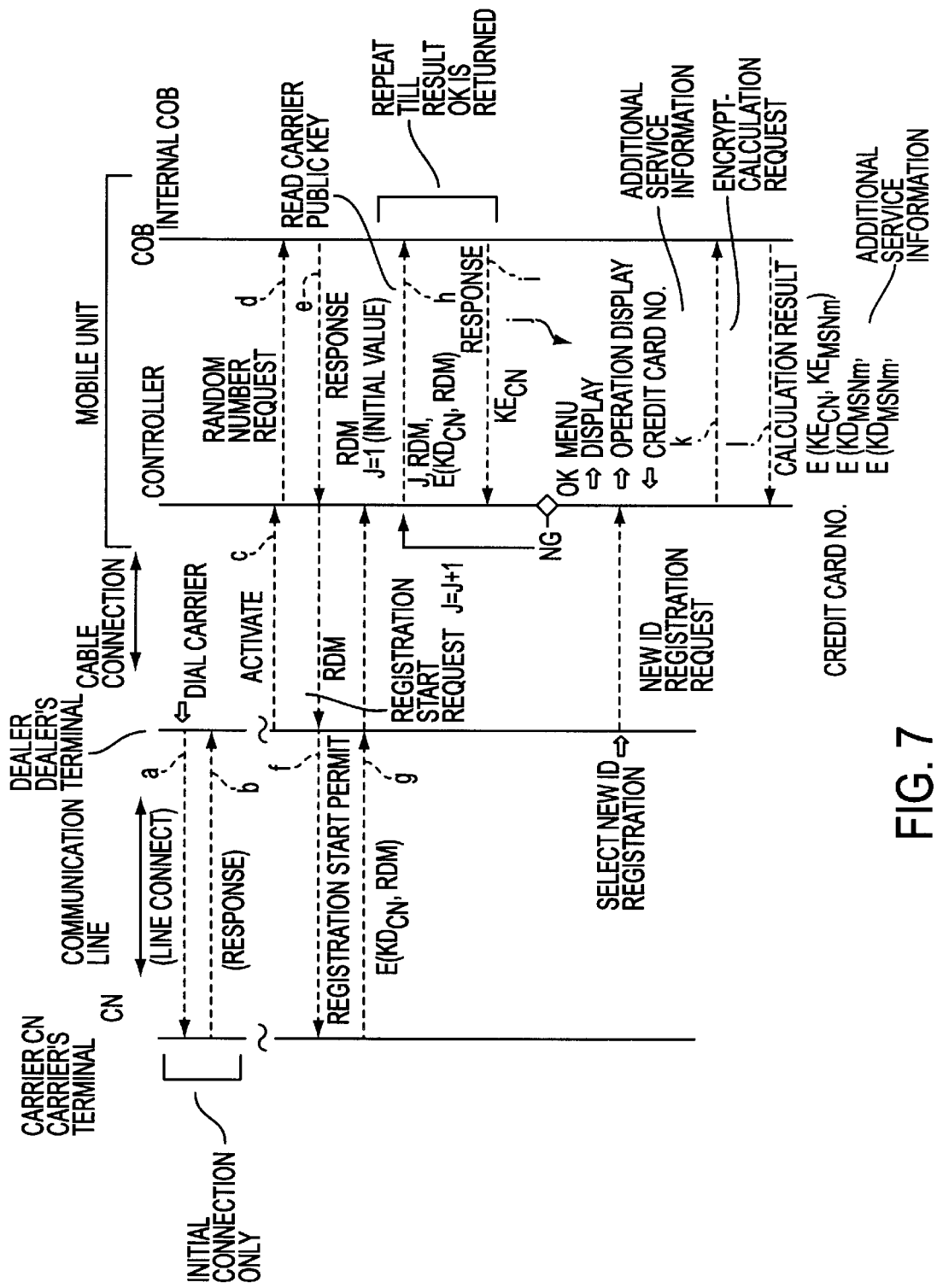
FIG. 7 is a diagram showing the first half of a sequence for new mobile unit registration in the setup shown in FIG. 5.
Figure 8:
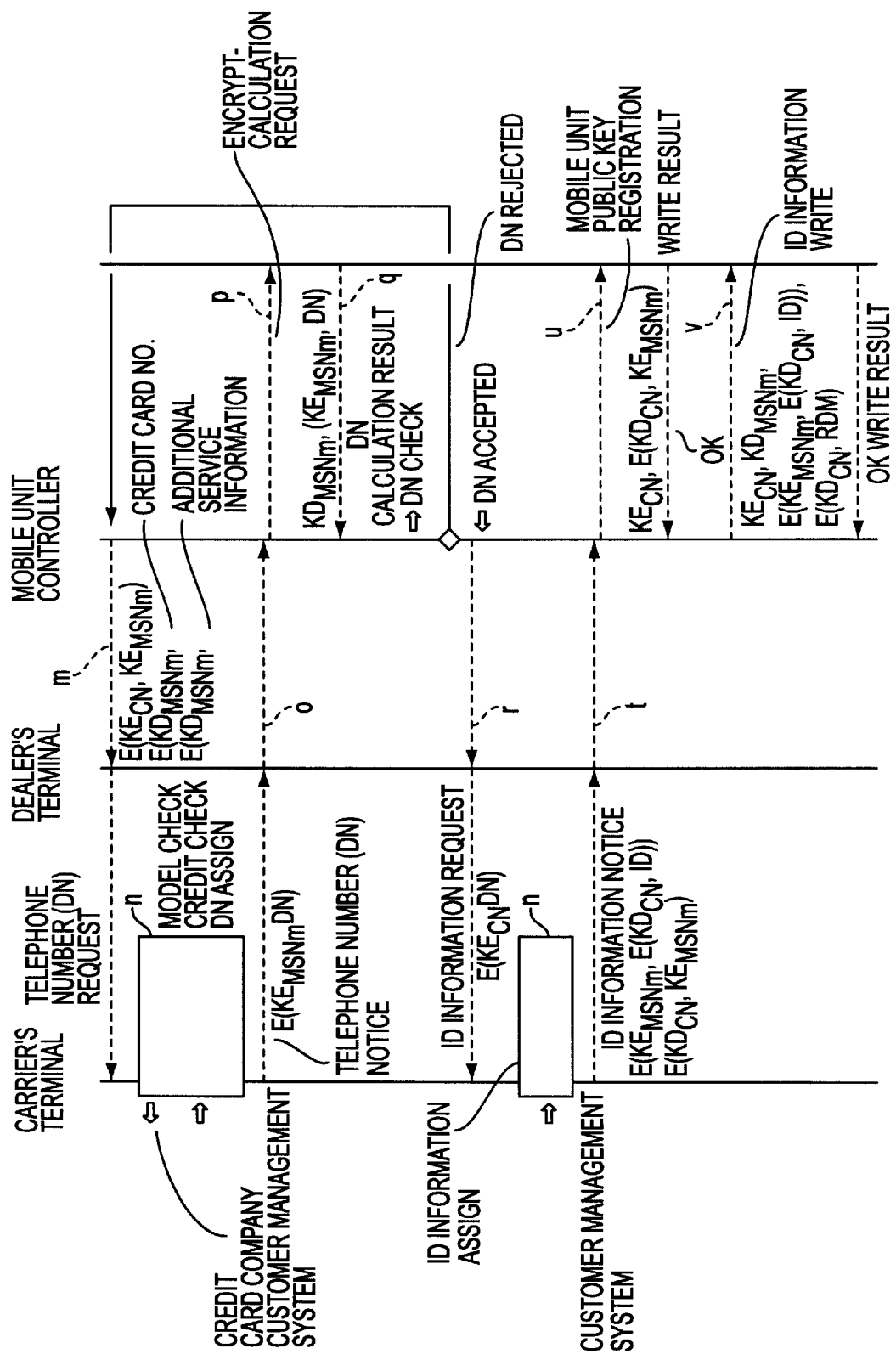
FIG. 8 is a diagram showing the second half of the sequence for new mobile unit registration.

FIGS. 7 and 8 are diagrams for explaining a sequence for a new mobile unit registration in the system setup illustrated in FIG. 5. Referring to FIG. 7, first the dealer's terminal is connected on-line to the carrier's terminal by dialing the communications carrier from the dealer's terminal installed at the dealer (steps a, b). When the controller of the mobile unit is activated from the dealer's terminal (step c), the controller of the mobile unit sends the command of item No. 10 in Table 1 to the COB device to request a random number from the COB device (step d). The COB device then generates a random number, and transfers the random number RDM to the controller of the mobile unit (step e) while, at the same time, storing its value RDM into its RAM. The controller of the mobile unit stores the received random number RDM into its RAM, and at the same time, sends a registration start request message, including the random number, to the carrier's terminal via the dealer's terminal (step f). The carrier's terminal signature-encrypts the received random number RDM with the carrier secret key (KD$_{CN}$, and returns the result E(KD$_{CN}$, RDM) (step g). The controller of the mobile unit sends the command of item No. 11 in Table 1, containing the E(KD$_{CN}$, RDM) just received, the RDM stored in the RAM, and the integer J (J=1, 2, . . . ), to the internal COB (step h). The internal COB decrypts E(KD$_{CN}$, RDM) with the carrier public key KE$_{CN}$ stored in its EEPROM at a position specified by the integer J, and determines whether the decrypted result matches the RDM contained in the entered command. If they match, the readout result is rendered OK and the KE$_{CN}$ is returned to the controller of the mobile unit (step i). If they do not match, the readout result NG is returned. Upon receiving the readout result NG, the controller of the mobile unit updates the value of J to J+1, and again sends the command of item No. 11 to the internal COB (step h). If KE$_{CN}$ cannot be read out even when the value of J has reached a predetermined value, this means that the KE$_{CN}$ for the communications network to which the applicant desires to subscribe is not stored in the COB in the mobile unit; i.e., it is found that the mobile unit that requested registration cannot be used in the communications network to which the applicant desires to subscribe. If KE$_{CN}$ can be read out, it means that the mobile unit is usable; then, an operation menu is displayed on the display of the mobile unit for selection of operations, prompting the operator to input the credit card number of the applicant and the type of additional service the applicant desires to subscribe to (step j). When these pieces of information are input, the command of item No. 12 in Table 1 is entered three times to request the internal COB for encrypt calculation (step k), as a result of which E(KE$_{CN}$, KE$_{MSNm}$), i.e., the mobile unit public key KE$_{MSNm}$ encrypted with the carrier public key KE$_{CN}$, E(KD$_{MSNm}$, credit card No.), i.e., the credit card No. signature-encrypted with the mobile unit secret key KD$_{MSNm}$, and E(KD$_{MSNm}$, additional service information), i.e., the additional service information signature-encrypted with KD$_{MSNm}$, are received from the internal COB (step l).

Referring next to FIG. 8, the controller of the mobile unit sends a telephone number request message, containing the above data, to the carrier's terminal (step m). The carrier's terminal performs decryption using the carrier secret key KD$_{CN}$, obtains KE$_{MSNm}$, and checks if the decrypted KE$_{MSNm}$ matches any one of the previously registered KE$_{MSNi}$. If there is no match, the registration is denied. If there is a match, the credit card No. and the additional service information are recovered using the KE$_{MSNm}$. The recovered credit card No. is reported to the credit company's database 80 via the public network 82 (FIG. 5) for automatic investigation of the applicant's credit; if the result is OK, an assigned telephone number (DN) is received from the customer management system (step n). The telephone number received from the customer management system is encrypted with the mobile unit public key KE$_{MSNm}$ and transferred to the controller of the mobile unit (step o). Upon receiving the encrypted telephone number E(KE$_{MSNm}$, DN), the controller of the mobile unit sends the command of item No. 12, containing the encrypted telephone number and the mobile unit secret key KD$_{MSNm}$, to the internal COB for encrypt calculation (step p), and then, receives the result of the calculations, i.e., the telephone number, which is displayed (step q). if the displayed telephone number is not one that the applicant desires, the process returns to step m. If the displayed telephone number is one that the applicant desires, the controller of the mobile unit sends a personal information request message, containing the telephone number E(KE$_{CN}$, DN) encrypted with the carrier public key, to the carrier's terminal (step r). E(KE$_{CN}$, DN) is calculated using the command of item No. 12. The carrier's terminal queries the customer management system and receives the personal information assigned from the customer management system (step s). Then, the personal information is signature-encrypted with the carrier secret key KD$_{CN}$, and is further encrypted with the mobile unit public key KE$_{MSNm}$ to produce E(KE$_{MSNm}$, E(KD$_{CN}$, ID)), which is then transmitted from the carrier's terminal to the controller of the mobile unit along with $E(KD_{CN}, KE_{MSNm})$ which is the mobile unit public key $KE_{MSNm}$ signature-encrypted with the carrier secret key $KD_{CN}$ (step t). The controller of the mobile unit enters the command of item No. 6, containing the received $E(KD_{CN}, KE_{MSNm})$, into the internal COB, thus writing $KE_{MSNm}$ (step u), and then enters the command of item No. 8, containing the received $E(KE_{MSNm}, E(KD_{CN}, ID))$ and the $E(KD_{CN}, RDM)$ previously received in step g, into the internal COB, thus writing the personal information (step v).

In the above-described on-line registration sequence, every information whose contents need to be kept confidential is encrypted with the recipient's public key prior to transmission to prevent the contents from leaking out. Furthermore, for information that needs to be received only from a designated sender, the information is signature-encrypted with the secret key of the party that the recipient recognizes as the designated sender (the party whose public key is held by the recipient) prior to transmission to the recipient, thus preventing illegal writing by a party disguised as a communications carrier. Furthermore, since a match in random number is checked when writing personal information, if it is attempted to produce a duplicate mobile unit by transferring a message, obtained by intercepting the whole communication between the carrier's terminal and the mobile unit, to a mobile unit having no personal information written therein, the writing is prohibited as the random number RDM that the internal COB generates each time does not match.

Figure 9:
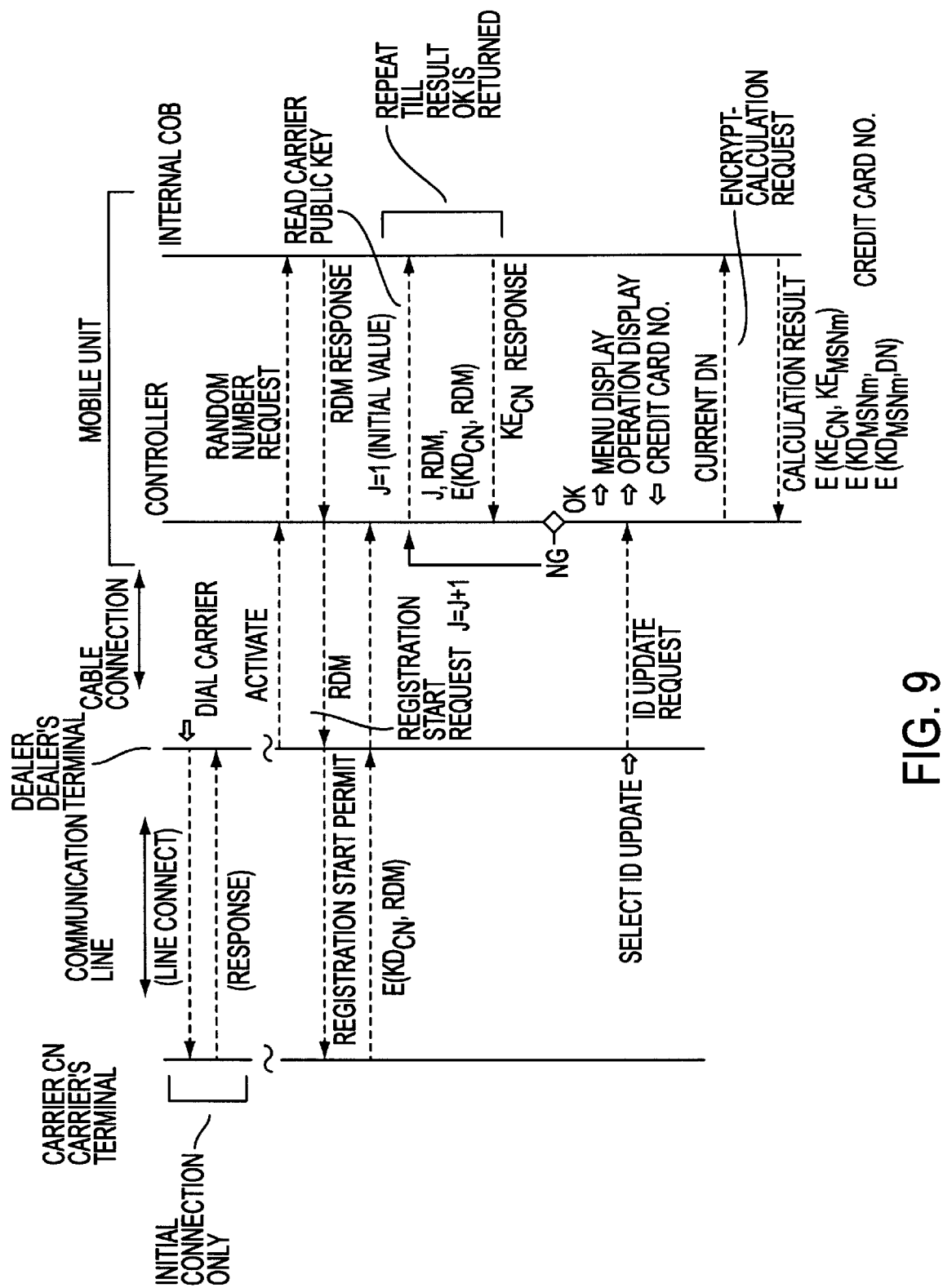
FIG. 9 is a diagram showing the first half of a sequence for updating mobile unit's personal information.
Figure 10:
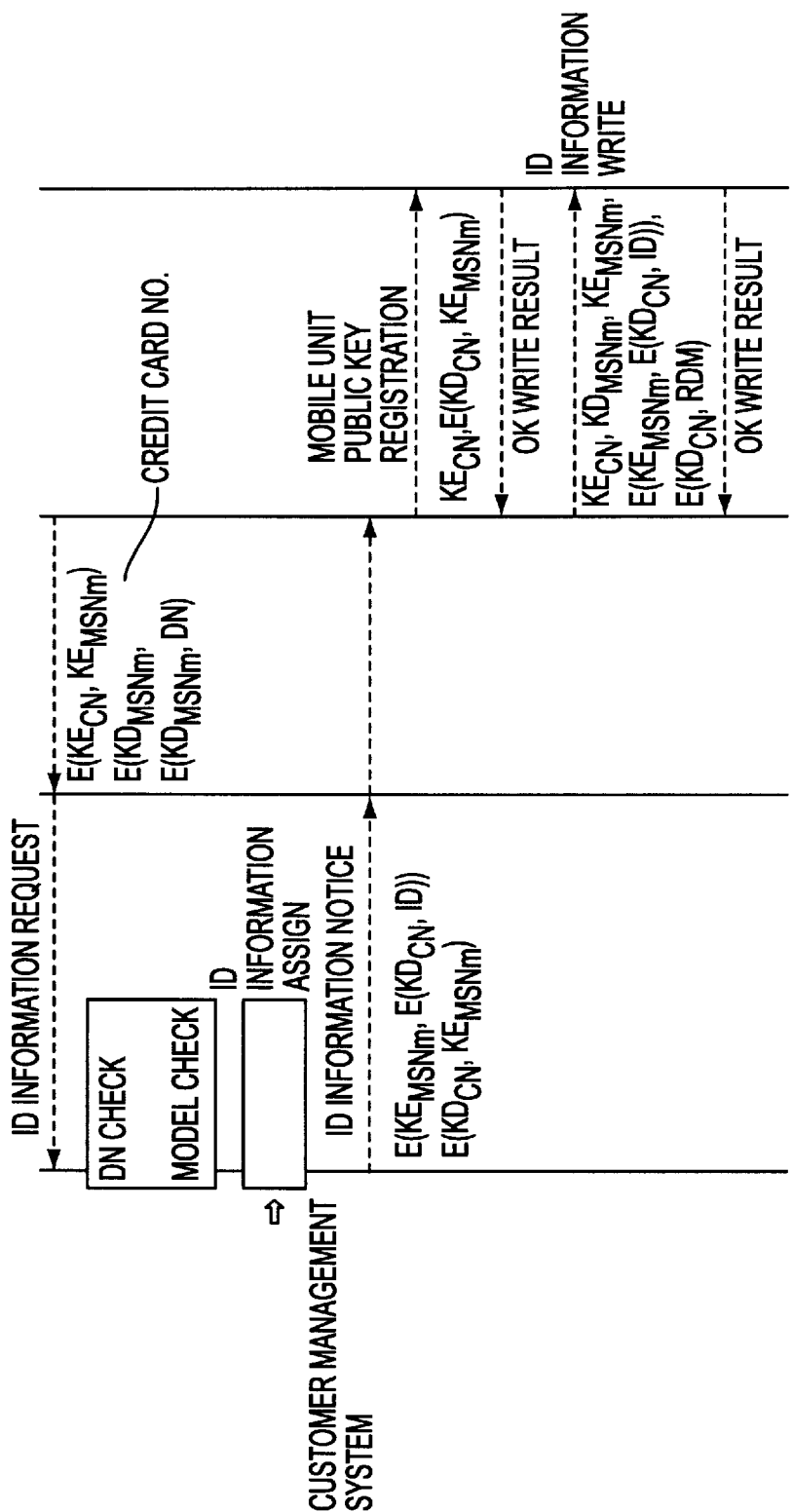
FIG. 10 is a diagram showing the second half of the sequence for updating mobile unit's personal information.

When a faulty mobile unit is brought to the dealer and its repair is completed, the personal information is updated in a similar sequence to that described above. This procedure is necessary to prevent anyone from obtaining a duplicate of a legally registered mobile unit; e.g., consider a case in which someone, who has a legally registered mobile unit, deliberately broke another mobile unit having no personal information written therein and requested repair. By updating the personal information, if there is another mobile unit initially registered, the ID stored in that mobile unit no longer matches the ID registered to the communications network so that that other mobile unit can no longer be used. Updating personal information is performed in the sequence shown in FIGS. 9 and 10.

Figure 11:
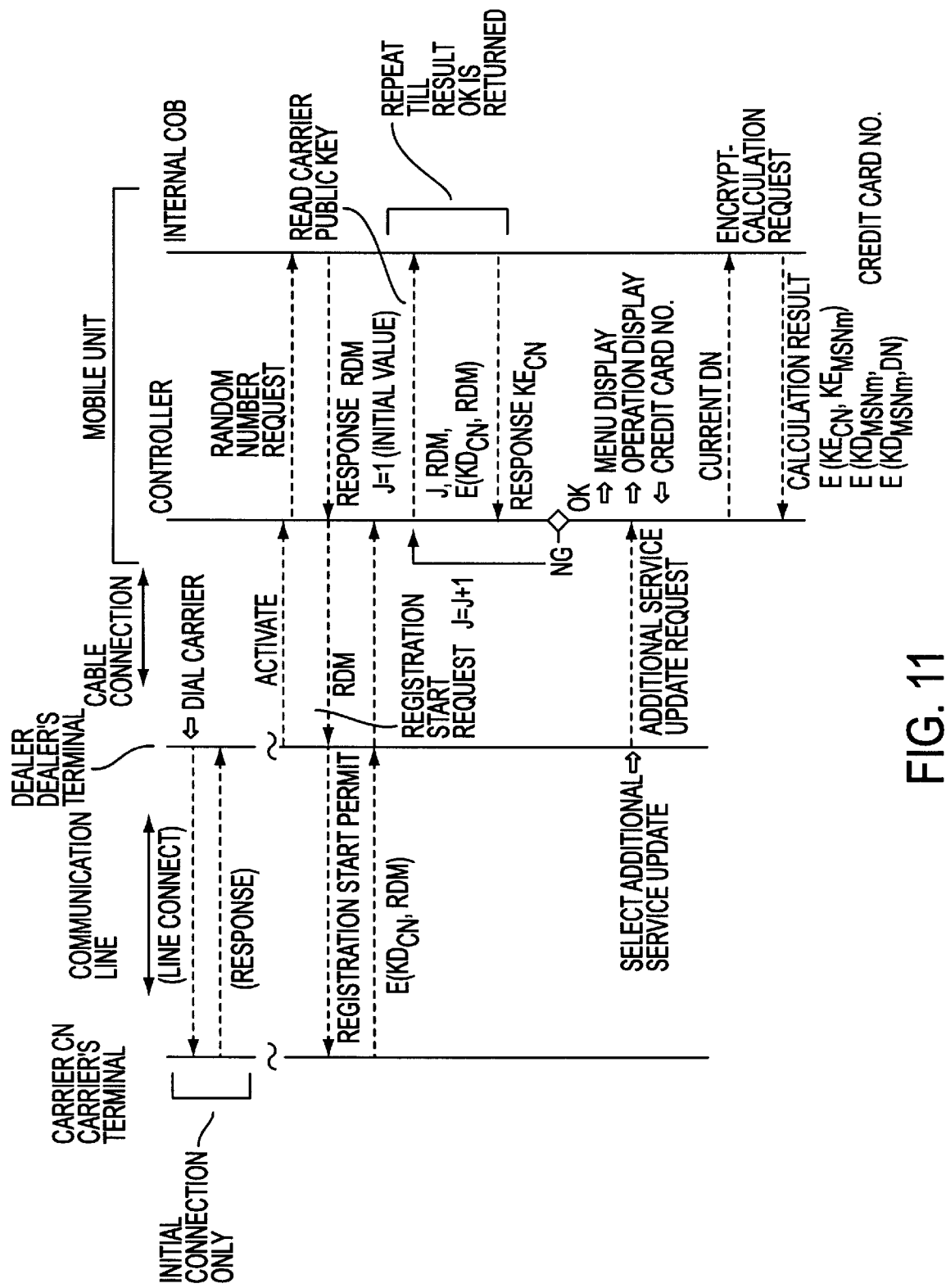
FIG. 11 is a diagram showing the first half of a sequence for updating the contents of additional services.
Figure 12:
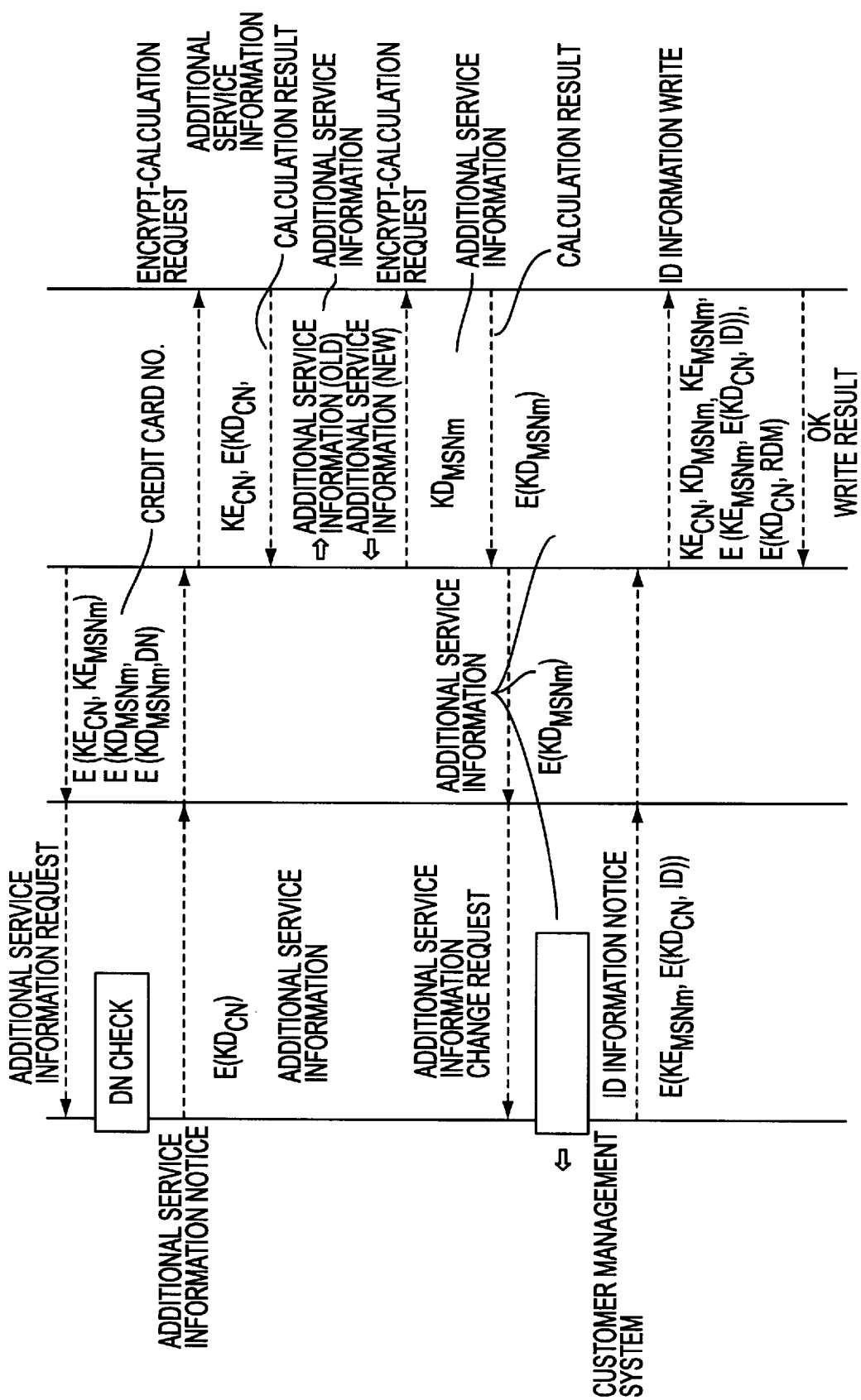
FIG. 12 is a diagram showing the second half of the sequence for updating the contents of additional services.

Updating the contents of additional services is performed in the sequence shown in FIGS. 11 and 12 which is similar to the above sequence. Depending on the kind of additional service to be added, it may become necessary to change the ID information (e.g., dial lock, call waiting, etc.); therefore, the ID information is always sent and written in even if there is no change.

Figure 13:
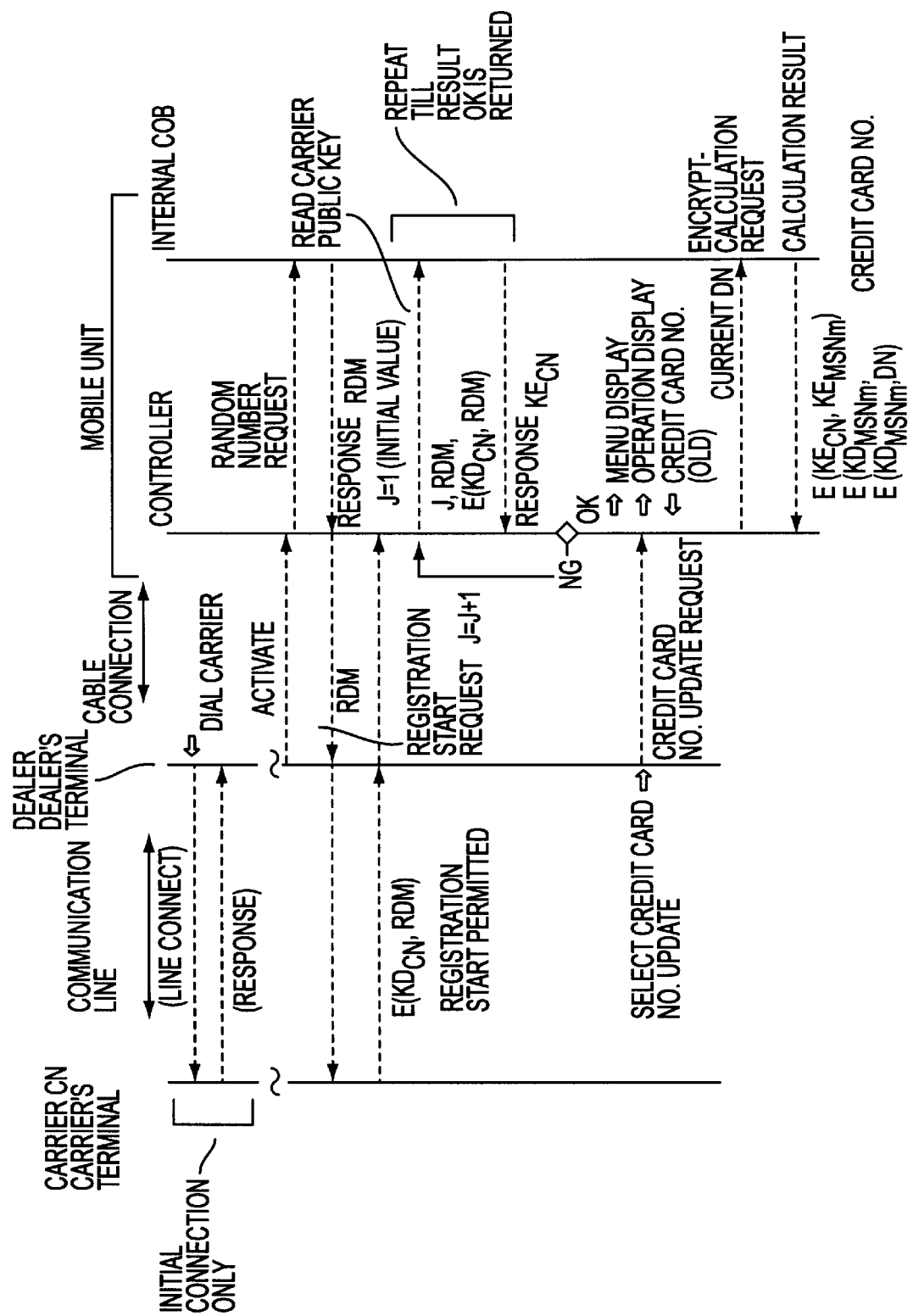
FIG. 13 is a diagram showing the first half of a sequence for updating a credit card number.
Figure 14:
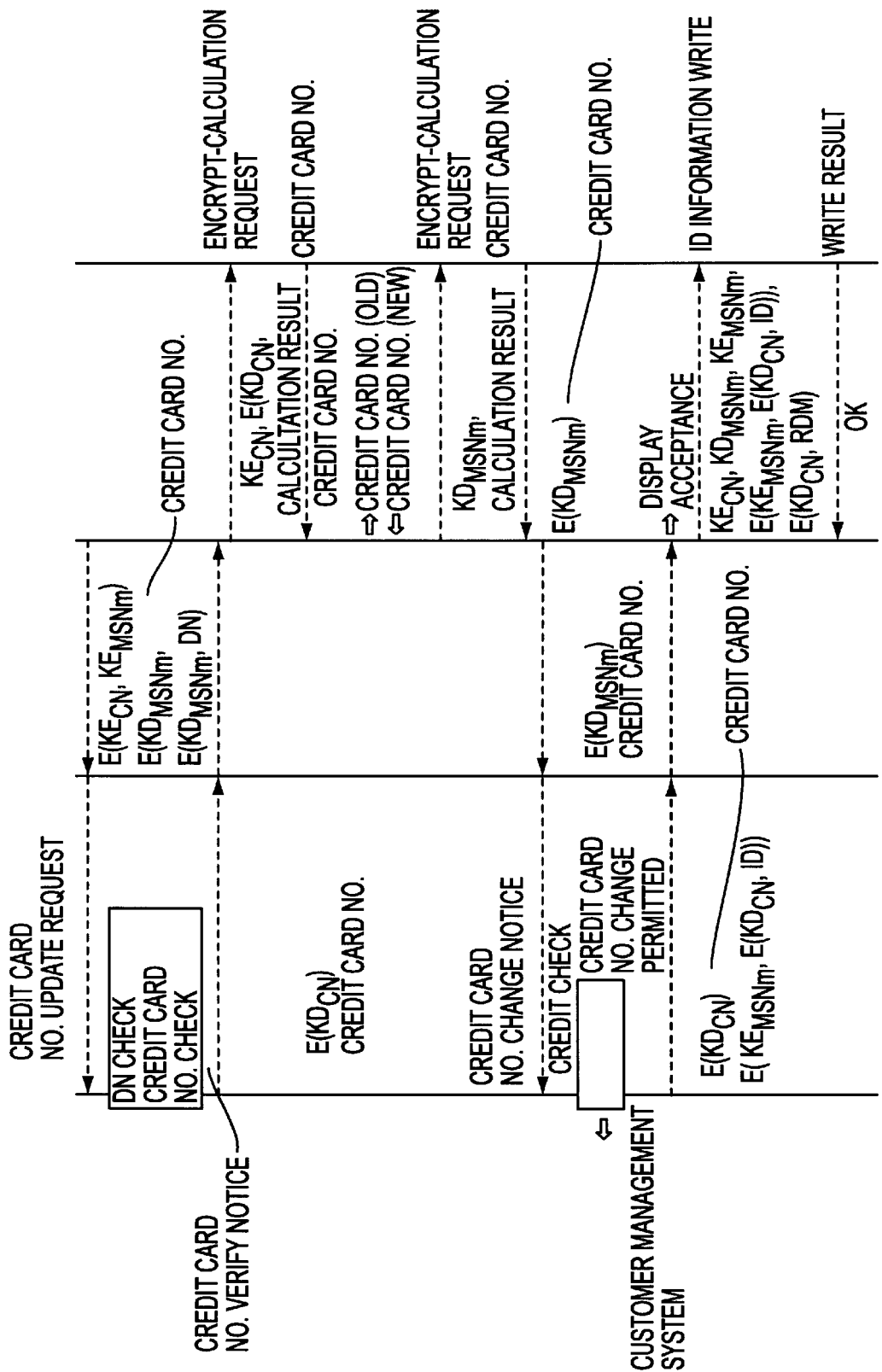
FIG. 14 is a diagram showing the second half of the sequence for updating a credit card number.

Updating the credit card number is also performed in a similar sequence, as shown in FIGS. 13 and 14.

Figure 15:
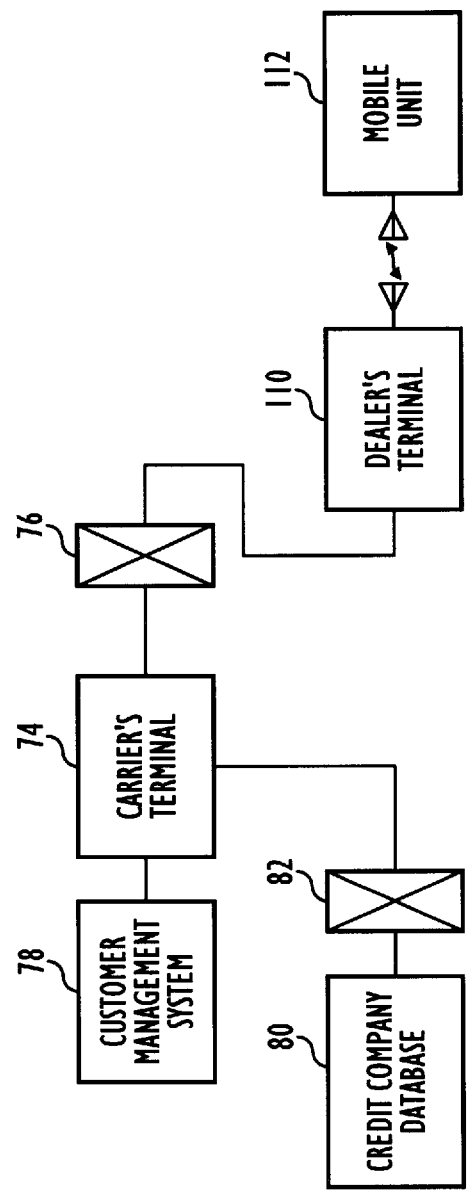
FIG. 15 is a diagram for explaining a mobile unit registration method according to another embodiment of the present invention.

FIG. 15 is a diagram for explaining a method of mobile unit registration according to another embodiment of the present invention. The same component elements as those shown in FIG. 5 are designated by the same reference numerals, and description of such elements will not be repeated here. In this embodiment, a dealer's terminal 110 and a mobile unit 112 are connected not by a cable but by radio (power-conserving radio) that uses very low power.

Figure 16:
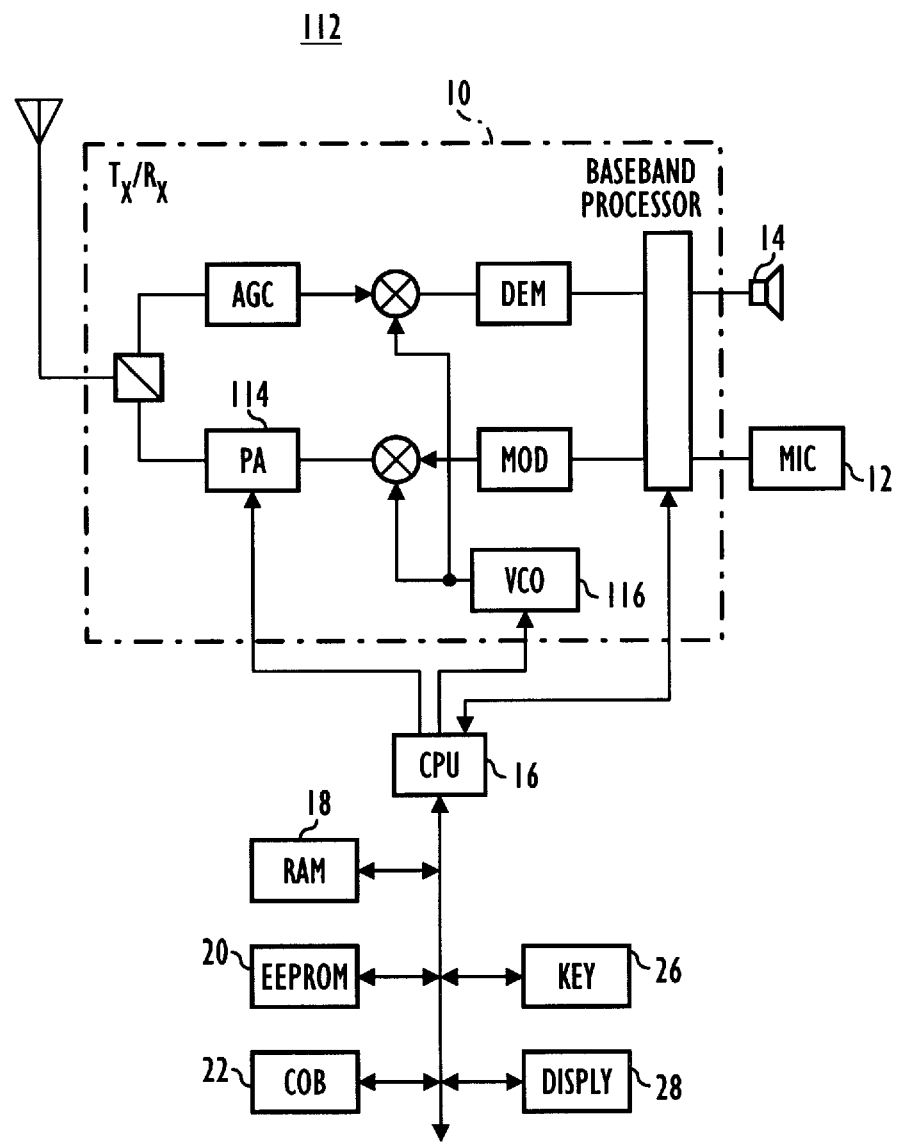
FIG. 16 is a block diagram showing the configuration of a mobile unit 112 shown in FIG. 15.

FIG. 16 is a block diagram showing the configuration of the mobile unit 112 shown in FIG. 15. The same component elements as those shown in FIG. 1 are designated by the same reference numerals.

A power amplifier 114 contained in the transmitter of the radio unit 10 provides a transmitting power which is selectable by an instruction from the CPU 16. During the registration process, the CPU 16 switches the power of the power amplifier 114 to very low power and the frequency of a voltage-controlled oscillator 116 to a frequency capable of transmitting and receiving a predetermined frequency for registration processing. This allows the transmission and reception of signals to and from the dealer's terminal without using a cable. Furthermore, since the power of the power amplifier 114 is switched to very low power, the ID information is prevented from being intercepted with radiowaves leaking outside the housing, and also, consumption of the battery of the mobile unit can be reduced during ID writing.

Figure 17:
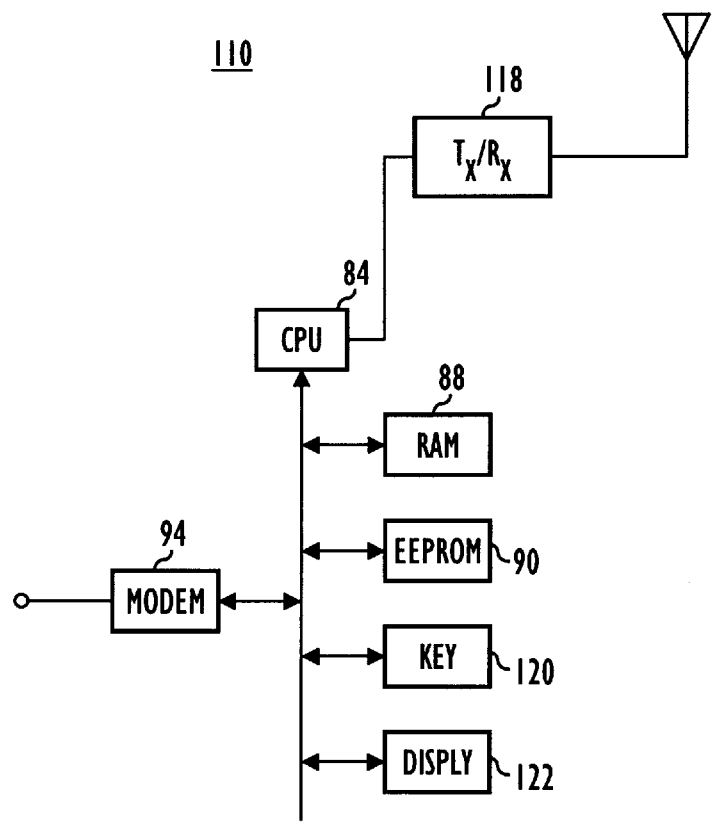
FIG. 17 is a block diagram showing the configuration of a dealer's terminal 110 shown in FIG. 15.

FIG. 17 is a block diagram showing the configuration of the dealer's terminal shown in FIG. 15. The same component elements as those shown in FIG. 6 are designated by the same reference numerals.

In FIG. 17, a CPU 84 is coupled to the mobile unit 112 by power-conserving radio via a radio unit 118 operating on the predetermined frequency for registration processing. During registration, the mobile unit 112 is placed inside the housing of the dealer's terminal 110 for increased security, as will be described later. Consequently, since the keys and display on the mobile unit cannot be used for registration processing, a keypad 120 includes keys, such as numeric keys, necessary for registration processing, in addition to the key for operation selection, and further, a display 122 is added.

Figure 18:
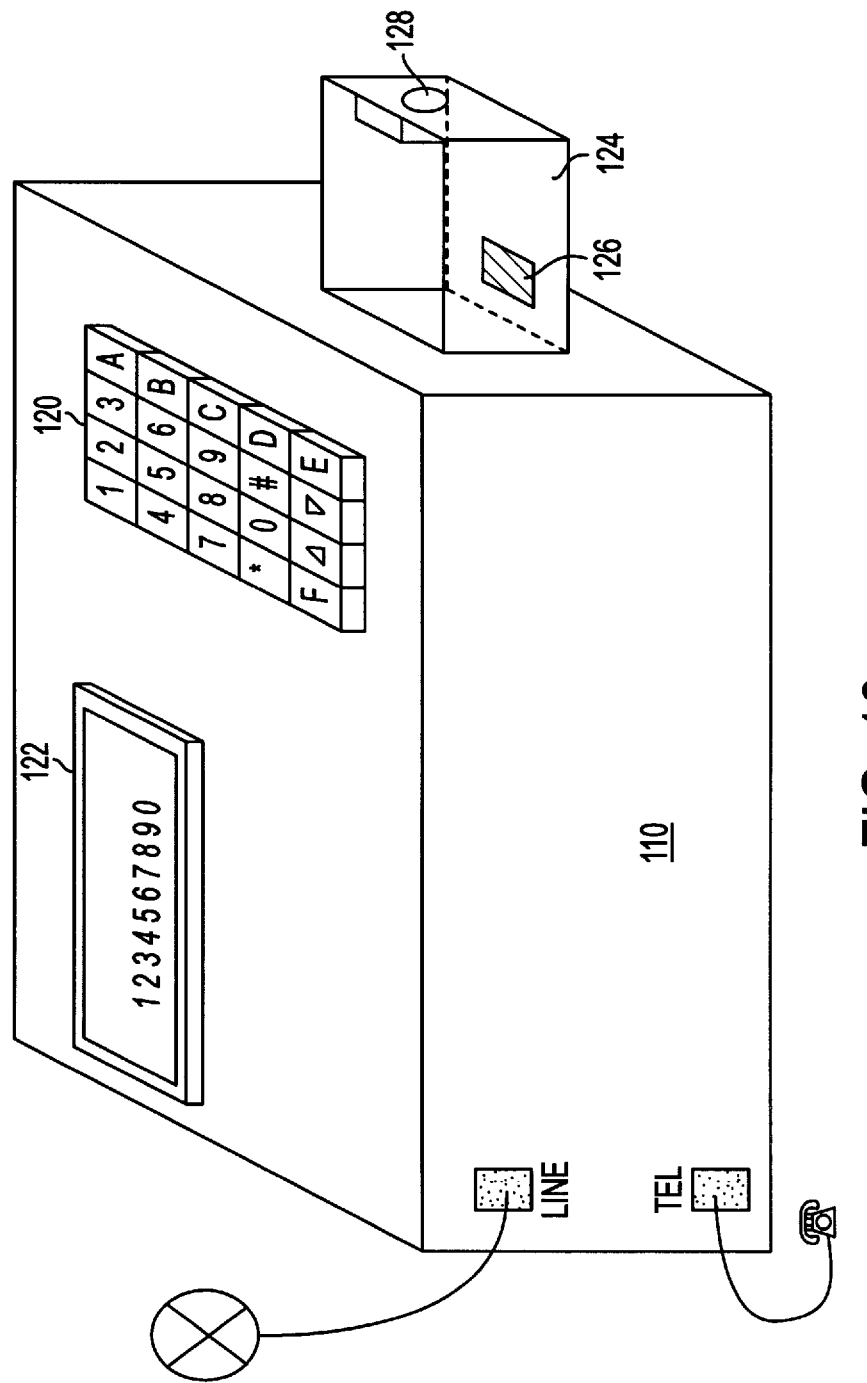
FIG. 18 is a perspective view showing an external appearance of the dealer's terminal 110.

FIG. 18 is a diagram providing an external view of the dealer's terminal 110. The mobile unit is placed sideways in a drawer 124 provided in one side in such a manner that its antenna is coupled with a flat print antenna 126 formed on an inner surface of the drawer 124. The drawer 124 is then pushed in and locked with a key 128, which turns on the power to the dealer's terminal 110. The registration of the mobile unit, updating of the ID information, changing of additional services, and changing of the credit card number are performed, preferably in accordance with the respective sequences described with reference to FIGS. 7 to 14. However, if the security of the communication line and the authentication of the carrier and mobile manufacturer are not needed, the steps of encryption, digital signature, etc. may be omitted. Furthermore, the registration procedure may be performed off-line instead of connecting on-line to the carrier's terminal, in which case the modem 94 is not needed. In this case, however, it is required that an expected number of mobile unit registrations at the dealer be predicted and, based on the prediction, a sufficient number of ID information sets be provided in advance from the communications carrier.

In this embodiment, since the dealer's terminal 110 and the mobile unit 112 are connected not by a cable but by power-conserving radio, the mobile unit need not be provided with a connector for cable connection. This allows a further reduction in the size of the mobile unit. Furthermore, by providing a transmitting power selection function within the mobile unit, as previously described, the antenna and transmit/receive circuitry provided for the mobile unit to communicate with the base station can also be used for transmission and reception of signals to and from the dealer's terminal. Also, since the dealer's terminal does not require cables for connection with different mobile unit models, the dealer need not have different ROM writers for different models. Moreover, since no metal contacts are exposed on the mobile unit for connection with a ROM writer, the construction serves to reduce the possibility of the personal information being stolen through such contacts.

Figure 19:
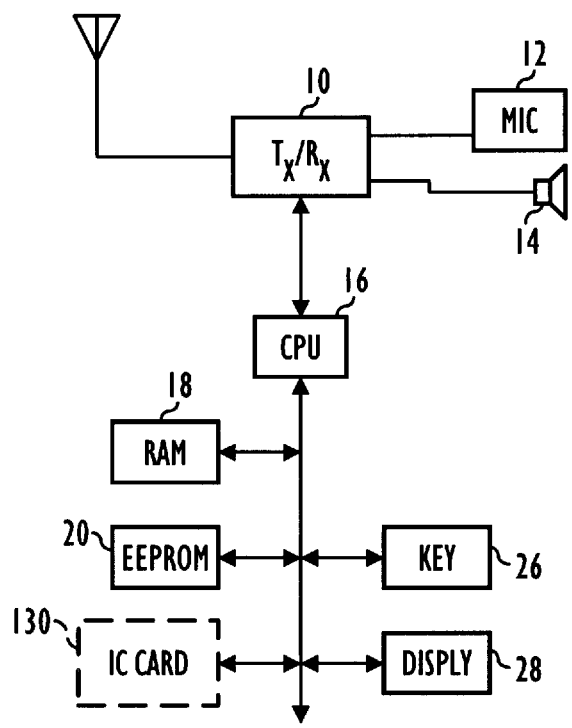
FIG. 19 is a block diagram showing the configuration of an IC card insertion type mobile unit according to another embodiment of the present invention.

FIG. 19 is a block diagram showing the configuration of an IC card insertion type mobile unit according to another embodiment of the present invention. The same component elements as those of the ID containing type mobile unit shown in FIG. 1 are designated by the same reference numerals. As compared with the ID containing type mobile unit of FIG. 1 in which the ID information is written in the COB device 22, the IC card insertion type mobile unit of FIG. 19 is enabled to be connected to the communication network when an IC card 130 holding the ID information is inserted into the mobile unit. Therefore, no control programs for registration processing are contained in the EEPROM 20 in the mobile unit.

Figure 20:
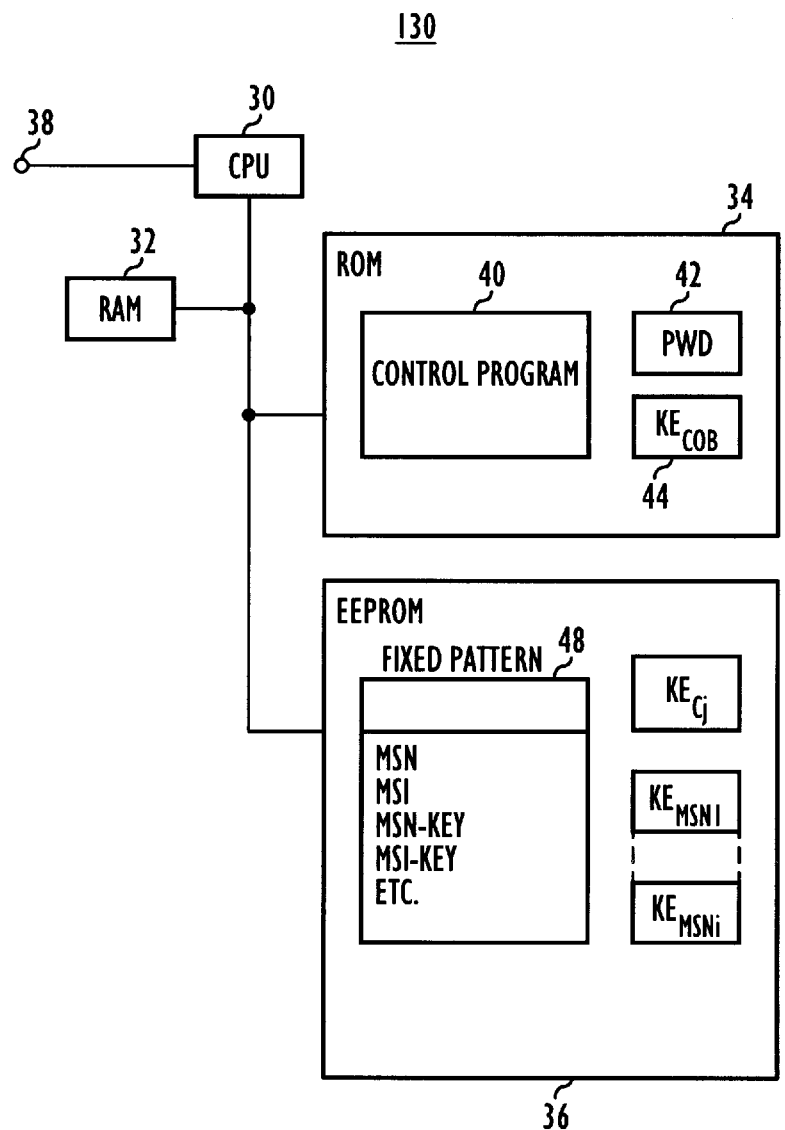
FIG. 20 is a block diagram showing the configuration of an IC card 130.

FIG. 20 is a block diagram showing the configuration of the IC card 130. The IC card 130 has a similar configuration to that of the COB device 22 shown in FIG. 2, and the same component elements are designated by the same numerals as those shown in FIG. 2. In the IC card 130, as in the COB device 22, the contents of the EEPROM 36 cannot be read out or written in unless specific commands are given to the CPU 30. The contents of the ROM 34 are written in during the manufacture of the IC card and are not alterable.

The EEPROM 36 contains the carrier public key $KE_{Cj}$ and mobile unit public key $KE_{MSNi}$ as well as the personal information 48. Unlike the ID containing type mobile unit, since one IC card can be used for only one communications network, only one $KE_{Cj}$ is stored; on the other hand, since the mobile unit capable of being connected to the communications network may be available in more than one model, the IC card is designed to be capable of storing more than one $KE_{MSNi}$. $KE_{Cj}$, $KE_{MSNi}$, and personal information are written in when registering the IC card to the communications network. In cases where the IC cards are intended for a particular communications network, it is preferable that each IC card be fabricated with $KE_{Cj}$ presaved during manufacture before shipment. In this case, it is preferable that $KE_{Cj}$ be written into the ROM 34 instead of the EEPROM 36; then, the common public key $KE_{COB}$ and password PWD need not be written into the ROM 34. Details of command accepted by the IC card will be described later.

Figure 21:
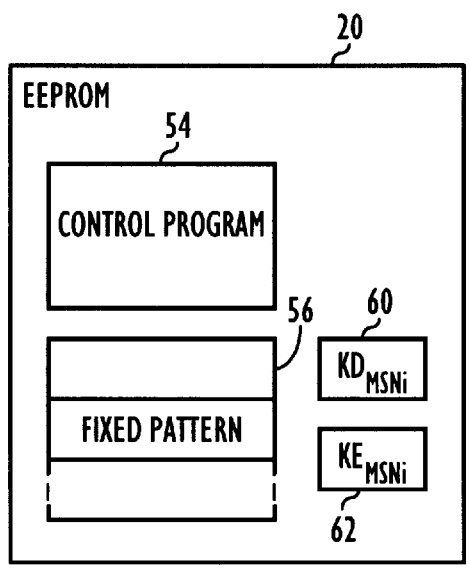
FIG. 21 is a diagram schematically showing the data stored in an EEPROM shown in FIG. 19.

FIG. 21 schematically shows the data stored in the EEPROM 20 of the mobile unit shown in FIG. 19. The data construction is substantially the same as that for the ID containing type mobile unit shown in FIG. 3; differences are that the personal data write flag 58 of FIG. 3 is omitted and that the control program 54 does not contain programs for registration processing as previously described.

Figure 22:
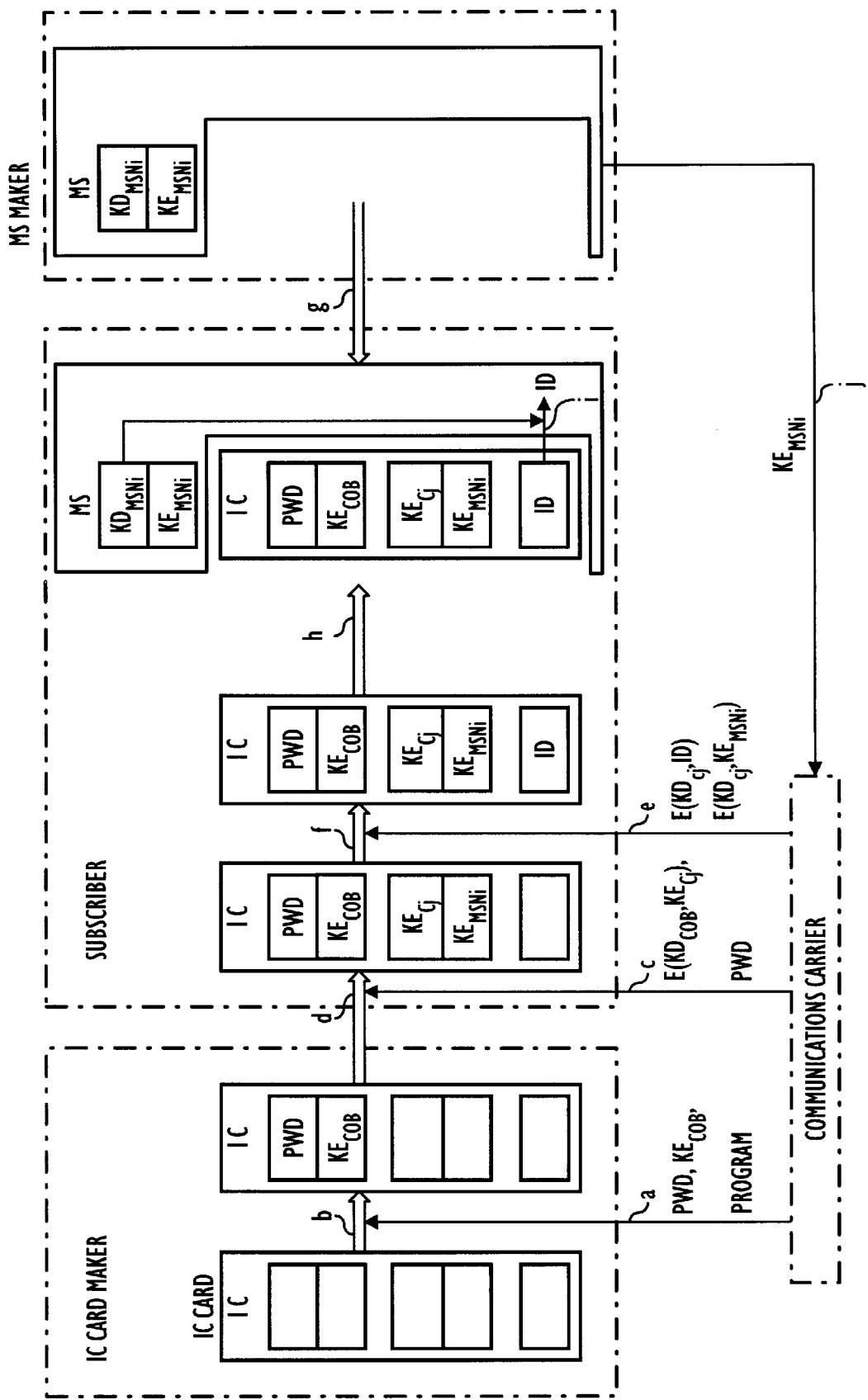
FIG. 22 is a diagram for explaining the outline of an IC card registration method according to the present invention.

FIG. 22 is a diagram for explaining the outline of a method of IC card registration according to the present invention. A load module containing password PWD, common public key $KE_{COB}$ and control program data is supplied from the communications carrier to the IC card manufacturer responsible for the manufacture of the IC card (step a), where the data are written into the ROM of the IC card (step b) which is then shipped. The process up to this point is the same as the process up to the shipment of the COB device for the ID containing type mobile unit previously described with reference to FIG. 4. When the module unit that the mobile unit manufacturer manufactures is authorized by the communications carrier, $KE_{MSNi}$ for that model of mobile unit is registered with the communications carrier (step j). In registering the IC card, first the passwords PWD and $E(KD_{COB}, KE_{Cj})$ are received from the communications carrier (step c), and $KE_{Cj}$ is written into the IC card (step d). If $KE_{Cj}$ is already written in the IC card at the IC card manufacturer before shipment, as previously described, the above process is not necessary; the elimination of this process is desirable from the standpoint of avoiding the problem of leakage of the password PWD. Next, $E(KD_{Cj}$, ID), the personal information ID signature-encrypted with $KD_{Cj}$, and $E(KD_{Cj}, KE_{MSNi})$, the registered $KE_{MSNi}$ signatureencrypted with $KD_{Cj}$, are received from the communications carrier (step e), and the personal ID and $KE_{MSNi}$ are written into the EEPROM contained in the IC card (step f). On the other hand, the mobile unit with $KD_{MSNi}$ and $KE_{MSNi}$ written in its EEPROM is shipped from the mobile unit manufacturer (step g). When the IC card with ID written therein is inserted into the mobile unit (step h), the ID can be read by the mobile unit by using $KD_{MSNi}$. When there are a plurality of mobile unit models authorized for use in the communications network to which the IC card is registered, $KE_{MSNi}$'s for all such models are supplied from the communications carrier and stored on the IC card.

Like the ID containing type mobile unit described with reference to FIG. 4, in the above IC card registration method also, the EEPROM of the IC card cannot be read from or written to by directly addressing it, and therefore, simply copying the IC card is not possible. To read out the personal information, one has to know the mobile unit secret key $KD_{MSNi}$, and to write in, one has to know the carrier secret key $KD_{Cj}$. If one knows one or other of the secret keys, he cannot do both reading and writing unless he knows the other; therefore, copying is not possible. Furthermore, the IC card contains $KE_{MSNi}$ for all models authorized for use in the communications network that provides the service; if the IC card is inserted into a mobile unit that does not have $KD_{MSNi}$ corresponding to the $KE_{MSNi}$ held in the IC card, the ID cannot be read by such a mobile unit. This prevents unauthorized mobile units from radiating undesired radiowaves.

Figure 23:
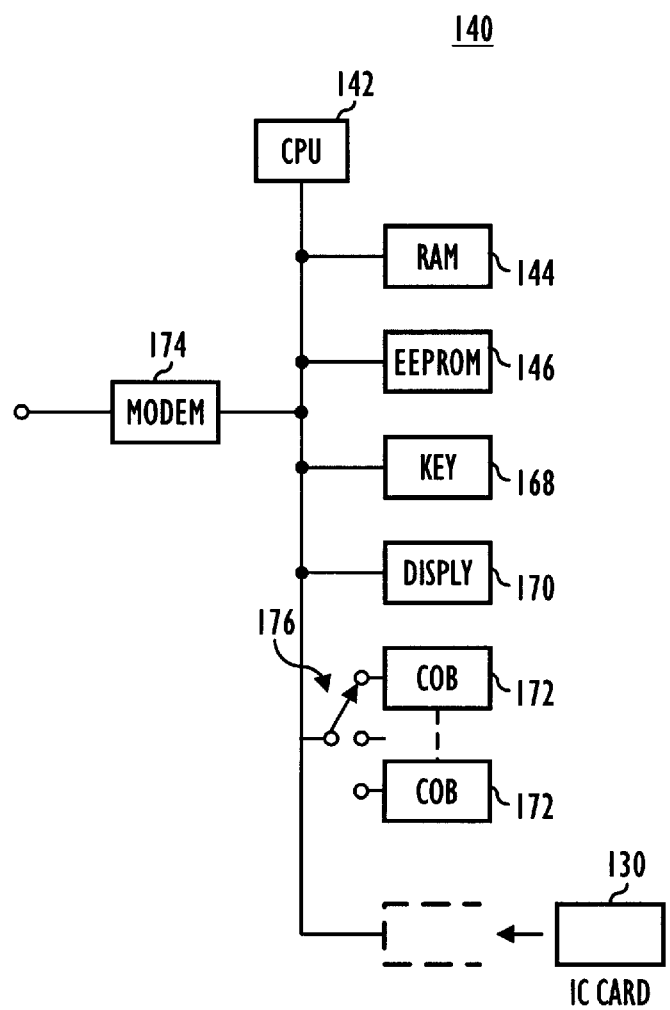
FIG. 23 is a block diagram showing the configuration of an IC card registration terminal.

FIG. 23 is a block diagram showing the configuration of an IC card registration terminal used for on-line registration of the IC card.

This IC card registration terminal is, in fact, identical in construction to the ID containing type mobile unit described with reference to FIGS. 1 to 3, except that the COB device 22, radio unit 10, speaker 12, microphone 14 and control programs required for operation as a mobile unit are removed, while the functions of the dealer's terminal described with reference to FIG. 6 and COB devices supporting a plurality of communications carriers are added. Preferably, this IC card registration terminal is registered with each communications carrier and given unique personal information $ID_{AN}$, like the ID containing type mobile unit. This registration terminal has a registration terminal secret key $KD_{AN}$ and public key $KE_{AN}$ corresponding to the mobile unit secret key $KD_{MSNi}$ and public key $KE_{MSNi}$, respectively. As in the case of the mobile unit, the $KD_{AN}/KE_{AN}$ pair is determined for each model of IC card registration terminal.

Figure 24:
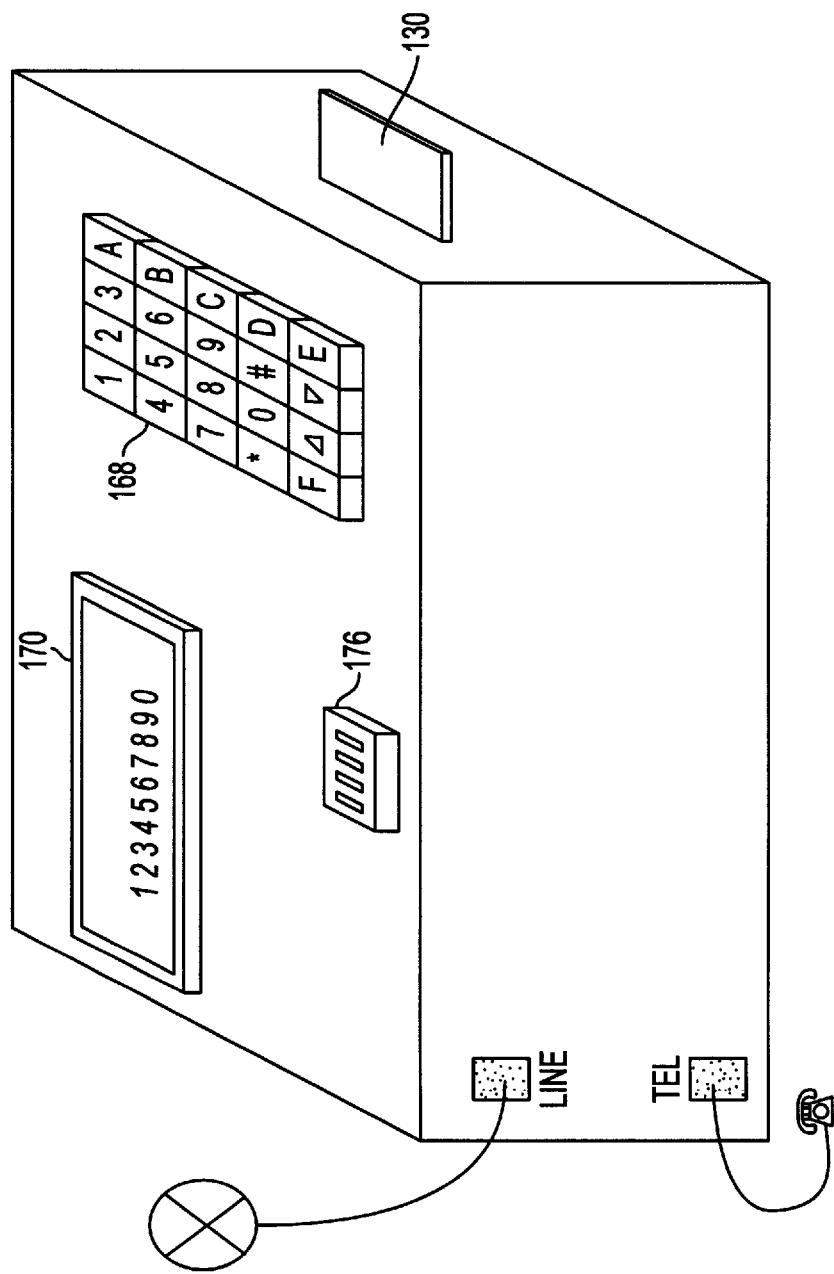
FIG. 24 is a perspective view showing an external appearance of the IC card registration terminal.

As shown in FIG. 23, the IC card registration terminal 140 has a CPU 142 to which are connected a RAM 144, an EEPROM 146, a keypad 168, a display 170, a plurality of COB devices 172, and a modem 174. The COB devices are provided one for each of the communications networks to which the IC card registration terminal can register, one of them being selected by means of a selector switch 176. FIG. 24 shows an external view of the IC card registration terminal.

Figure 25:
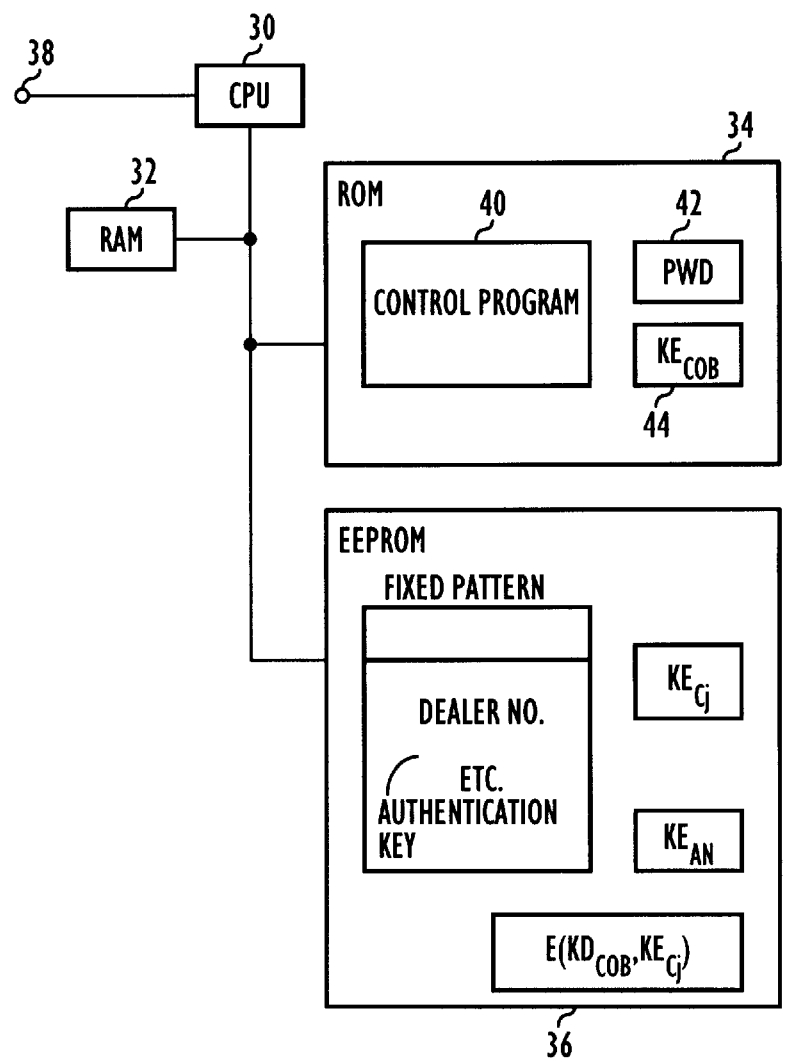
FIG. 25 is a block diagram showing the configuration of a COB device 172 shown in FIG. 23.

FIG. 25 is a block diagram showing the configuration of the COB device 172. Each COB device 172 contained in the IC card registration terminal, shown in FIG. 25, has a similar configuration to that of the COB device 22 contained in the ID containing type mobile unit, shown in FIG. 2, and the IC card shown in FIG. 20. The EEPROM 36 of the COB device 172 stores therein personal information of the IC card registration terminal, which includes the number of the dealer at which the IC card registration terminal is installed, an authentication key of the IC card registration terminal, etc. In addition to $KE_{Cj}$, the registration terminal public key $KE_{AN}$ and signature data $E(KD_{COB}, KE_{Cj})$, which is $KE_{Cj}$ signature-encrypted with $KD_{COB}$, are stored.

The contents of the ROM 34 of the COB device 172 are written in during the manufacture of the COB device 172, and are not alterable. Of the contents of the EEPROM 36, $KE_{Cj}$ and $E(KD_{COB}, KE_{Cj})$ are written in during the manufacture of the IC card registration terminal, and after the IC card registration terminal is delivered to the dealer, $KE_{AN}$ and the personal information are written in for the registration of the IC card registration terminal with the communications carrier before starting the IC card registration service.

Figure 26:
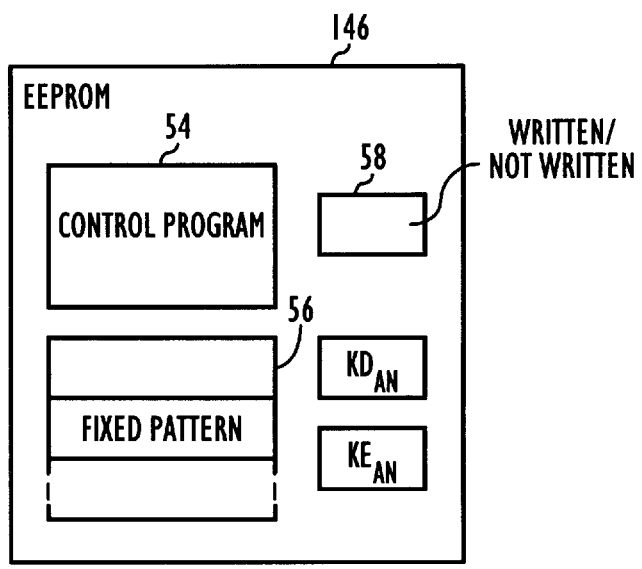
FIG. 26 is a diagram schematically showing the data stored in an EEPROM 146 shown in FIG. 23.

FIG. 26 schematically shows the data stored in the EEPROM 146 of the IC card registration terminal 140 necessary when the IC card is shipped from the IC card manufacturer with $KE_{Cj}$ already written therein.

As in the case of the ID containing type mobile unit, it is essential to know the carrier secret key $KD_{Cj}$ if it is desired to write the terminal's personal information $ID_{AN}$ into the COB device contained in the IC card registration terminal, and it is essential to know the registration terminal's secret key $KD_{AN}$ if it is desired to read out $ID_{AN}$. Accordingly, making a duplicate of the IC card registration terminal is virtually impossible.

Table 2 is a listing of commands that are accepted by the COB device 172 contained in the IC card registration terminal 140.

TABLE 2

Input/Output Specification for Internal COB Device of IC Card Registration Terminal

| Item No. | Command description | Input information | Output information | Condition for guaranteeing output |
| --- | --- | --- | --- | --- |
| 1 | Supervisor mode set | PWD | Setting result (OK/NG) | To match PWD in ROM |
| *3 Note | Signature data write | $E(KD_{COB}, KE_{cj})$ | Write result (OK/NG) | |
| *4 Note | Carrier public key write | $E(KD_{COB}, KE_{cj})$ | Write result (OK/NG) | $KE_{cj} \neq 0, 1$ |
| 5 | Signature data read | | $E(KD_{COB}, KE_{cj})$ | |
| 6 | Registration terminal public key registration | $E(KD_{cj}, KE_{AN})$ | Write result (OK/NG) | $KE_{cj}$ is already registered |
| 8 | ID information write | $KD_{AN}$, $E(KE_{AN}, E(KD_{cj}, ID_{AN}))$, $E(KD_{cj}, RDM)$ | Write result (OK/NG) | $KE_{cj}$ is already registered, and calculation result of $E(KE_{cj}, E(KD_{cj}, RDM))$ coincides with RDM in RAM. |
| 9 | ID information read | $KD_{AN}$ | $ID_{AN}$ | $KE_{AN}$ is already registered |
| 10 | RDM read (set) | None | RDM (different random number each time) | |
| 11 | Carrier public key read | j (carrier number), A, $E(KD_{cj}, A)$ A is any integer ($\neq 0, 1$) | $KE_{cj}$, Read result (OK/NG) | $KE_{cj}$ (j = carrier number) is already registered, and input value A coincides with calculation result of $E(KE_{cj}, E(KD_{cj}, A))$. |
| 12 | E(K, A) read | K (key) A (Value to be encrypted) | E(K, A) (Used in any conversion calculation) | |

NOTE:
The command of *3 and *4 are operative only in supervisor mode. (Returns to normal mode at completion of each command)

shown in FIG. 23. As in the EEPROM 20 of the ID containing type mobile unit shown in FIG. 3, the control program 54, fixed patterns 56, and ID write flag 58 are stored, and instead of the $KD_{MSNi}/KE_{MSNi}$ pair, the $KD_{AN}/KE_{AN}$ pair is stored. These are written in during the manufacture of the IC card registration terminal; of these data, the ID write flag is updated when the personal information has been written in.

Figure 27:
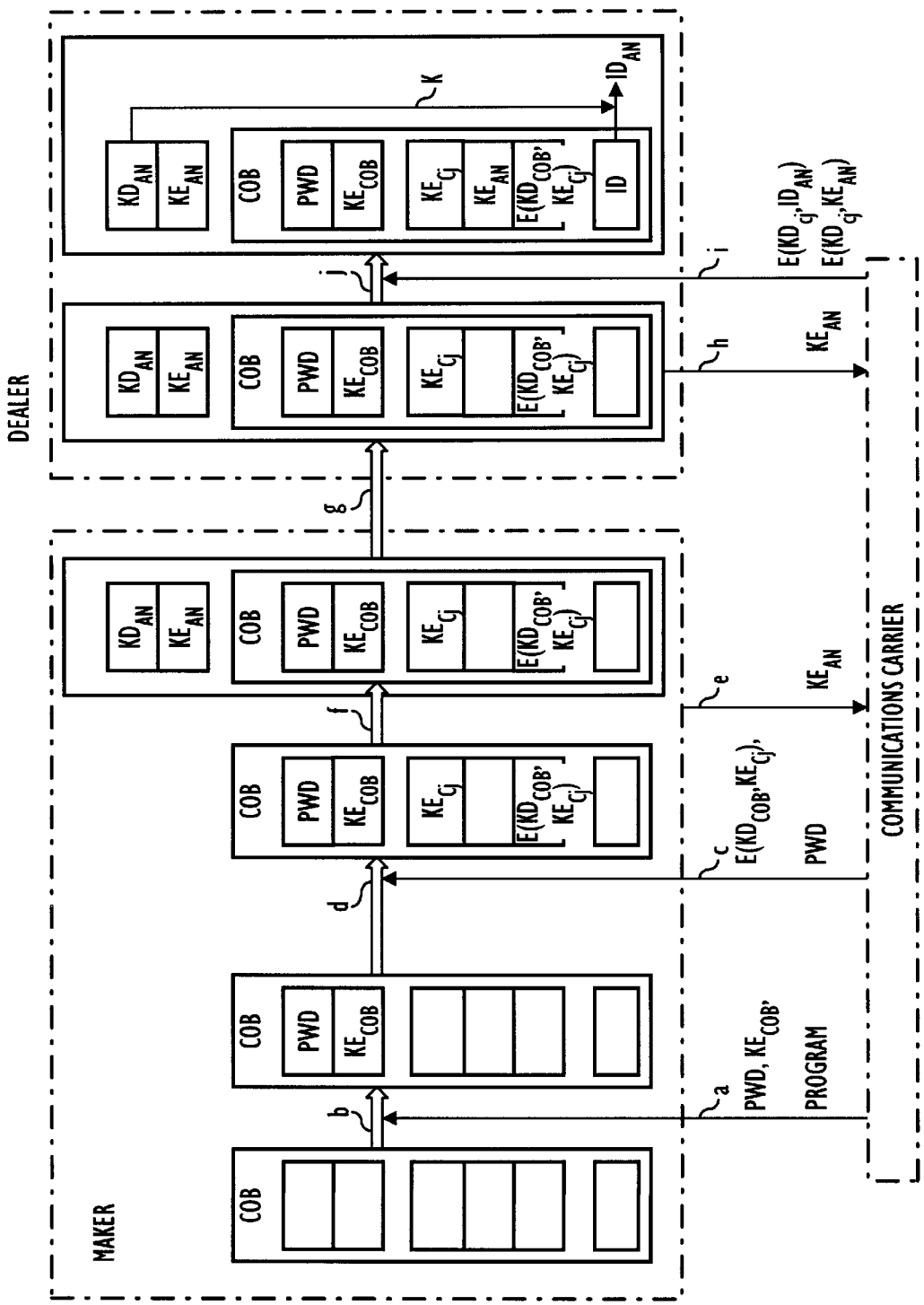
FIG. 27 is a diagram showing the outline of a process up to the registration of the IC card registration terminal.

FIG. 27 is a diagram for explaining an outline of the process from the manufacture to the registration of the IC card registration terminal. The process shown is substantially the same as that for the ID containing type mobile unit registration described with reference to FIG. 4, but the $KD_{MSNi}/KE_{MSNi}$ pair is replaced by the $KD_{AN}/KE_{AN}$ pair. Furthermore, the signature data $E(KD_{COB}, KE_{Cj})$ received from the communications carrier in step c is not only decrypted with $KE_{COB}$ and written in $KE_{Cj}$, but also written in the encrypted form into the COB device in step d. This is necessary because data signature-encrypted with $KD_{Cj}$ needs to be entered when writing $KE_{Cj}$ into the IC card during the IC card registration process, but this is not The commands are substantially the same as those shown in Table 1 for the COB device 22 of the ID containing type mobile unit. The differences are that the commands for writing and reading the signature data $E(KD_{COB}, KE_{Cj})$ are added as commands of item Nos. 3 and 5, that $KD_{MSNi}$ and $KE_{MSNi}$ are replaced by $KD_{AN}$ and $KE_{AN}$ in commands of item Nos. 6, 8, and 9, and that $KE_{Cj}$ is not input with commands of item Nos. 6 and 8. The command of item No. 3 is entered in supervisor mode. KECj is not input with commands of item Nos. 6 and 8 because no selection is necessary since only one KECj is stored in the COB device 172. However, for standardization of the process, KECj may be input for comparison with the stored KECj.

Figure 28:
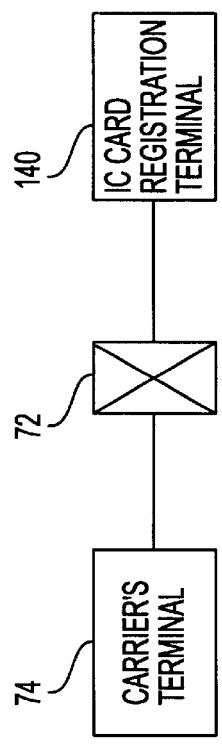
FIG. 28 is a diagram showing a setup for a registration procedure for the IC card registration terminal.

FIG. 28 is a diagram showing a setup in which the IC card registration terminal delivered to the dealer is registered with the communications carrier to effect the IC card registration service before the dealer starts the registration service. In FIG. 28, the telephone number of the carrier's terminal 74 installed at the communications carrier is dialed from the IC card registration terminal delivered to the dealer, whereupon the IC card registration terminal 140 is connected to the carrier's terminal 74 via a public network 72 and a registration sequence for the registration of the IC card registration terminal is initiated.

Figure 29:
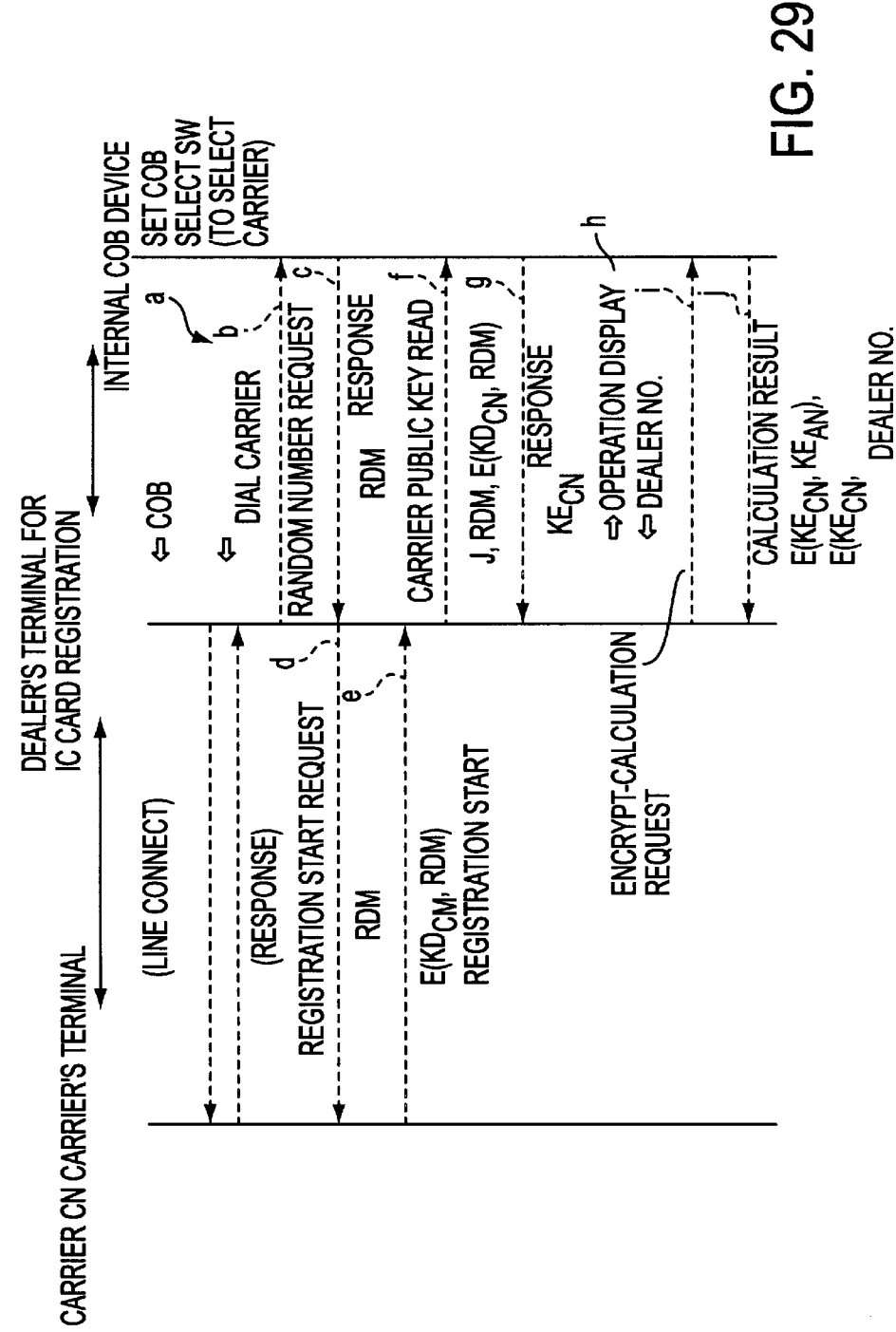
FIG. 29 is a diagram showing the first half of a registration sequence for the IC card registration terminal.
Figure 30:
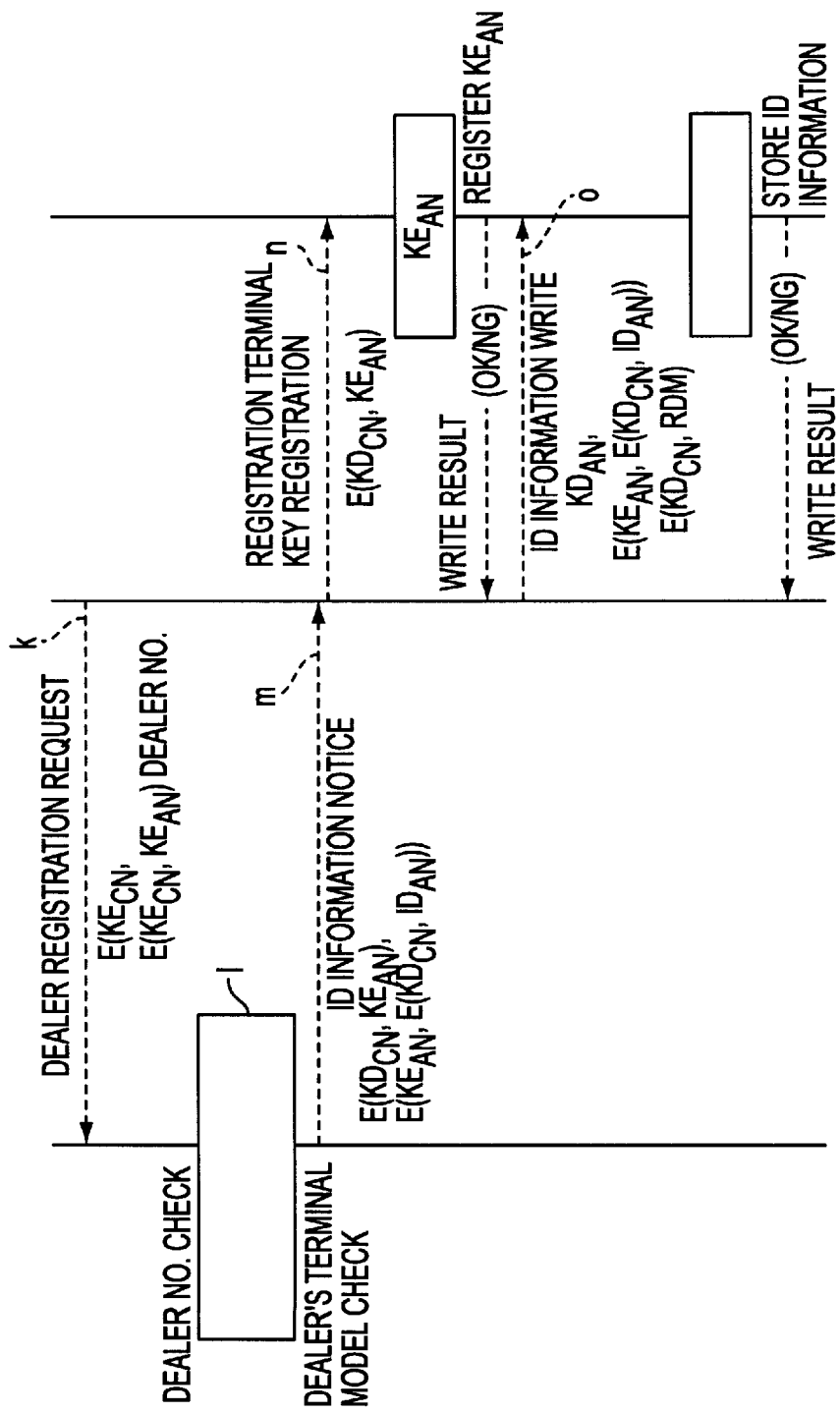
FIG. 30 is a diagram showing the second half of the registration sequence for the IC card registration terminal.

FIGS. 29 and 30 show the registration sequence for registering the IC card registration terminal with the communications carrier. Registration with any additional communications carrier is performed in the same sequence.

In FIG. 29, first the COB device selector switch 176 (see FIGS. 23 and 24) is set to select the COB device holding the public key $KE_{CN}$ of the desired carrier CN, and the telephone number of that carrier's terminal is dialed to request a connection. When the carrier's terminal responds, the command of item No. 10 in Table 2 is entered into the internal COB device (step b), and the random number RDM is received (step c). At this time, the value of RDM is also stored into the RAM of the COB device. Upon receiving the random number RDM, the IC card registration terminal stores the same into its RAM, and at the same time, sends a registration start request message, containing the random number RDM, to the carrier's terminal (step d). Upon receiving the random number RDM, the carrier's terminal signature-encrypts the received random number RDM with the carrier secret key $KD_{CN}$, and returns the result $E(KD_{CN}, RDM)$ (step e). Upon receiving $E(KD_{CN}, RDM)$, the IC card registration terminal sends the command of item No. 11 in Table 2, containing the received $E(KD_{CN}, RDM)$, the RDM stored in its RAM, and the integer J (J=1), to the internal COB (step f) to read out the carrier public key $KE_{CN}$ (step g). Next, a message is displayed on the display prompting the operator to input the dealer number; when the dealer number is entered (step h), the command of item No. 12 in Table 2 is entered twice to request the internal COB for encrypt calculation (step i), as a result of which $E(KE_{CN}, KE_{AN})$, the registration terminal public key $KE_{AN}$ encrypted with the carrier public key $KE_{CN}$, and $E(KE_{CN},$ dealer number), the dealer number encrypted with $KE_{CN}$, are received (step j).

Referring next to FIG. 30, the registration terminal sends a registration request message, containing the above data, to the carrier's terminal (step k). The carrier's terminal decrypts the data using the carrier secret key $KD_{CN}$, to derive the dealer number and $KE_{AN}$, which are then compared with the dealer numbers and $KE_{AN}$'s stored in the carrier's terminal for a match (step l). If a match is found, $E(KD_{CN}, KE_{AN})$, $KE_{AN}$ signature-encrypted with $KD_{CN}$, and $E(KE_{AN}, E(KD_{CN}, ID_{AN}))$, the registration terminal ID assigned to the registration terminal signature-encrypted with $KD_{CN}$ with the result further encrypted with $KE_{AN}$, are sent back (step m). Upon receiving these data, the registration terminal writes $KE_{AN}$ into the internal COB device by using the command of item No. 6 (step n), and $ID_{AN}$ into the same by using the command of item No. 8 (step o).

Figure 31:
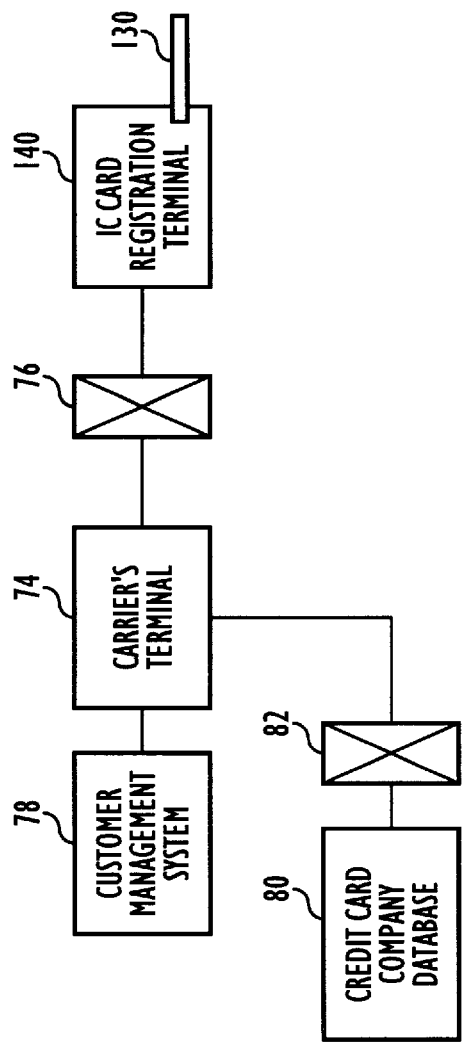
FIG. 31 is a diagram showing a setup for an IC card registration procedure.

FIG. 31 is a diagram showing a setup in which the IC card 130 is registered with the communications carrier by using the IC card registration terminal 140. The same reference numerals are appended to the same component elements as those shown in FIG. 5 that illustrates the registration setup for the ID containing type mobile unit. When registering the IC card by connecting the IC card registration terminal 140 to the communications carrier via a public network 76, the IC card registration terminal 140 needs to be authenticated by using the $ID_{AN}$ stored in its internal COB.

Figure 32:
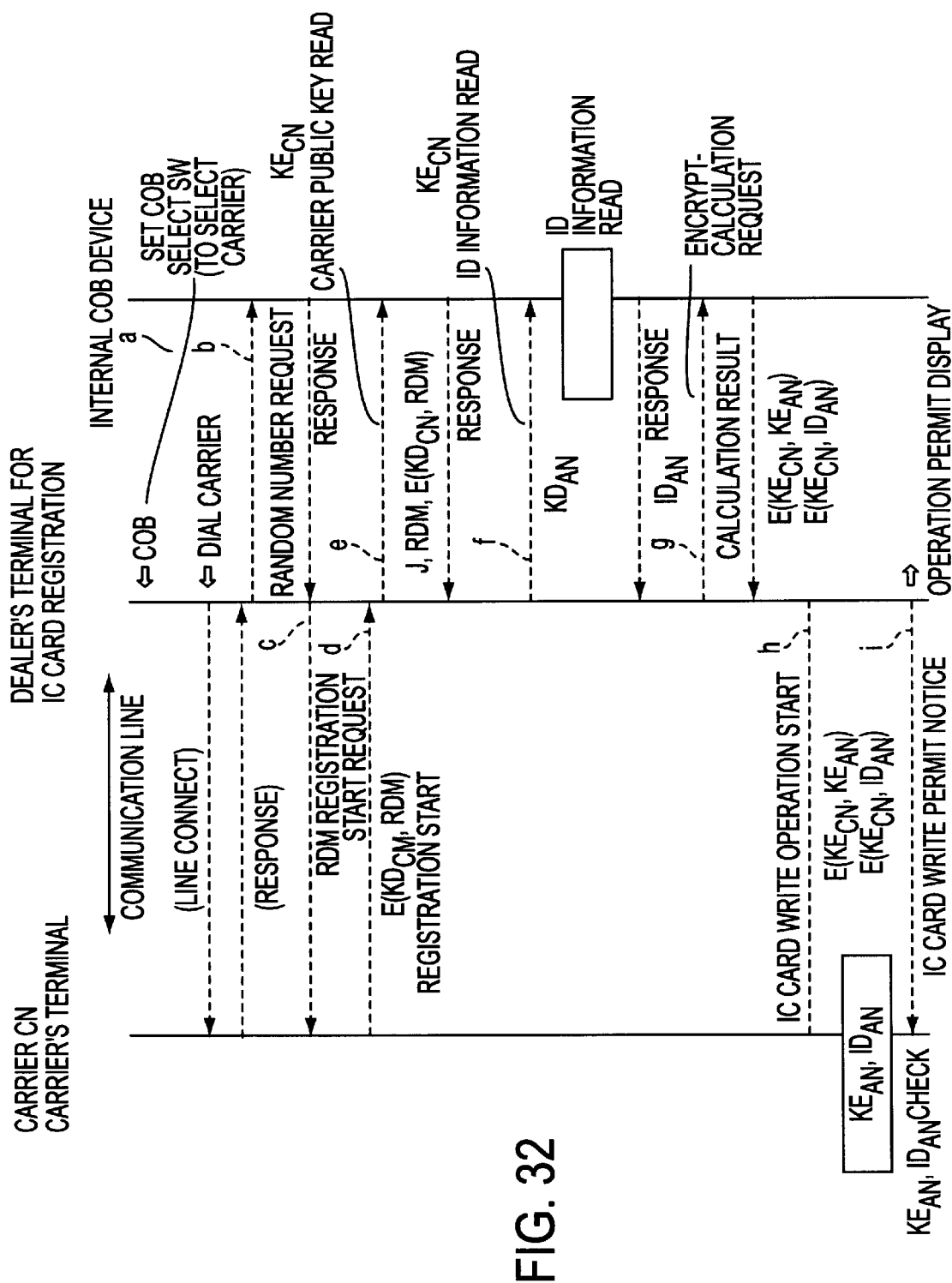
FIG. 32 is a diagram showing a processing sequence for the authentication of the IC card registration terminal.

FIG. 32 shows a sequence for the authentication of the IC card registration terminal. First, the switch 176 is operated to select the COB device corresponding to the communications carrier to which a connection is to be set up, and the telephone number of the carrier's terminal is dialed (step a). When the line is connected, the random number RDM is read out by using the command of item No. 10 (step b), and is transmitted to the carrier's terminal (step c). The carrier's terminal signature-encrypts RDM with $KD_{CN}$ and returns the result $E(KD_{CN}, RDM)$ (step d). The IC card registration terminal enters the command of item No. 11, containing the $E(KD_{CN}, RDM)$ received from the carrier's terminal, the integer J (J=1), and RDM, into the internal COB to read out $KE_{CN}$ (step e). Next, the $KD_{AN}$ stored in the EEPROM 146 is read out, and the command of item No. 9, containing the same, is entered to read out $ID_{AN}$ (step f). Then, the command of item No. 12 is entered twice into the internal COB, to calculate $E(KE_{CN}, KE_{AN})$ and $E(KE_{CN}, ID_{AN})$ (step g), which are then transmitted to the carrier's terminal (step h). Using $KD_{CN}$, the carrier's terminal decrypts the data to recover $KE_{AN}$ and $ID_{AN}$, and if they are correct, sends an IC card write permit notice to the IC card registration terminal (step i), thereby displaying an operation permit message on the display 170.

Table 3 shows a listing of commands that the IC card 130 accepts.

TABLE 3

Input/Output Specification for IC Card

| Item No. | Command description | Input information | Output information | Condition for guaranteeing output |
|---|---|---|---|---|
| 1 | Supervisor mode set | PWD | Setting result (OK/NG) | To match PWD in ROM |
| *4 Note | Carrier public key write | $E(KD_{COB}, KE_{cj})$ | Write result (OK/NG) | $KE_{cj} \neq 0, 1$ |
| 6 | Mobile unit public key registration | $E(KD_{cj}, KE_{MSNi})$ | Write result (OK/NG) | $KE_{cj}$ is already registered |
| 7 | Mobile unit public key erase | $E(KD_{cj}, KE_{MSNi})$ | Write result (OK/NG) (Sorting is also performed) | $KE_{cj}$ is already registered |
| 8 | ID information write | $KD_{AN}$ $E(KE_{AN}, E(KE_{cj}, ID))$, $E(KD_{cj}, RDM)$ | Write result (OK/NG) | $KE_{cj}$ is already registered, and calculation result of $E(KE_{cj}, E(KD_{cj}, RDM))$ coincides with RDM in RAM. |
| 9 | ID information read | $KE_{MSNi}$ $KD_{MSNi}$ | ID, Read result (OK/NG) | $KE_{MSNi}$ is already registered |
| 10 | RDM read (set) | None | RDM (different random number each time) | |

TABLE 3-continued

Input/Output Specification for IC Card

| Item No. | Command description | Input information | Output information | Condition for guaranteeing output |
| --- | --- | --- | --- | --- |
| 11 | Carrier public key read | j (carrier number), A, $E(KD_{cj}, A)$ A is any integer ($\neq 0, 1$) | $KE_{cj}$, Read result (OK/NG) | $KE_{cj}$ (j = carrier number) is already registered, and input value A coincides with calculation result of $E(KE_{cj}, E(KD_{cj}, A))$. |
| 12 | E(K, A) read | K (key) A (Value to be encrypted) | E(K, A) (Used in any conversion calculation) | |

NOTE:
The command of *4 is operative only in supervisor mode. (Returns to normal mode at completion of each command)

The commands are substantially the same as those shown in Table 1 for the internal COB device of the ID containing type mobile unit. The differences are that the command for erasing $KE_{MSNi}$ is added as command of item No. 7, and that with the command of item No. 8, $KD_{AN}$ is input, instead of $KD_{MSNi}$, for ID information write; inputting $KD_{MSNi}$ for read is the same. Since only one $KE_{Cj}$ is stored, there is no need to input $KE_{Cj}$ with the commands of item Nos. 6 and 7. On the other hand, since there is a possibility that more than one $KE_{MSNi}$ may be stored, $KE_{MSNi}$ is input with the command of item No. 9 to specify one $KE_{MSNi}$.

Figure 33:
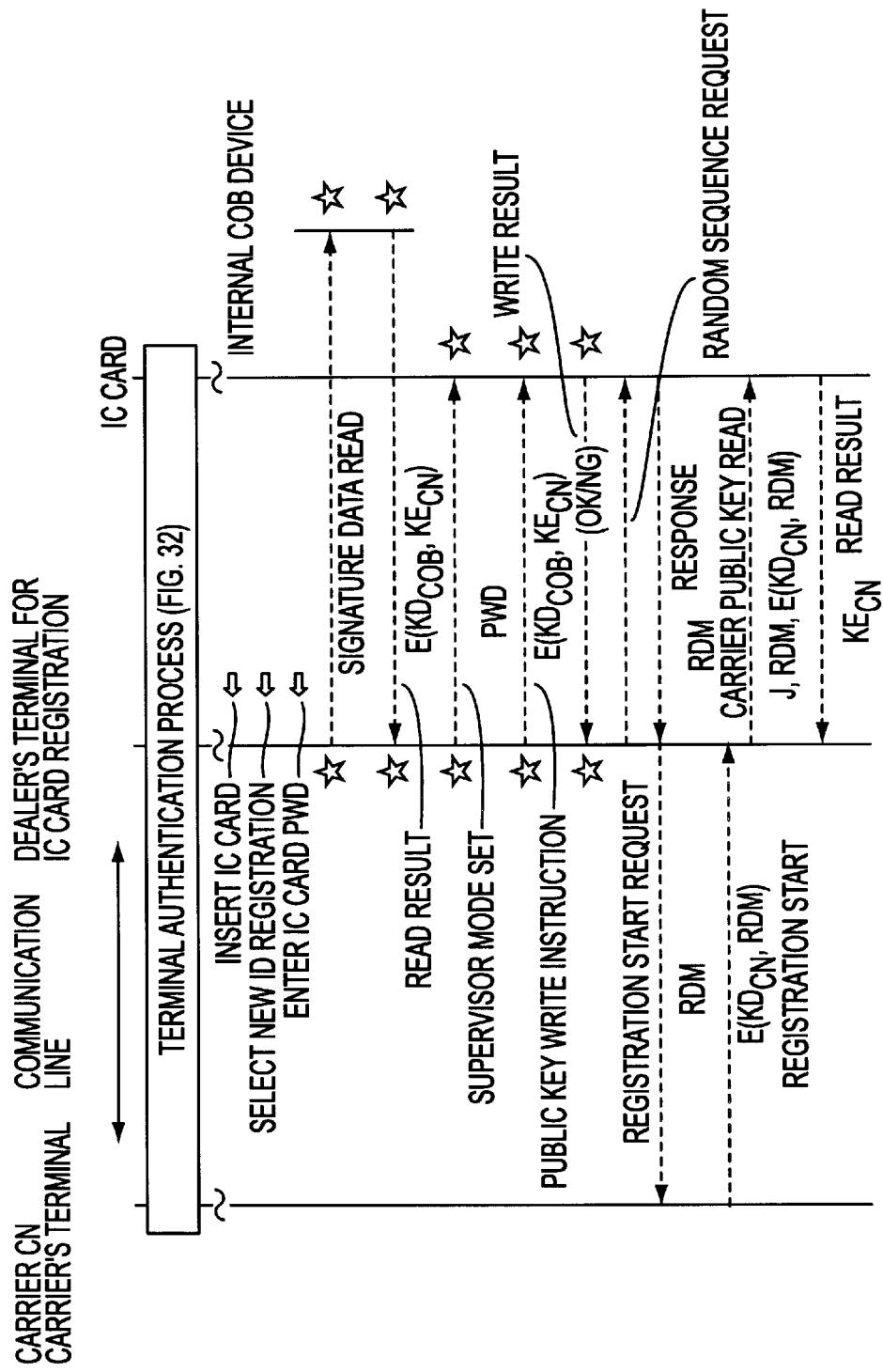
FIG. 33 is a diagram showing the first portion of a processing sequence for new IC card registration.
Figure 34:
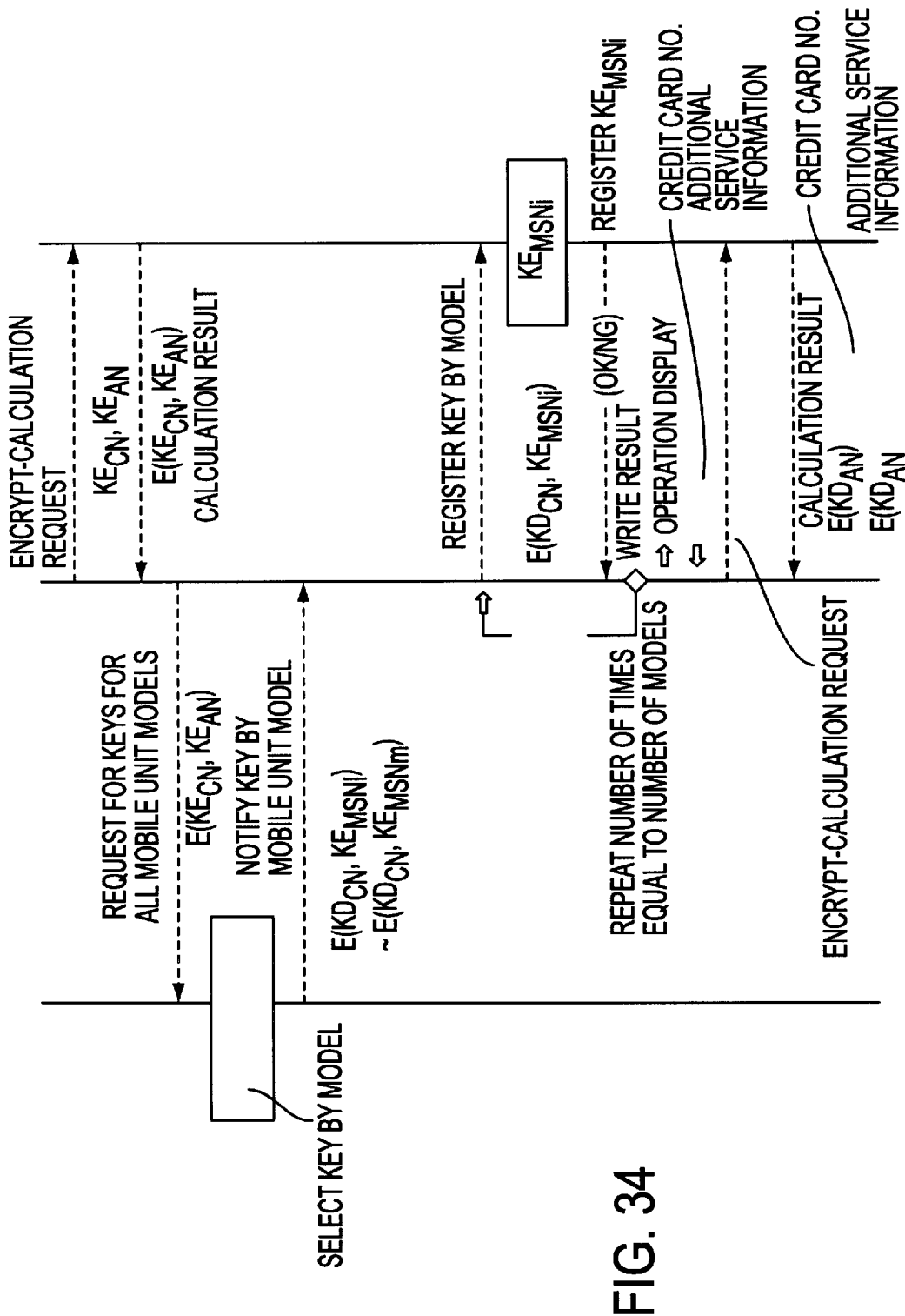
FIG. 34 is a diagram showing the middle portion of the processing sequence for new IC card registration.
Figure 35:
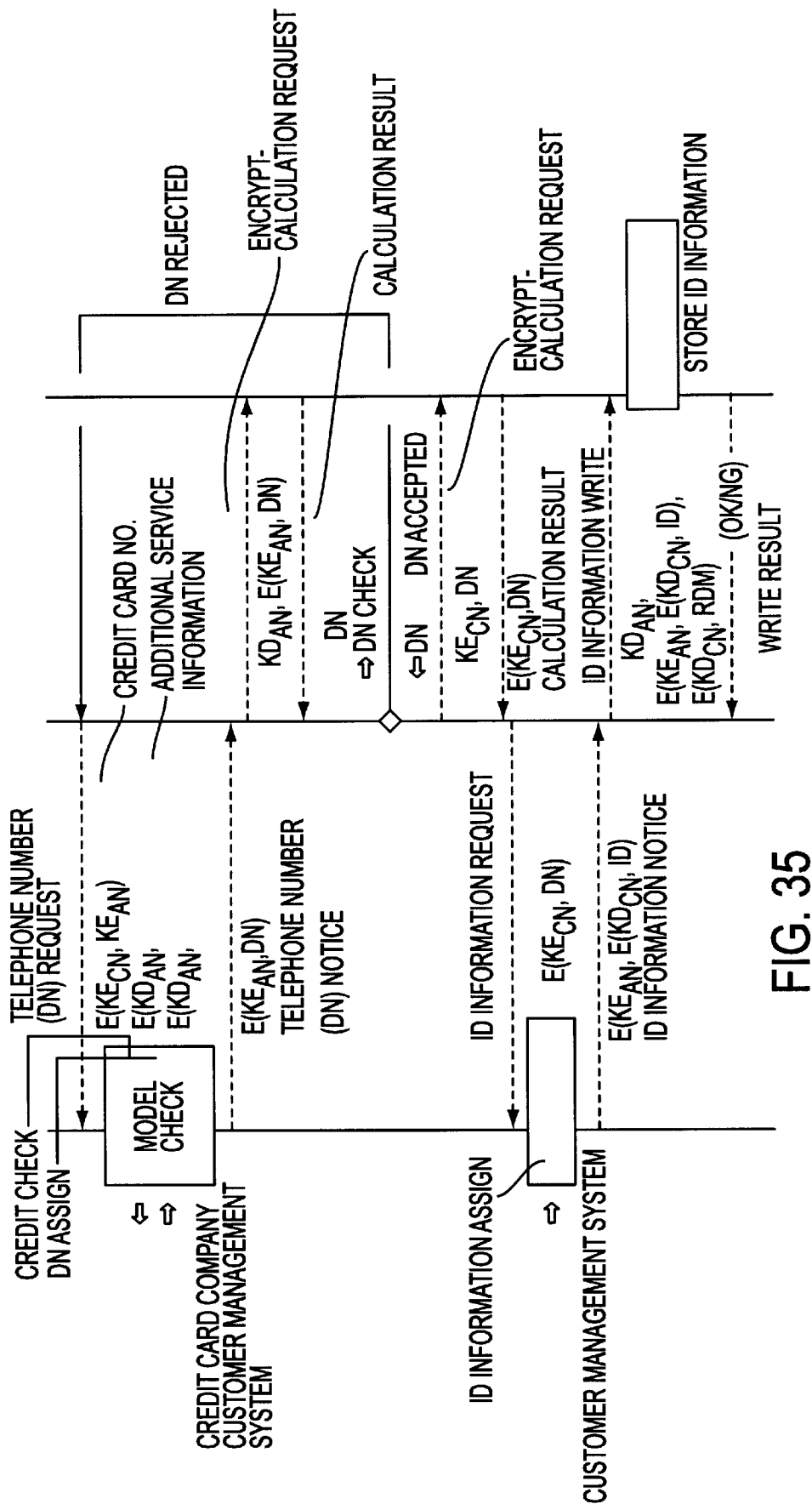
FIG. 35 is a diagram showing the last portion of the processing sequence for new IC card registration.

FIGS. 33 to 35 show a processing sequence for IC card registration. The portion enclosed with symbol * is a sequence for writing the carrier public key $KE_{CN}$ into an IC card that does not contain $KE_{CN}$. This particular portion of the processing sequence is not necessary for IC cards shipped from the IC card manufacturer with $KE_{CN}$ already written therein. The other portions of the processing sequence are substantially the same as the processing sequence for ID containing type mobile unit registration described with reference to FIGS. 7 and 8. The differences are that the $KE_{CN}$ readout process is finished in a single step since only one $KE_{CN}$ is stored, that $KE_{AN}$ is used, instead of $KE_{MSNi}$, when making a request to the carrier's terminal and when performing encryption at the carrier's terminal, and that there is a possibility that more than one $KE_{MSNi}$ may be sent from the carrier's terminal.

Figure 36:
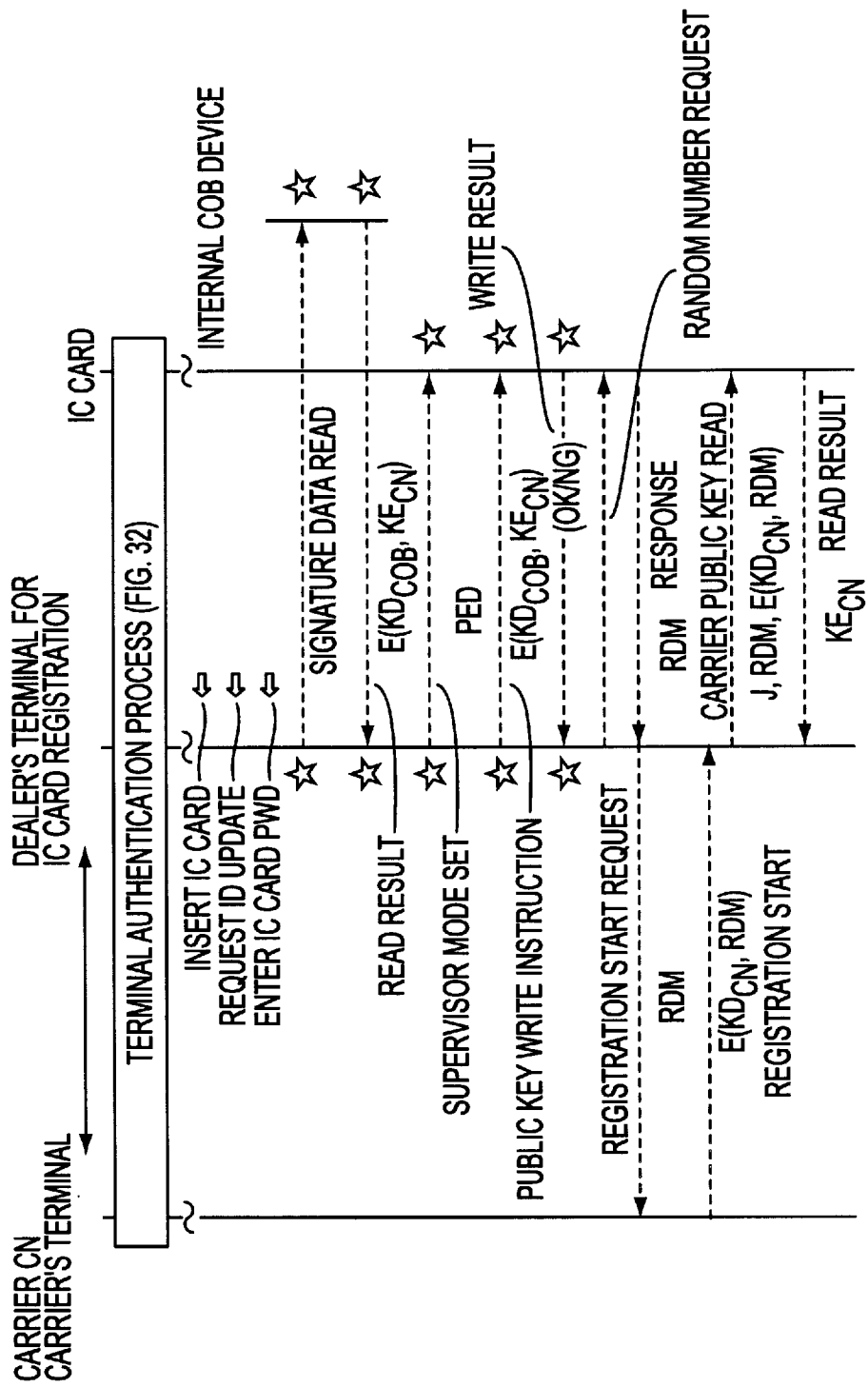
FIG. 36 is a diagram showing the first portion of a processing sequence for updating IC card's personal information.
Figure 37:
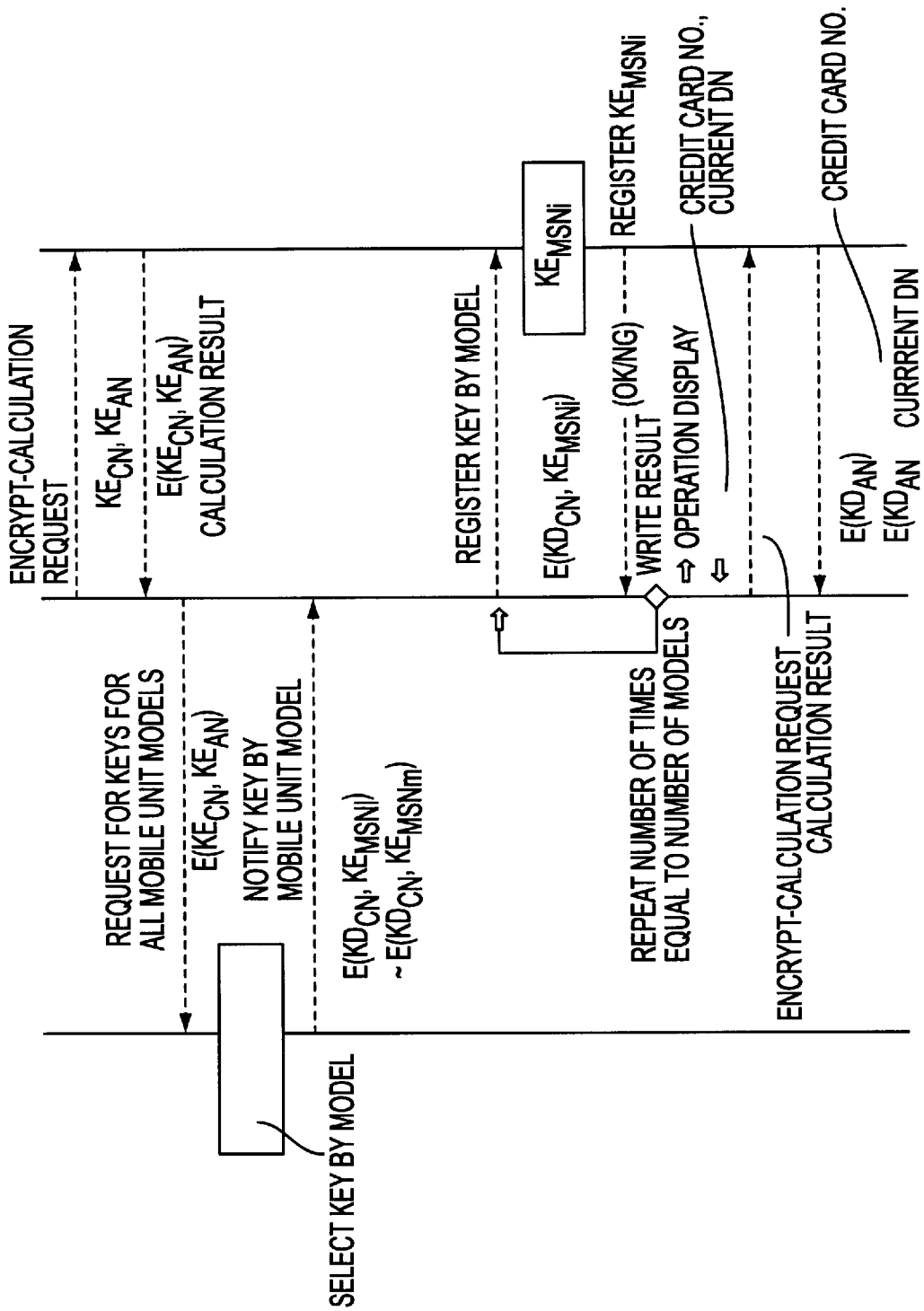
FIG. 37 is a diagram showing the middle portion of the processing sequence for updating IC card's personal information.
Figure 38:
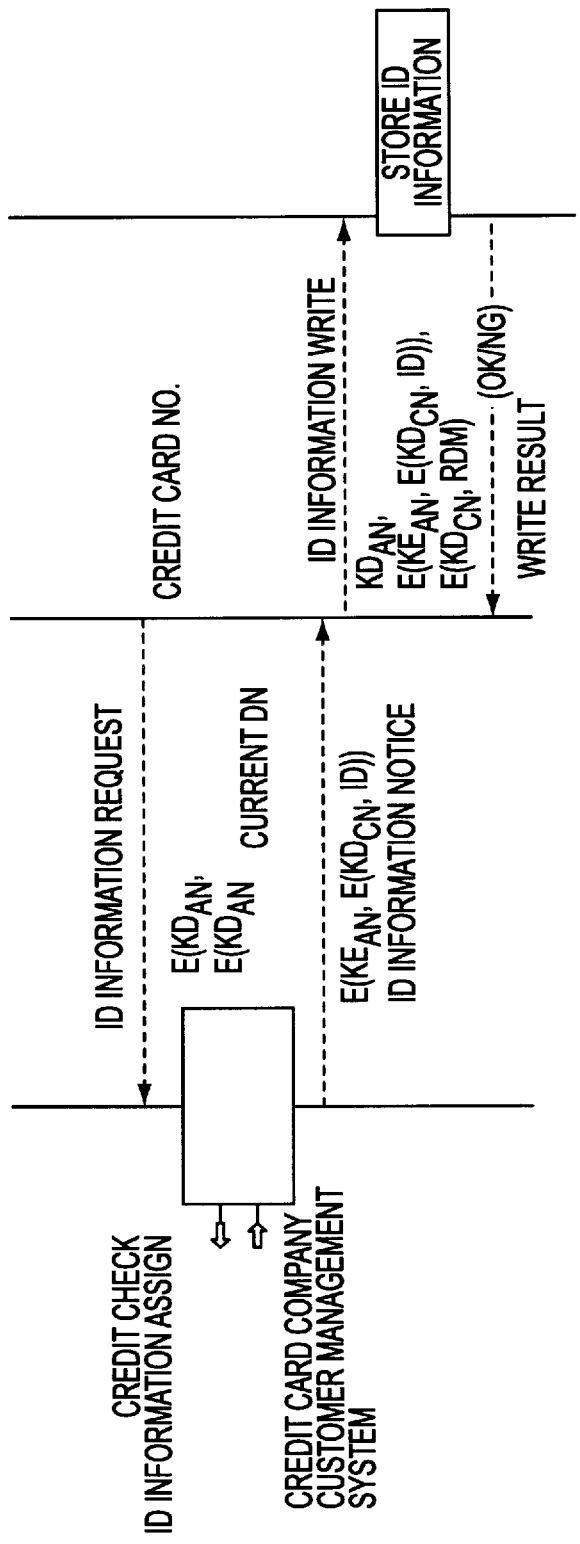
FIG. 38 is a diagram showing the last portion of the processing sequence for updating IC card's personal information.

FIGS. 36 and 38 show a sequence for updating the personal information assigned to the subscriber. When, e.g., an IC card is broken and replacement of the IC card is requested, the illustrated sequence is carried out to update the personal information. As in the case of the ID containing type mobile unit, this information updating is necessary to prevent anyone from obtaining a duplicate of a legally registered IC card; e.g., consider a case in which someone, who has a legally registered IC card, deliberately broke another IC card having no ID written therein and requested the dealer for replacement of the IC card. By updating the personal information when replacing the IC card, if there exists an IC card initially registered, the ID held in that IC card no longer matches the ID registered to the communications network, so that such an IC card can no longer be used.

Figure 39:
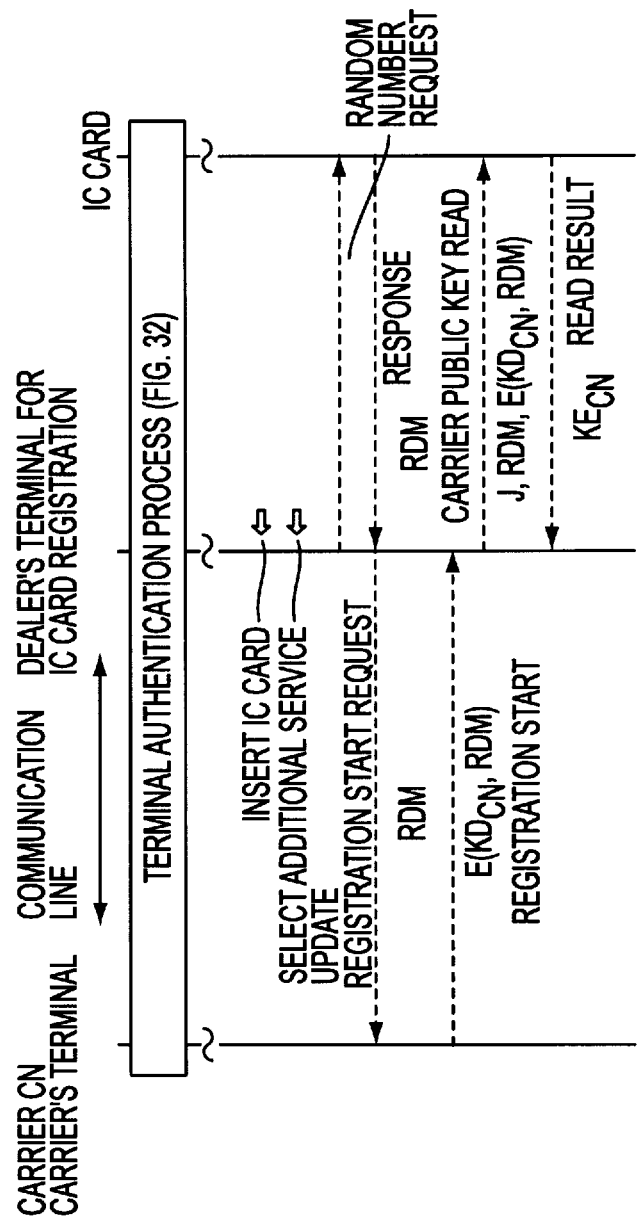
FIG. 39 is a diagram showing the first portion of a processing sequence for updating the contents of additional services registered on the IC card.
Figure 40:
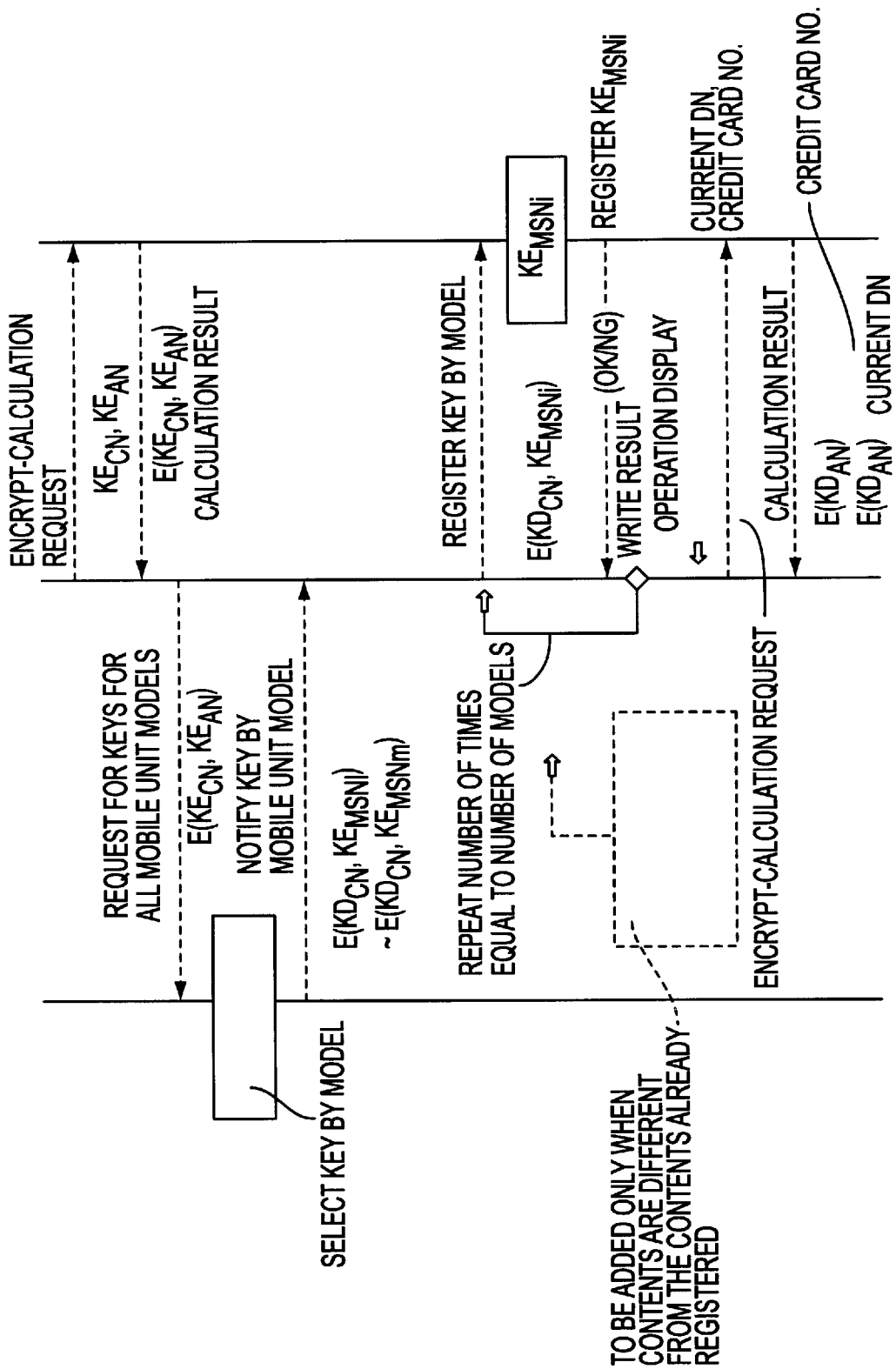
FIG. 40 is a diagram showing the middle portion of the processing sequence for updating the contents of additional services registered on the IC card.
Figure 41:
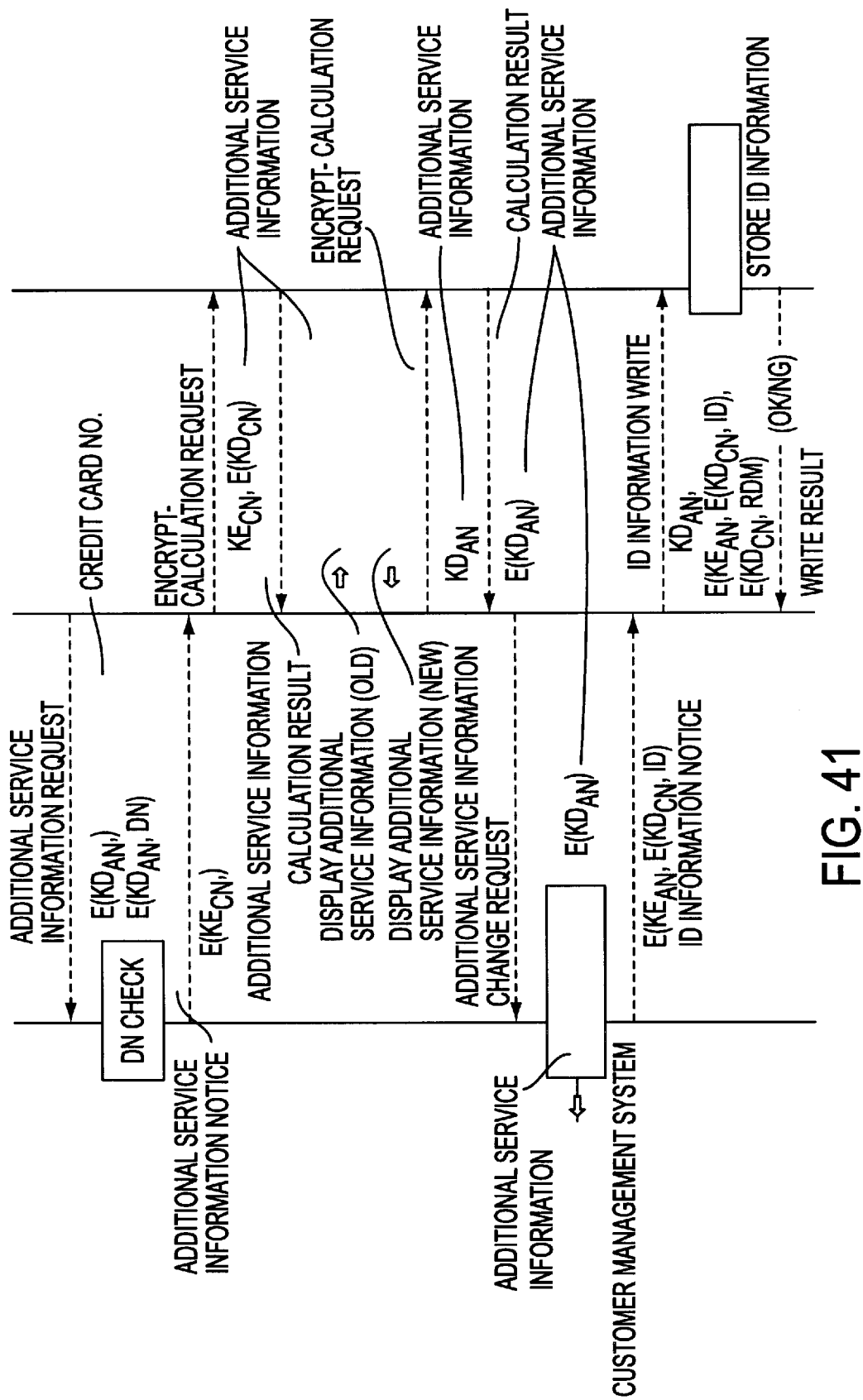
FIG. 41 is a diagram showing the last portion of the processing sequence for updating the contents of additional services registered on the IC card.
Figure 42:
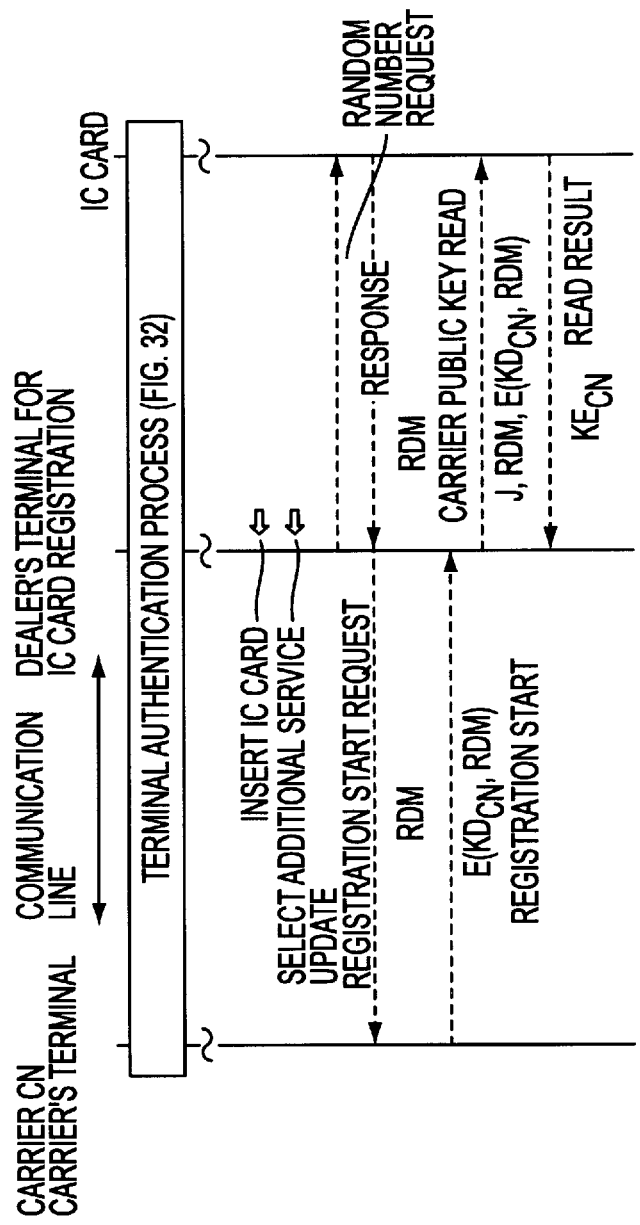
FIG. 42 is a diagram showing the first portion of a processing sequence for changing the credit card number registered on the IC card.
Figure 43:
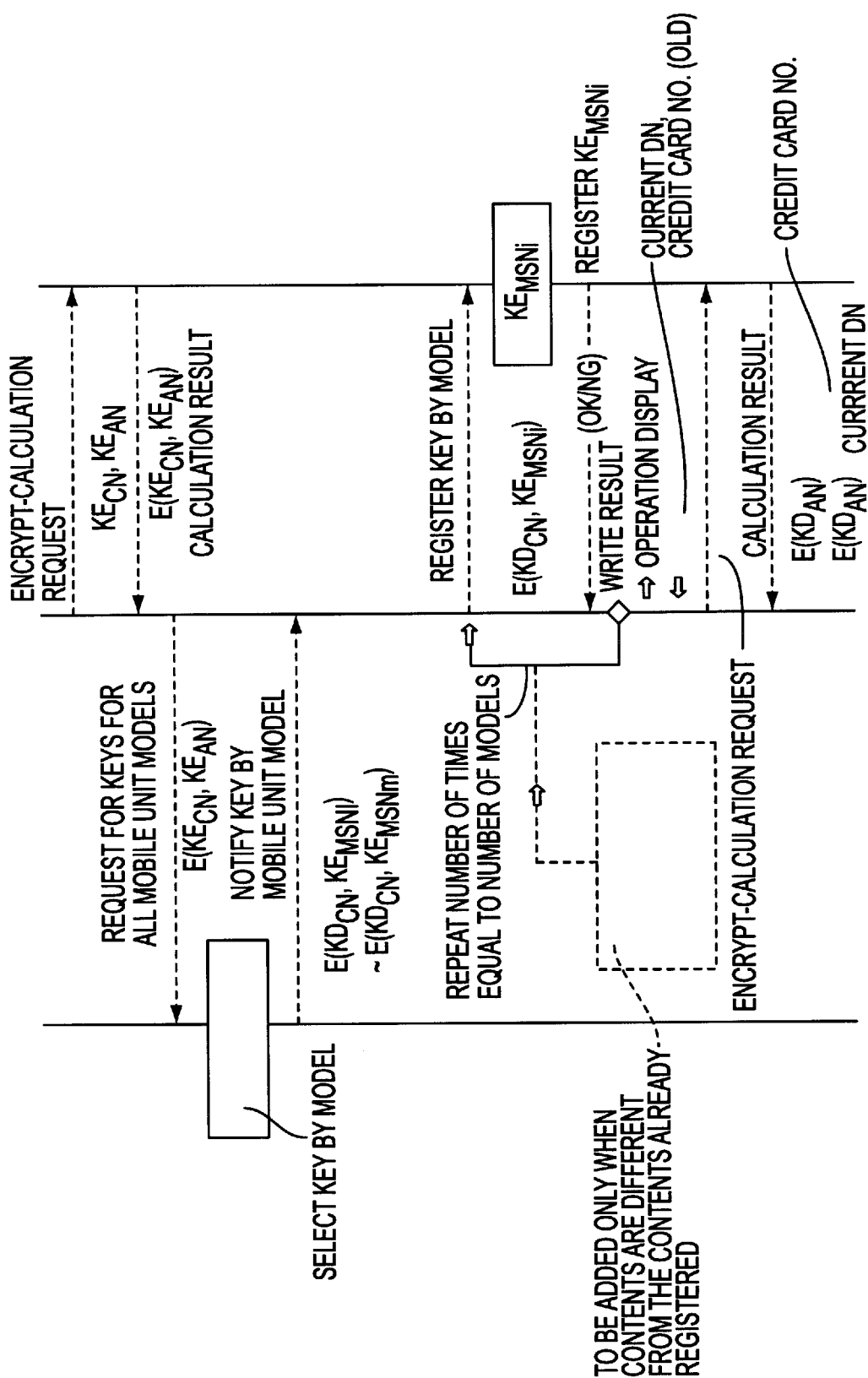
FIG. 43 is a diagram showing the middle portion of the processing sequence for changing the credit card number registered on the IC card.
Figure 44:
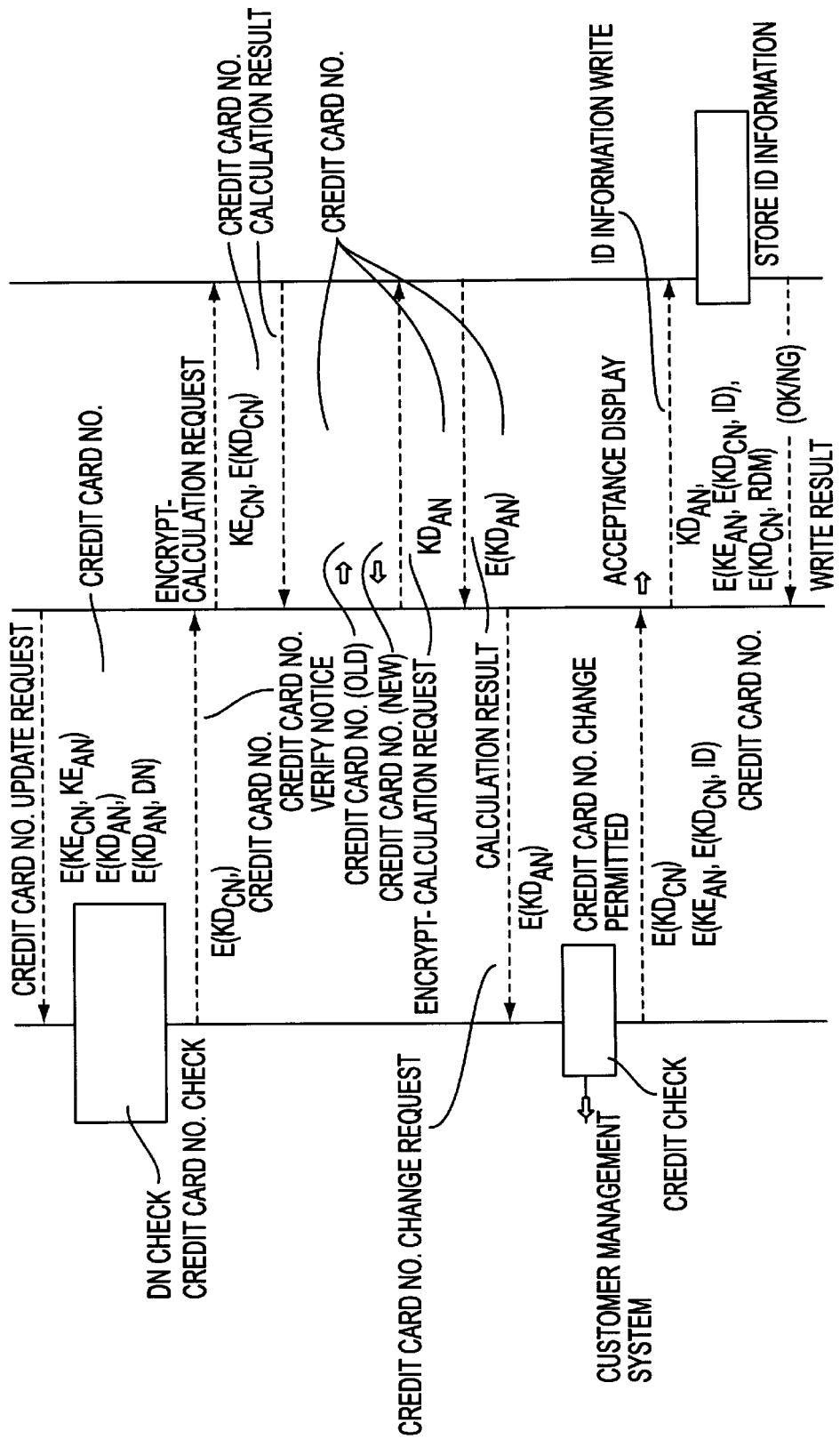
FIG. 44 is a diagram showing the last portion of the processing sequence for changing the credit card number registered on the IC card.

FIGS. 39 to 41 show a sequence for updating the contents of additional services. Depending on the contents of additional services to be added, it may become necessary to change the ID information; therefore, the ID information is always written even when there is no need to change it. FIGS. 42 to 44 show a sequence for changing the credit card number.

According to the IC card registration method described above, the EEPROM 36 of the IC card 130 stores mobile unit public keys, $KE_{MSNi}$, for all IC card insertion type mobile units authorized for use in the communications network that the IC card holder subscribes to, i.e., for all mobile unit models that can perform communication when the IC card is inserted, and only the mobile units whose EEPROM 20 contains $KD_{MSNi}$ corresponding to one of these public keys can read ID from the IC card. Therefore, after the IC card has been registered with the communications network, if any additional mobile unit model is approved for use, the $KE_{MSNi}$ of that mobile unit model needs to be written into the IC card if the IC card is to be used with that additional mobile unit. For this purpose, the user needs to have the communications carrier or dealer write the $KE_{MSNi}$ into his IC card, which is cumbersome.

Figure 45:
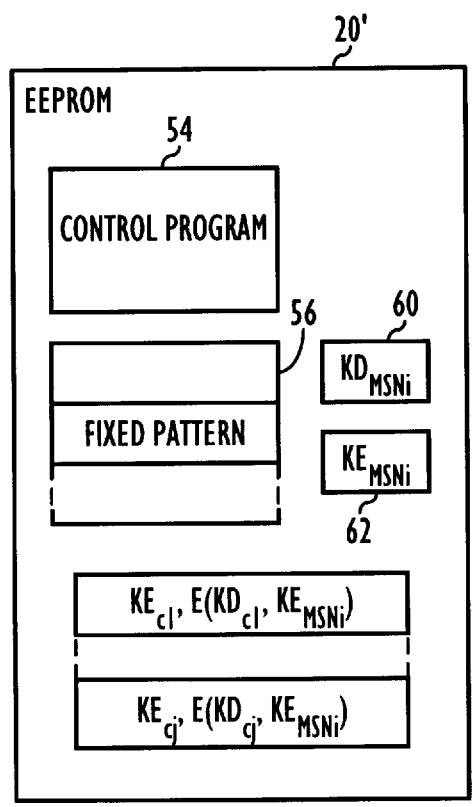
FIG. 45 is a diagram schematically showing the data stored in an EEPROM 20' of an IC card insertion type mobile unit according to another embodiment of the present invention.

FIG. 45 schematically shows the data stored in an EEPROM 20' of an IC card insertion type mobile unit according to another embodiment of the invention that overcomes the above disadvantage. This EEPROM 20' stores, in addition to $KD_{MSNi}$, $KE_{MSNi}$, etc., a $KE_{Cj}/E(KD_{Cj}, KE_{MSNi})$ pair as an evidence of authorization by a communications carrier Cj, the latter of the pair being $KE_{MSNi}$ signature-encrypted with the carrier secret key $KD_{Cj}$ of the communications carrier concerned. $KE_{Cj}$ is used to select one $E(KD_{Cj}, KE_{MSNi})$ when more than one $E(KD_{Cj}, KE_{MSNi})$ is stored, and is not necessary when there is no possibility that more than one $E(KD_{Cj}, KE_{MSNi})$ will be stored. To prevent abuse, it is desirable that these data also be stored in a shuffled form, as in $KD_{MSNi}$ and $KE_{MSNi}$, so that they are unrecognizable by simple comparison.

Since the mobile unit holds $KE_{MSNi}$ signature-encrypted with the carrier's $KD_{Cj}$, when an IC card authorized for use but with $KE_{MSNi}$ not written therein is inserted into the mobile unit, the IC card can be made usable with the mobile unit by entering the command of item No. 6 in Table 3, containing the above data, and thereby writing $KE_{MSNi}$ into the IC card. In such a case, $KE_{MSNi}$ need not necessarily be stored during the registration of the IC card.

Figure 46:
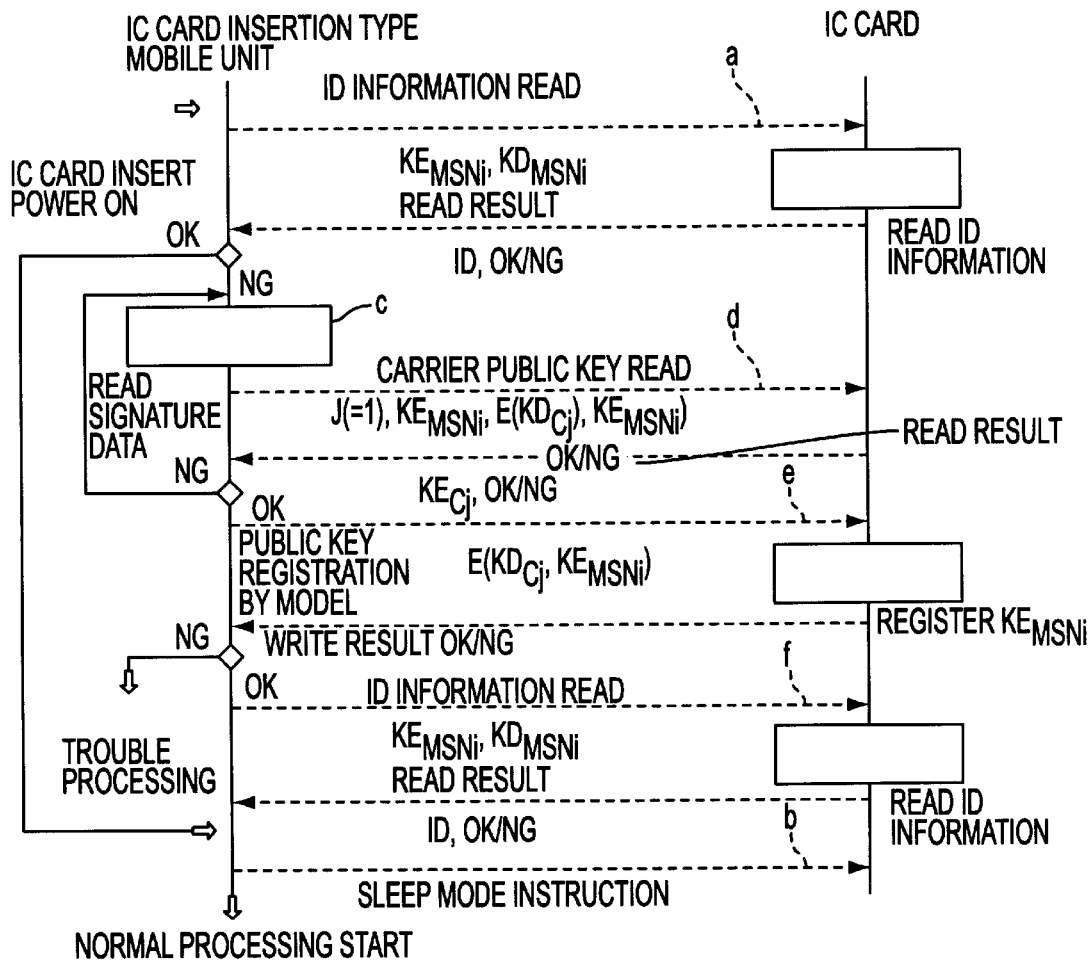
FIG. 46 is a diagram showing an example of a sequence for reading personal information from an IC card loaded into the mobile unit.

FIG. 46 shows an example of a sequence starting from the time when the IC card is inserted and power is turned on to the mobile unit, until the personal information is read out to set the unit ready for communication. In FIG. 46, when the command of item No. 9, containing $KD_{MSNi}$ and $KE_{MSNi}$, is entered after power on (step a), if the read result is OK and ID is read out, sleep mode is instructed to the IC card (step b), and the normal processing starts. If the read result is NG, one of the signature data $E(KD_{Cj}, KE_{MSNi})$ is read out (step c), and is input along with J (J=1) and $KE_{MSNi}$ as the command of item No. 11, to the IC card, to read out $KE_{Cj}$ (step d). In the IC card, the input signature data $E(KD_{Cj}, KE_{MSNi})$ is decrypted with the $KE_{Cj}$ designated by the integer J and contained in the IC card; if $KE_{MSNi}$ cannot be decrypted, the read result NG is returned, upon which the process returns to step c to read the next signature data which is input to the IC card as the command of item No. 11. If no signature data held in the mobile unit can be decrypted with the $KE_{Cj}$ contained in the IC card, then it is decided that the mobile unit cannot be used. If the entered signature data is successfully decrypted using the $KE_{Cj}$ contained in the IC card, the result OK is returned, upon which the command of item No. 6, containing this signature data, is entered to the IC card to store $KE_{MSNi}$ into the IC card (step e). The ID is now ready to read out, so that the command of item No. 9, containing $KE_{MSNi}$ and $KD_{MSNi}$, is entered into the IC card to read out the ID (step f).

Figure 47:
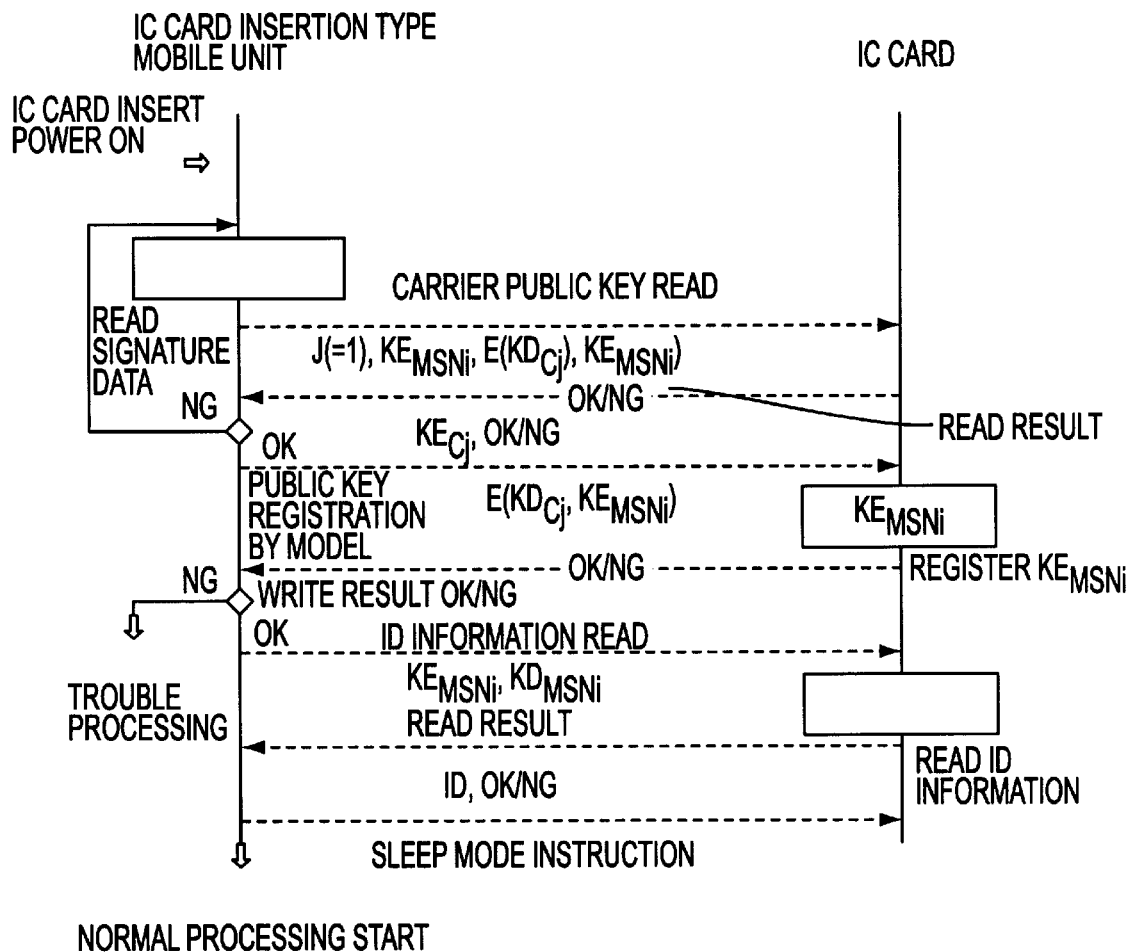
FIG. 47 is a diagram showing another example of a sequence for reading personal information from an IC card loaded into the mobile unit.

FIG. 47 is another example of the sequence up to the step where the ID is read out. In the sequence of FIG. 47, $KE_{MSNi}$ is immediately registered to read out the ID without first determining whether the ID can be read out. If $KE_{MSNi}$ is already stored in the IC card when a write is attempted, the write step is skipped. While the sequence of FIG. 47 is simpler in processing than the sequence of FIG. 46, the sequence always requires a certain length of time from the moment power is turned on, until the unit is set ready for communication.

In alternative embodiment, no $KE_{MSNi}$ is written into the IC card, but the IC card control program is modified so that ID can be read out by entering $KD_{MSNi}$ and $E(KD_{Cj}, KE_{MSNi})$ as the command of item No. 9 in Table 3, as shown in Table 4.

| 9 | ID information read | $E(KD_{cj}, KE_{MSNi})$, $KD_{MSNi}$ | ID Read result ((OK/NG)) | $KE_{Cj}$ is already registered |
|---|---|---|---|---|

When the command shown in Table 4 is entered, the CPU 30 of the IC card decrypts $E(KD_{Cj}, KE_{MSNi})$ with the stored $KE_{Cj}$ to recover $KE_{MSNi}$, then encrypts the stored ID with the recovered $KE_{MSNi}$ and further encrypts the encrypted result with the entered $KD_{MSNi}$ before output. In this case also, the processing in steps c, d, etc. shown in FIG. 46 should be carried out to determine which signature data matches the $KE_{Cj}$ contained in the IC card, or, an ID readout operation should be repeated using respective signature data until an ID having a matching fixed pattern is read out.

In the IC card registration methods described above, depending on the model of the mobile unit in which the IC card is inserted, all the additional services that the user has subscribed to and that are registered on the IC card may not be available for use with the mobile unit even when communication is possible. Therefore, information concerning the additional services that can be used is stored in the EEPROM 20 (FIG. 21) or 20' (FIG. 45) of the mobile unit, and after the ID information is read out, the information stored in the EEPROM is compared with the information, contained in the ID information, concerning the additional services that the user has subscribed to; if there is any service that the user has subscribed to but cannot be used with the mobile unit, a message, such as "So and so service cannot be used with this mobile unit", is displayed on the display of the mobile unit. This enables the user to know, upon inserting his IC card into the mobile unit, if there is any service that cannot be used.

The commands that are accepted by the internal COB device of the ID containing type mobile unit, the commands that are accepted by the internal COB device of the IC card registration terminal, and the commands that are accepted by the IC card have been described with reference to Table 1, Table 2, and Table 3 (and Table 4), respectively. If a control program is created that can accept all of these commands, such a program can be used common to them. In this case, $KE_{Cj}$, which was not input with the command of item No. 6 for the IC card in the previous example, is also input to standardize the process.

The signature data $E(KD_{COB}, KE_{Cj})$ that the communications carrier delivers to the mobile unit manufacturer and the IC card registration terminal manufacturer for writing $KE_{Cj}$ into the COB device and the IC card, should preferably be delivered in the following manner to prevent the occurrence of errors. First, using the load module received from the communications carrier, a COB device is fabricated which is capable of accepting at least the commands of item Nos. 3 and 5 in Table 2, and a COB writer incorporating the COB device is built. Then, the COB writer is taken to the communications carrier to have the signature data $E(KD_{COB}, KE_{Cj})$ written therein by using the command of item No. 3. Using this COB writer, the manufacturer writes $KE_{Cj}$ and $E(KD_{COB}, KE_{Cj})$ into the newly manufactured COB devices.

As described above, according to the present invention, the ID containing type mobile unit and the IC card used with an IC card insertion type mobile unit can be prevented from being illegally copied.

What is claimed is:

1. A method of registering a mobile unit for use in a mobile communications network, comprising the steps of:
   a) determining identification information for identifying each individual mobile unit;
   b) generating first information data by signature-encrypting said identification information with a carrier secret key of a communications carrier providing said mobile communications network; and
   c) writing said identification information into a memory module contained in said mobile unit and storing a carrier public key corresponding to said carrier secret key by entering an identification information write command, containing said first information data and a mobile unit public key of a manufacturer of said mobile unit, into said memory module, said stored carrier public key being used to recover said identification information, said memory module permitting said identification information to be read out therefrom only when an identification information readout command, containing a mobile unit secret key that corresponds to said mobile unit public key, is entered.

2. A method according to claim 1, further comprising the steps of:
   d) writing said carrier public key into said memory module during the manufacturing process of said mobile unit; and
   e) decrypting, within said memory module, said first information data entered in said step c) by using said carrier public key, thereby recovering said identification information.

3. A method according to claim 2, further comprising the steps of:
   f) generating second information data by signature-encrypting said mobile unit public key by using said carrier secret key;
   g) entering a mobile unit public key write command, containing said second information data, into said memory module;

h) decrypting, within said memory module, said second information data by using said carrier public key, thereby recovering said mobile unit public key; and i) storing said recovered mobile unit public key into said memory module, wherein said memory module outputs said identification information only when an identification information readout command, containing a mobile unit secret key corresponding to said stored mobile unit public key, is entered.

4. A method of registering a mobile unit for use in a mobile communications network, comprising the steps of:

a) determining identification information for identifying each individual mobile unit;

b) generating first information data by signature-encrypting said identification information with a carrier secret key of a communications carrier providing said mobile communications network;

c) writing said identification information into a memory module contained in said mobile unit by entering an identification information write command, containing said first information data, into said memory module, said memory module permitting said identification information to be read out therefrom only when an identification information readout command, containing a mobile unit secret key of a manufacturer of said mobile unit, is entered;

d) writing a carrier public key corresponding to said carrier secret key into said memory module during the manufacturing process of said mobile unit;

e) decrypting, within said memory module, said first information data entered in said step c) by using said carrier public key, thereby recovering said identification information;

f) generating second information data by signature-encrypting a mobile unit public key corresponding to said mobile unit secret key by using said carrier secret key;

g) entering a mobile unit public key write command, containing said second information data, into said memory module;

h) decrypting, within said memory module, said second information data by using said carrier public key, thereby recovering said mobile unit public key; and i) storing said recovered mobile unit public key into said memory module, wherein said memory module outputs said identification information only when an identification information readout command, containing a mobile unit secret key corresponding to said stored mobile unit public key, is entered; and j) in the manufacturing process of said memory module, writing a common public key corresponding to a common secret key held in common by a plurality of communications carriers into said memory module in an unalterable form, wherein the step d) includes signature-encrypting said carrier public key with said common secret key for input into said memory module, and decrypting the same with said common public key within said memory module, to recover said carrier public key.

5. A method according to claim 4, wherein the values of said mobile unit secret key and said mobile unit public key are different for each mobile unit model.

6. A method according to claim 5, wherein said identification information includes a fixed pattern for testing the correctness of data.

7. A method according to claim 6, further comprising the steps of:

k) connecting said mobile unit to a carrier's terminal installed at said communications carrier via a communication line;

l) issuing from said mobile unit a personal information transmit request to said carrier's terminal via said communication line; and m) in response to said request, transmitting from said carrier's terminal said first and said second information data to said mobile unit via said communication line.

8. A method according to claim 7, further comprising the steps of:

n) generating a random number within said memory module;

o) reading the generated random number out of said memory module;

p) transmitting the read-out random number from said mobile unit to said carrier's terminal via said communication line;

q) signature-encrypting said random number with said carrier secret key in said carrier's terminal; and r) transmitting said signature-encrypted random number from said carrier terminal to said mobile unit via said communication line, wherein said identification information write command contains said signature-encrypted random number, and said identification information is stored in said memory module only when the random number recovered by using said carrier public key coincides with said generated random number.

9. A method according to claim 8, further comprising the steps of:

s) prestoring, in said carrier's terminal, a mobile unit public key corresponding to a mobile unit model that can be connected to said mobile communications network; and t) transmitting the mobile unit public key of the mobile unit requesting a transmission in said step l) to said carrier's terminal via said communication line, wherein in the above step m), transmission of said first and said second information data is allowed only when the mobile unit public key transmitted in said step t) coincides with the mobile unit public key stored in said step s).

10. A method according to claims 7, 8, or 9, wherein in said step k), said mobile unit is connected to said communication line via a mobile unit registration terminal that is connected to said mobile unit by a cable.

11. A method according to claims 7, 8, or 9, wherein in said step k), said mobile unit is connected to said communication line via a mobile unit registration terminal that is coupled to said mobile unit by power-conserving radio.

12. A method according to claims 7, 8 or 9, further comprising the step u) in which said carrier's terminal automatically runs an on-line credit check on a registering applicant who is requesting a transmission of identification information in said step l).

13. A method of registering an IC card for an IC card insertion type mobile unit for use in a mobile communications network, comprising the steps of:

a) determining identification information for identifying each individual IC card;

b) generating first information data by signature-encrypting said identification information with a carrier secret key of a communications carrier providing said mobile communications network; and c) writing said identification information into said IC card storing a carrier public key corresponding to said carrier secret key by entering an identification information write command, containing said first information data and a mobile unit public key assigned to a mobile unit that can be used with said IC card inserted therein, into said IC card, said carrier public key being used to recover said identification information, said IC card permitting said identification information to be read out therefrom only when an identification information readout command, containing a mobile unit secret key that corresponds to said mobile unit public key, is entered.

14. A method according to claim 13, further comprising the steps of:

d) writing said carrier public key into said IC card; and e) decrypting, within said IC card, said first information data entered in said step c) by using said carrier public key, thereby recovering said identification information.

15. A method according to claim 14, further comprising the steps of:

f) generating second information data by signature-encrypting, with said carrier secret key, said mobile unit public key;

g) entering a mobile unit public key write command, containing said second information data, into said IC card;

h) decrypting, within said IC card, said second information data by using said carrier public key, thereby recovering said mobile unit public key; and i) storing said recovered mobile unit public key into said IC card, wherein said IC card outputs said identification information only when an identification information readout command, containing a mobile unit secret key corresponding to said stored mobile unit public key, is entered.

16. A method according to claim 15, wherein in said step d), said carrier public key is written into said IC card in an unalterable form in a manufacturing process of said IC card.

17. A method according to claim 15 or 16, wherein said identification information includes a fixed pattern for testing the correctness of data.

18. A method according to claim 17, further comprising the steps of:

j) inserting said IC card into an IC card registration terminal;

k) connecting said IC card registration terminal to a carrier's terminal installed at said communications carrier via a communication line;

l) issuing from said IC card registration terminal a personal information transmit request to said carrier's terminal via said communication line; and m) in response to said request, transmitting from said carrier's terminal said first and said second information data to said IC card registration terminal via said communication line.

19. A method of registering an IC card for an IC card insertion type mobile unit for use in a mobile communications network, comprising the steps of:

a) determining identification information for identifying each individual IC card;

b) generating first information data by signature-encrypting said identification information with a carrier secret key of a communications carrier providing said mobile communications network;

c) writing said identification information into said IC card by entering an identification information write command, containing said first information data, into said IC card, said IC card permitting said identification information to be read out therefrom only when an identification information readout command, containing a mobile unit secret key of a manufacturer of said mobile unit, is entered;

d) writing a carrier public key corresponding to said carrier secret key into said IC card; and e) decrypting, within said IC card, said first information data entered in said step c) by using said carrier public key, thereby recovering said identification information;

f) generating second information data by signature-encrypting, with said carrier secret key, a mobile unit public key corresponding to a mobile unit secret key assigned to a mobile unit that can be used with said IC card inserted therein;

g) entering a mobile unit public key write command, containing said second information data, into said IC card;

h) decrypting, within said IC card, said second information data by using said carrier public key, thereby recovering said mobile unit public key; and i) storing said recovered mobile unit public key into said IC card, wherein said IC card outputs said identification information only when an identification information readout command, containing a mobile unit secret key corresponding to said stored mobile unit public key, is entered, wherein said identification information includes a fixed pattern for testing the correctness of data, and further comprising the steps of:

i) inserting said IC card into an IC card registration terminal;

k) connecting said IC card registration terminal to a carrier's terminal installed at said communications carrier via a communication line;

l) issuing from said IC card registration terminal a personal information transmit request to said carrier's terminal via said communication line;

m) in response to said request, transmitting from said carrier's terminal said first and said second information data to said IC card registration terminal via said communication line;

n) generating a random number within said IC card;

o) reading the generated random number out of said IC card;

p) transmitting the readout random number from said IC card registration terminal to said carrier's terminal via said communication line;

q) signature-encrypting said random number with said carrier secret key in said carrier's terminal; and r) transmitting said signature-encrypted random number from said carrier's terminal to said IC card registration terminal via said communication line, wherein said identification information write command contains said signature-encrypted random number, and said identification information is stored in said IC card only when the random number recovered by using said carrier public key coincides with said generated random number.

20. A method of registering an IC card for an IC card insertion type mobile unit for use in a mobile communications network, comprising the steps of:
  a) determining identification information for identifying each individual IC card;
  b) generating first information data by signature-encrypting said identification information with a carrier secret key of a communications carrier providing said mobile communications network;
  c) writing said identification information into said IC card by entering an identification information write command, containing said first information data, into said IC card, said IC card permitting said identification information to be read out therefrom only when an identification information readout command, containing a mobile unit secret key of a manufacturer of said mobile unit, is entered;
A method according to claim 14, further comprising the steps of:
  d) writing a carrier public key corresponding to said carrier secret key into said IC card; and
  e) decrypting, within said IC card, said first information data entered in said step c) by using said carrier public key, thereby recovering said identification information;
  f) generating second information data by signature-encrypting, with said carrier secret key, a mobile unit public key corresponding to a mobile unit secret key assigned to a mobile unit that can be used with said IC card inserted therein;
  g) entering a mobile unit public key write command, containing said second information data, into said IC card;
  h) decrypting, within said IC card, said second information data by using said carrier public key, thereby recovering said mobile unit public key; and
  i) storing said recovered mobile unit public key into said IC card,
  wherein said IC card outputs said identification information only when an identification information readout command, containing a mobile unit secret key corresponding to said stored mobile unit public key, is entered,
  wherein said identification information includes a fixed pattern for testing the correctness of data, and
  further comprising the steps of:
    j) inserting said IC card into an IC card registration terminal;
    k) connecting said IC card registration terminal to a carrier's terminal installed at said communications carrier via a communication line;
    l) issuing from said IC card registration terminal a personal information transmit request to said carrier's terminal via said communication line;
    m) in response to said request, transmitting from said carrier's terminal said first and said second information data to said IC card registration terminal via said communication line;
    s) in which said carrier's terminal automatically runs an on-line credit check on a registering applicant who is requesting a transmission of identification information in said step l).

21. A method of registering an IC card for an IC card insertion type mobile unit for use in a mobile communications network, comprising the steps of:
  a) determining identification information for identifying each individual IC card;
  b) generating first information data by signature-encrypting said identification information with a carrier secret key of a communications carrier providing said mobile communications network;
  c) writing said identification information into said IC card by entering an identification information write command, containing said first information data, into said IC card, said IC card permitting said identification information to be read out therefrom only when an identification information readout command, containing a mobile unit secret key of a manufacturer of said mobile unit, is entered;
  d) writing a carrier public key corresponding to said carrier secret key into said IC card;
  e) decrypting, within said IC card, said first information data entered in said step c) by using said carrier public key, thereby recovering said identification information;
  f) generating second information data by signature-encrypting, with said carrier secret key, a mobile unit public key corresponding to a mobile unit secret key assigned to a mobile unit that can be used with said IC card inserted therein;
  g) entering a mobile unit public key write command, containing said second information data, into said IC card;
  h) decrypting, within said IC card, said second information data by using said carrier public key, thereby recovering said mobile unit public key; and
  i) storing said recovered mobile unit public key into said IC card,
  wherein said IC card outputs said identification information only when an identification information readout command, containing a mobile unit secret key corresponding to said stored mobile unit public key, is entered;
  storing, in said IC card insertion type mobile unit, signature data generated by signature-encrypting a mobile unit public key for said mobile unit with the carrier secret key of the communications carrier providing the mobile communications network with which said mobile unit can be used; and
  when the mobile unit public key for said IC card insertion type mobile unit is not stored in the IC card inserted into said mobile unit, writing said mobile unit public key into said IC card by entering a mobile unit public key write command, containing said signature data, into said IC card.

22. A method of registering an IC card for an IC card insertion type mobile unit for use in a mobile communications network, comprising the steps of:
  a) determining identification information for identifying each individual IC card;
  b) generating first information data by signature-encrypting said identification information with a carrier secret key of a communications carrier providing said mobile communications network; and
  c) writing said identification information into said IC card by entering an identification information write command, containing said first information data, into said IC card from which said identification information can be read out only when an identification information readout command, containing a mobile unit secret key of a manufacturer of said mobile unit, is entered; and
  d) writing a carrier public key corresponding to said carrier secret key into said IC card; and e) decrypting, within said IC card, said first information data entered in said step c) by using said carrier public key, thereby recovering said identification information;

storing, in said IC card insertion type mobile unit, signature data generated by signature-encrypting a mobile unit public key for said mobile unit with the carrier secret key of the communications carrier providing the mobile communications network with which said mobile unit can be used;

entering a mobile unit public key write command, containing said signature data, into the IC card inserted into said IC card insertion type mobile unit;

decrypting, within said IC card, said second information data by using said carrier public key, thereby recovering said mobile unit public key; and storing said recovered mobile unit public key into said IC card, wherein said IC card outputs said identification information only when an identification information readout command, containing a mobile unit secret key corresponding to said stored mobile unit public key, is entered.

23. A method of registering an IC card for an IC card insertion type mobile unit for use in a mobile communications network, comprising the steps of:

a) determining identification information for identifying each individual IC card;

b) generating first information data by signature-encrypting said identification information with a carrier secret key of a communications carrier providing said mobile communications network; and c) writing said identification information into said IC card by entering an identification information write command, containing said first information data, into said IC card, said IC card permitting said identification information to be read out therefrom only when an identification information readout command, containing a mobile unit secret key of a manufacturer of said mobile unit, is entered;

storing, in said IC card insertion type mobile unit, signature data generated by signature-encrypting a mobile unit public key for said mobile unit with the carrier secret key of the communications carrier providing the mobile communications network with which said mobile unit can be used, wherein said identification information readout command further contains said signature data.

24. A mobile unit for use in a mobile communications network, comprising:

a memory module storing a carrier public key of a communication carrier providing said mobile communications network and permitting identification information for identifying each individual mobile unit to be written thereinto only when an identification information write command is entered that contains first information data generated by signature-encrypting said identification information with a carrier secret key corresponding to said carrier public key, and permitting said identification information to be read out therefrom only when an identification information readout command, containing a mobile unit secret key of a manufacturer of said mobile unit, is entered;

means for writing said identification information and a mobile unit public key that corresponds to said mobile unit secret key into said memory module by entering said identification information write command, said carrier public key being used to recover said identification information; and means for reading out said identification information by entering said identification information readout command into said memory module.

25. A mobile unit according to claim 24, wherein said memory module contains means for holding said carrier public key in an unalterable form, and means for decrypting said entered first information data by using said carrier public key to recover said identification information.

26. A mobile unit for use in a mobile communications network, comprising:

a memory module permitting identification information for identifying each individual mobile unit to be written thereinto only when an identification information write command is entered that contains first information data generated by signature-encrypting said identification information with a carrier secret key of a communications carrier providing said mobile communications network, and permitting said identification information to be read out therefrom only when an identification information readout command, containing a mobile unit secret key of a manufacturer of said mobile unit, is entered;

means for writing said identification information into said memory module by entering said identification information write command; and means for reading out said identification information by entering said identification information readout command into said memory module, wherein said memory module contains means for holding a carrier public key corresponding to said carrier secret key in an unalterable form, and means for decrypting said entered first information data by using said carrier public key to recover said identification information, said mobile unit further comprising:

means for entering, into said memory module, a mobile unit public key write command that contains second information data generated by signature-encrypting a mobile unit public key corresponding to said mobile unit secret key with said carrier secret key, wherein said memory module decrypts said second information data by using said carrier public key to recover said mobile unit public key, stores said recovered mobile unit public key in said memory module, and outputs said identification information only when an identification information readout command, containing a mobile unit secret key corresponding to said stored mobile unit public key, is entered.

27. A mobile unit according to claim 26, wherein the values of said mobile unit secret key and said mobile unit public key are different for each mobile unit model.

28. A mobile unit according to claim 27, wherein said identification information includes a fixed pattern for testing the correctness of data.

29. A mobile unit according to claim 28, further comprising:

means for being connected to a carrier's terminal installed at said communications carrier via a communication line;

means for issuing an identification information transmit request to said carrier's terminal via said communication line; and means for receiving said first and said second information data transmitted from said carrier's terminal over said communication line in response to said request.

30. A mobile unit according to claim 29, further comprising:

means for reading out of said memory module a random number generated in said memory module;

means for transmitting the readout random number to said carrier's terminal via said communication line; and means for receiving data from said carrier's terminal via said communication line, said data containing said random number signature-encrypted with said carrier secret key in said carrier's terminal, wherein said identification information write command contains said signature-encrypted random number, and said identification information is written into said memory module only when the random number recovered by using said carrier public key coincides with said generated random number.

31. A mobile unit according to claim 29 or 30, wherein said connecting means connects to said communication line via a mobile unit registration terminal connected by a cable.

32. A mobile unit according to claim 29 or 30, wherein said connecting means connects to said communication line via a mobile unit registration terminal connected by power-conserving radio.

33. An IC card for an IC card insertion type mobile unit for use in a mobile communications network, comprising:

an input/output terminal;

means for holding identification information used for connection to said mobile communications network;

means for decrypting identification information with a carrier public key of a communications carrier providing said mobile communications and writing the same into said identification information holding means when an identification information write command, containing the identification information signature-encrypted with a carrier secret key corresponding to said carrier public key and a mobile unit public key assigned to a mobile unit that can be used with the IC card inserted therein, is entered via said input/output terminal; and means for reading out said identification information from said identification information holding means and outputting the same at said input/output terminal when an identification information readout command is entered via said input/output terminal, which command contains a mobile unit secret key that corresponds to said mobile unit public key for a model that can be used with said IC card inserted therein.

34. An IC card for an IC card insertion type mobile unit for use in a mobile communications network, comprising:

an input/output terminal;

means for holding identification information used for connection to said mobile communications network;

means for decrypting identification information and writing the same into said identification information holding means when an identification information write command, containing the identification information signature-encrypted with a carrier secret key of a communications carrier providing said mobile communications network, is entered via said input/output terminal;

means for reading out said identification information from said identification information holding means and outputting the same at said input/output terminal when an identification information readout command is entered via said input/output terminal, which command contains a mobile unit secret key of a manufacturer of said mobile unit for a model that can be used with said IC card inserted therein;

means for storing a carrier public key corresponding to said carrier secret key; and means for decrypting a mobile unit public key with said carrier public key and storing the same when a mobile unit public key write command is entered via said input/output terminal, which command contains mobile unit public keys, signature-encrypted with said carrier secret key, corresponding to mobile unit secret keys for all models of mobile units that can be used with said IC card inserted therein, wherein said personal information writing means decrypts said identification information by using said carrier public key, and said personal information output means, in response to said personal information readout command, encrypts said personal information with said mobile unit public key and further encrypts the same with the mobile unit secret key contained in said personal information readout command, for output.

35. An IC card according to claim 34, wherein said identification information includes a fixed pattern for testing the correctness of data.

36. An IC card for an IC card insertion type mobile unit for use in a mobile communications network, comprising:

an input/output terminal;

means for holding identification information used for connection to said mobile communications network;

means for decrypting identification information and writing the same into said identification information holding means when an identification information write command, containing the identification information signature-encrypted with a carrier secret key of a communications carrier providing said mobile communications network, is entered via said input/output terminal;

means for reading out said identification information from said identification information holding means and outputting the same at said input/output terminal when an identification information readout command is entered via said input/output terminal, which command contains a mobile unit secret key of a manufacturer of said mobile unit for a model that can be used with said IC card inserted therein, wherein said identification information output means outputs said personal information via said input/output terminal when a command, containing a signature-encrypted version of a mobile unit public key corresponding to the mobile unit secret key of the manufacturer of said mobile unit, is entered via said input/output terminal, said signature encryption being performed using the carrier secret key of the communications carrier providing said communications network.

37. An IC card insertion type mobile unit for use in a mobile communications network, comprising:

means for storing a mobile unit secret key of a manufacturer of said mobile unit; and means for reading identification information from an IC card inserted into said mobile unit by entering an identification information readout command, containing the mobile unit secret key stored in said storing means, into said IC card.

38. An IC card insertion type mobile unit for use in a mobile communications network, comprising:

means for storing signature data generated by signature-encrypting a mobile unit public key corresponding to a mobile unit secret key of a manufacturer of said mobile unit by using a carrier secret key of a communications carrier providing said communications network; and means for reading identification information from an IC card inserted into said mobile unit by entering an identification information readout command, containing the signature data stored in said storing means, into said IC card.

39. An IC card insertion type mobile unit for use in a mobile communications network, comprising:

means for storing signature data generated by signature-encrypting a mobile unit public key corresponding to a mobile unit secret key of a manufacturer of said mobile unit by using a carrier secret key of a communications carrier providing said communications network;

means for reading identification information from an IC card inserted into said mobile unit by entering an identification information readout command, containing the signature data stored in said storing means, into said IC card;

means for storing information concerning services available with said mobile unit;

means for reading, from an IC card inserted in said mobile unit, information concerning services registered on said IC card; and means for comparing the service information read out by said service information reading means with the service information stored in said service information storing means, and for determining the kinds of services not available with said mobile unit and displaying the same.

40. A method according to claim 19, further comprising the step of s) in which said carrier's terminal automatically runs an on-line credit check on a registering applicant who is requesting a transmission of identification information in said step l).

41. A method according to claim 10, further comprising the step u) in which said carrier's terminal automatically runs an on-line credit check on a registering applicant who is requesting a transmission of identification information in said step l).

42. A method according to claim 11, further comprising the step u) in which said carrier's terminal automatically runs an on-line credit check on a registering applicant who is requesting a transmission of identification information in said step l).

43. A method according to claim 16, wherein in said step d), said carrier public key is written into said IC card in an unalterable form in a manufacturing process of said IC card.

44. A method according to claim 20, wherein in said step d), said carrier public key is written into said IC card in an unalterable form in a manufacturing process of said IC card.

* * * * *

UNITED STATES PATENT AND TRADEMARK OFFICE
CERTIFICATE OF CORRECTION

PATENT NO. : 5,883,960
DATED : MARCH 16, 1999
INVENTOR(S) : Minoru MARUYAMA, et al.

It is certified that error appears in the above-indentified patent and that said Letters Patent is hereby corrected as shown below:

On the title page, Item [75], delete "Kawasaki" and insert--Kanagawa--

Signed and Sealed this

Twenty-fourth Day of August, 1999

Attest:

Q. TODD DICKINSON

*Attesting Officer*     *Acting Commissioner of Patents and Trademarks*